United States Patent [19]
Tabata et al.

[11] Patent Number: 6,093,974
[45] Date of Patent: Jul. 25, 2000

[54] CONTROL DEVICE FOR RESTARTING ENGINE OF VEHICLE

[75] Inventors: Atsushi Tabata; Kojiro Kuramochi, both of Okazaki; Shuji Nagano, Toyota; Shogo Matsumoto, Susono, all of Japan

[73] Assignee: Toyota Jidosha Kabushiki Kaisha, Toyota, Japan

[21] Appl. No.: 09/294,003

[22] Filed: Apr. 19, 1999

[30] Foreign Application Priority Data

| Apr. 17, 1998 | [JP] | Japan | 10-107630 |
| May 11, 1998 | [JP] | Japan | 10-127985 |
| May 15, 1998 | [JP] | Japan | 10-133561 |
| Jun. 10, 1998 | [JP] | Japan | 10-162551 |
| Jul. 24, 1998 | [JP] | Japan | 10-210113 |
| Oct. 20, 1998 | [JP] | Japan | 10-298953 |
| Mar. 5, 1999 | [JP] | Japan | 11-059490 |
| Apr. 5, 1999 | [JP] | Japan | 11-097912 |

[51] Int. Cl.[7] .................................................. F02N 11/00
[52] U.S. Cl. ...................... 290/40 R; 290/40 A; 318/140; 180/65.2
[58] Field of Search ...................... 290/34, 38 R, 290/40 R, 40 A, 40 C; 180/65.2; 318/140

[56] References Cited

U.S. PATENT DOCUMENTS

| 4,533,011 | 8/1985 | Heidemeyer et al. | 180/65.2 |
| 5,558,173 | 9/1996 | Sherman | 180/53.8 |
| 5,778,330 | 7/1998 | McKee | 701/62 |
| 5,801,499 | 9/1998 | Tsuzuki et al. | 318/141 |
| 5,818,116 | 10/1998 | Nakae et al. | 290/38 R |
| 5,856,709 | 1/1999 | Ibaraki et al. | 290/45 |
| 5,934,396 | 8/1999 | Kurita | 180/65.2 |
| 5,936,312 | 8/1999 | Koide et al. | 290/40 R |
| 6,019,183 | 2/2000 | Shimasaki et al. | 180/165 |

FOREIGN PATENT DOCUMENTS

| 60-125738 | 7/1985 | Japan . |
| 8-014076 | 1/1996 | Japan . |
| 9-039613 | 2/1997 | Japan . |
| 9-071138 | 3/1997 | Japan . |

*Primary Examiner*—Nicholas Ponomarenko
*Attorney, Agent, or Firm*—Oblon, Spivak, McClelland, Maier & Neustadt, P.C.

[57] ABSTRACT

A control device for restarting an engine is configured to engage a forward clutch of an automatic transmission quickly, with little shock and without involving a special cost for restarting the engine. When the engine is restarted, a way for supplying an oil is changed in accordance with a leaving amount of an oil from an oil passage with respect to the forward clutch of the automatic transmission or an oil temperature. A time for executing a quick pressure increase control and a control target pressure is changed in accordance with a leaving amount of the oil or the oil temperature. Further, the quick pressure increase control is started at a timing when an engine revolution (a rotational speed of an oil pump) is equal to or greater than a predetermined value.

34 Claims, 32 Drawing Sheets

| NE \ Tcol | NE(1) | NE(2) | | NE(n) |
|---|---|---|---|---|
| Tcol(1) | Tfast(11) | Tfast(21) | | Tfast(n1) |
| Tcol(2) | Tfast(12) | Tfast(22) | | Tfast(n2) |
| | | | | |
| Tcol(m) | Tfast(1m) | Tfast(2m) | | Tfast(nm) |

FIG. 9

|  | C0 | C1 | C2 | B0 | B1 | B2 | B3 | B4 | F0 | F1 | F2 |
|---|---|---|---|---|---|---|---|---|---|---|---|
| P | ○ |  |  |  |  |  |  |  | ○ |  |  |
| R (STOP) | ○ |  | ○ |  |  |  |  | ○ | ○ |  |  |
| R (DRIVING) |  |  | ○ | ○ |  |  |  | ○ |  |  |  |
| N | ○ |  |  |  |  |  |  |  | ○ |  |  |
| 1st | ○ | ○ |  |  |  |  |  | ● | ○ |  | ○ |
| 2nd | ● | ○ |  |  |  |  | ○ |  | ○ |  |  |
| 3rd | ○ | ○ |  |  | ● | ○ |  |  | ○ | ○ |  |
| 4th | ○ | ○ | ○ |  |  | △ |  |  | ○ |  |  |
| 5th |  | ○ | ○ | ○ |  | △ |  |  |  |  |  |

FIG. 12

| GEAR POSITION AT STOP TIME | SIMULTANEOUS ENGAGEMENT | OIL TEMPERATURE | | |
|---|---|---|---|---|
| | | EQUAL TO θ1 OR LESS | BETWEEN θ2 AND θ3 | EQUAL TO θ4 OR GREATER |
| 1st | B4 NO | TG1 1Aθ1 | TG1 1Aθ23 | TG1 1Aθ4 |
| | B4 YES | TG1 1Bθ1 | TG1 1Bθ23 | TG1 1Bθ4 |
| 2nd | C0 NO | TG1 2Aθ1 | TG1 2Aθ23 | TG1 2Aθ4 |
| | C0 YES | TG1 2Bθ1 | TG1 2Bθ23 | TG1 2Bθ4 |
| 3rd | B1 NO | TG1 3Aθ1 | TG1 3Aθ23 | TG1 3Aθ4 |
| | B1 YES | TG1 3Bθ1 | TG1 3Bθ23 | TG1 3Bθ4 |
| 4th | | TG1 4Aθ1 | TG1 4Aθ23 | TG1 4Aθ |
| 5th | | TG1 5A | TG1 5Aθ | TG1 5AC |

|      | C1 | C2 | C3 | B1 | B2 | B3 | F1 | F2 |
|------|----|----|----|----|----|----|----|----|
| 1ST  | ○  |    |    |    |    | ●  |    | ○  |
| 2ND  | ○  |    |    | ●  | ○  |    | ○  |    |
| 3RD  | ○  | ○  |    |    | ○  |    |    |    |
| 4TH  |    | ○  |    | ○  | ○  |    |    |    |
| REV  |    |    | ○  |    |    | ○  |    |    |

CONTROL DEVICE FOR RESTARTING ENGINE OF VEHICLE

INCORPORATION BY REFERENCE

The disclosure of Japanese Patent Application Nos. HEI 10-107630 filed on Apr. 17, 1998, 10-133561 filed on May 15, 1998, 10-127985 filed on May 11, 1998, 10-162551 filed on Jun. 10, 1998, 10-210113 filed on Jul. 24, 1998, 10-298953 filed on Oct. 20, 1998, 11-059490 filed on Mar. 5, 1999, and 11-97912 filed on Apr. 5, 1999, including the specification, drawings and abstract is hereby expressly incorporated by reference in their entirety.

BACKGROUND OF THE INVENTION

1. Field of the Invention

The present invention relates to a vehicle in which an engine is automatically stopped upon establishment of a predetermined engine stop condition and restarted upon establishment of a predetermined restart condition, and more particularly, to a control device of a vehicle for restarting the engine by engaging a predetermined clutch of an automatic transmission upon restarting.

2. Description of the Related Art

In order to reduce fuel consumption, emission of exhaust gas, noise and the like, a vehicle is known which is configured to automatically stop the engine under a predetermined stop condition, while waiting at a crossing, for example, as in Japanese Patent Application Laid-Open No. HEI 8-14076).

In the aforementioned vehicle, upon establishment of the restart condition reflected by a driver's intention to drive, for example, by depressing the acceleration pedal, it is necessary to restart the engine immediately.

However, if the automatic transmission is hydraulic, the cessation of the engine may suspend an oil pump driven by the engine. Accordingly, for example, the oil supplied to a forward clutch (a predetermined clutch) of the automatic transmission is drawn from an oil passage, thus reducing an oil (hydraulic) pressure. Therefore, the forward clutch for operating the transmission and a clutch brake for hydraulically switching a gear ratio will be temporarily released.

Upon establishment of the restart condition of the engine in the aforementioned state, the engine starts rotating, and a discharge pressure of the oil pump in the transmission is gradually increased. Then, when the hydraulic pressure for the operation becomes sufficient, the forward clutch is engaged (connected), for example, to a first gear or "speed." The connection of the clutch means that the oil drawn from the oil passage is supplied again through the oil passage. Accordingly, an unacceptably long time is required until the clutch is connected after restart of the engine. In this case, if the forward clutch is not quickly engaged, the acceleration pedal may be depressed while the transmission is effectively in a neutral state, such that the forward clutch may be engaged when the engine is at an elevated RPM, thereby creating a possibility of an engagement shock. There is a risk that such an engagement shock may give an uncomfortable feeling to an occupant as well as reduce a durability of the clutch.

Accordingly, in order to prevent the aforementioned effects, a technique has been disclosed wherein a large-sized accumulator is used to maintain the forward clutch in an engagement state, until the engine that has been automatically started is restarted.

Further, Japanese Patent Laid-Open No. HEI 9-39613 discloses a technique in which the fuel supply to the engine is suspended to keep the engine rotation at an idling speed by driving the motor generator, rather than stopping the engine operation completely, such that operation of the oil pump is not stopped.

However, the technique suggested in Japanese Patent Laid-Open No. HEI 8-14076 in which the forward clutch is kept in an engagement state with a large-sized accumulator when the engine is stopped, may cause other disadvantages owing to the accumulator, such as deterioration of a drain performance during shifting from a D (drive) position to an N (neutral) position thereby retarding the releasing speed of the forward clutch, or enlargement of the hydraulic control device size, for example.

Further, the technique disclosed in Japanese Patent Laid-Open No. HEI 9-39613 is able to reduce the fuel consumption, however, it may demand a large battery to store sufficient electric power to drive the generator, in spite of reduced fuel consumption.

SUMMARY OF THE INVENTION

The present invention has been made in light of the aforementioned problems, and an object of the present invention is to realize quick and smooth engagement of a predetermined clutch of an automatic transmission to be engaged when restarting an engine, while reducing the shock caused by engagement of the clutch and avoiding disadvantages such as deterioration of a drain performance and enlargement of a hydraulic control device or a battery.

In order to achieve the object mentioned above, in accordance with an aspect of the present invention, there is provided a control device for restarting an engine mounted on a vehicle including stop means for automatically stopping the engine in accordance with a stop command under a predetermined stop condition, restart means for restarting the engine in accordance with a restart command, engagement means for supplying a fluid to a fluid passage of a predetermined clutch of a transmission mounted on the vehicle from a fluid pump when the engine is restarted and engaging the clutch, fluid leaving amount detecting means for detecting a fluid leaving amount from a fluid passage of the predetermined clutch, and fluid supply control means for changing a fluid supply method for engaging the clutch in accordance with the fluid leaving amount.

The above-described embodiment makes it possible to quickly engage the predetermined gear without generating the engagement shock even where no large-sized accumulator is provided or when the engine rotation is not kept at an idling speed.

Further, in the aforementioned embodiment, it is preferable to determine a time period for executing a quick pressure increase control executed upon start of the fuel supply in accordance with the fluid leaving amount from the fluid passage of the predetermined clutch or an oil temperature of the automatic transmission.

When executing a quick pressure increase control in a state where the oil is not completely drawn out from the oil passage of the predetermined clutch, for example, when restarting the engine immediately after stopping, the gear will be engaged rapidly, thus causing a risk of a great shock owing to the rapid gear engagement. However, the aforementioned structure makes it possible to quickly engage the predetermined clutch concurrently with restarting the engine by changing the time period for executing the quick pressure increase control in accordance with the oil leaving amount or the oil temperature.

The control for automatically stopping the engine when the vehicle stops may not be executed at a driving position, for example, the shift position D or R, but executed only at a non-drive position such as the shift position N or P.

Further, in accordance with another aspect of the present invention, a control device for restarting an engine mounted on a vehicle includes stop means for automatically stopping the engine in accordance with a stop command under a predetermined stop condition, restart means for restarting the engine in accordance with a restart command, engagement means for supplying an oil to an oil passage of a predetermined clutch of a transmission mounted on the vehicle from a fluid pump when the engine is restarted and engaging the clutch, fluid temperature detecting means for detecting a temperature of a fluid in the automatic transmission, and fluid supply control means for changing a fluid supply method for engaging the clutch in accordance with the temperature of the oil in the transmission.

Still further, in accordance with the other aspect of the present invention, a control device for restarting an engine mounted on a vehicle includes stop means for automatically stopping the engine in accordance with a stop command under a predetermined stop condition, restart means for restarting the engine in accordance with a restart command, engagement means for supplying a fluid to a fluid passage of a predetermined clutch of a transmission mounted on the vehicle when the engine is restarted and engaging the clutch, quick pressure increase means for executing a quick pressure increase control for quickly increasing a pressure of the fluid to a control target pressure when supplying the fluid, and rotational speed detecting means for detecting a rotational speed of the fluid pump in the transmission, in which a timing for starting the quick pressure increase control is determined in accordance with the rotational speed.

BRIEF DESCRIPTION OF THE DRAWINGS

FIG. 9 is a graph showing an engagement state of a friction device in the automatic transmission;

FIG. 12 is a map showing a relation between a gear stage and an oil temperature when the engine automatically stops;

DESCRIPTION OF THE PREFERRED EMBODIMENTS

Hereinafter, an embodiment of the present invention will be in described with reference to the accompanying drawings.

Figure 2:
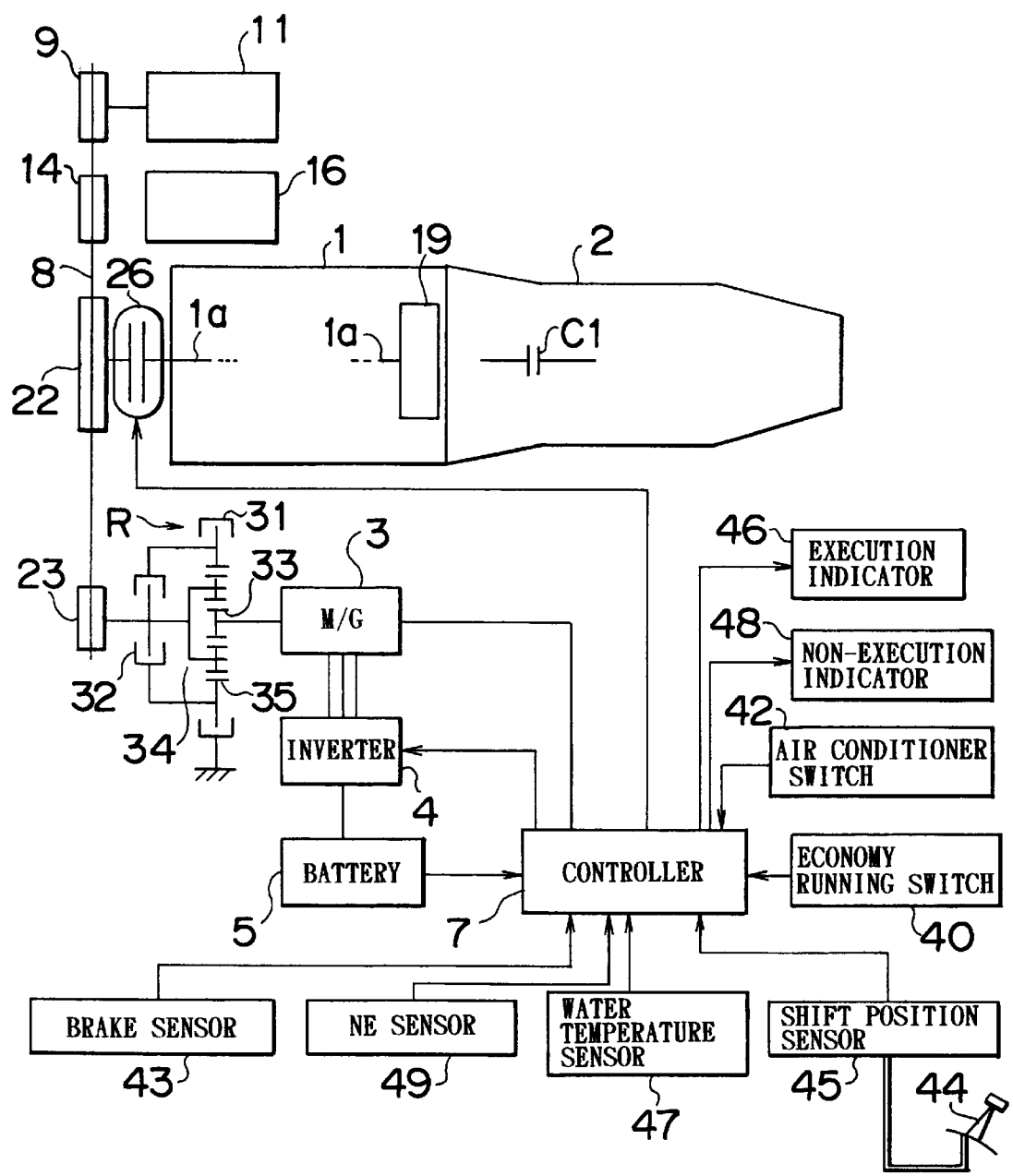
FIG. 2 is a block diagram representing the system construction of an engine drive device for a vehicle to which the present invention is applied.

A first embodiment of the present invention is structured to automatically stop an engine when a predetermined stop condition is established, and restart the engine when a predetermined restart condition is established in a drive system for a vehicle shown in FIG. 2. Upon stop of the engine, an oil pump stops to thereby disengage a forward clutch (a predetermined clutch) of an automatic transmission. Therefore the forward clutch has to be engaged as fast as possible upon restart of the engine so as to prevent over-revving of the engine in a neutral state and promote the condition to start vehicle.

Accordingly, in accordance with the present embodiment, a quick pressure increase control (to be described later) at an early stage for supplying oil to the forward (start) clutch as an optimum mode in accordance with the condition.

Here, in the following description, a discontinuously variable automatic transmission having "shift stages" will be exemplified, however, the same can be applied to a continuously variable transmission having a forward clutch.

As shown in FIG. 2, a motor for restarting an engine 1 and a motor generator (hereinafter, referred to as M/G) 3 serving as a power generator are connected to a crank shaft 1a of the engine 1 mounted on a vehicle, via an electromagnetic clutch 26, a pulley 22, a belt 8, a pulley 23 and a deceleration mechanism R.

The deceleration mechanism R is of a planetary gear type including a sun gear 33, a carrier 34 and a ring gear 35, which is assembled between the M/G 3 and the pulley 23 via a brake 31 and a clutch 32. In this case, the clutch 32 may be replaced by a one way clutch.

An oil pump 19 for an automatic transmission 2 (hereinafter, referred to as an A/T) is directly connected to the crank shaft 1a of the engine 1. A forward clutch C1 connected during forward driving is provided within the A/T 2.

Auxiliary machinery such as a pump 11 for power steering, a compressor 16 for an air conditioner and the like is connected to the crank shaft 1a of the engine and the M/G 3 via the pulleys 9, 14 and the belt 8.

In addition to the auxiliary machinery mentioned above, an engine oil pump, a water pump and the like (not shown) are also connected. An inverter 4 electrically coupled to the M/G 3 is switchable to vary the supply of an electric energy from a battery 5 as a power source to the M/G 3 so as to make a rotational speed of the M/G 3 variable. Further, MIG 3 is configured to switch such that the battery 5 may be charged with the electric energy from the M/G 3.

A controller 7 (ECU: Electronic Control Unit) for performing a control of connecting/disconnecting the electromagnetic clutches 26, 27 and a switching control of the inverter 4, receives input signals of the engine revolution sensor 49 as an engine revolution signal (a rotational speed signal of the oil pump 19), a switch 40 for an automatic stop/drive mode (an economy running mode), a switch 42 for operating an air conditioning system, a shift lever 44 as a shift position signal, and an engine cooling water temperature sensor 47 commonly having a function of a sensor for estimating and detecting an oil temperature. Arrows in the drawing show the respective signal lines.

Figure 3:
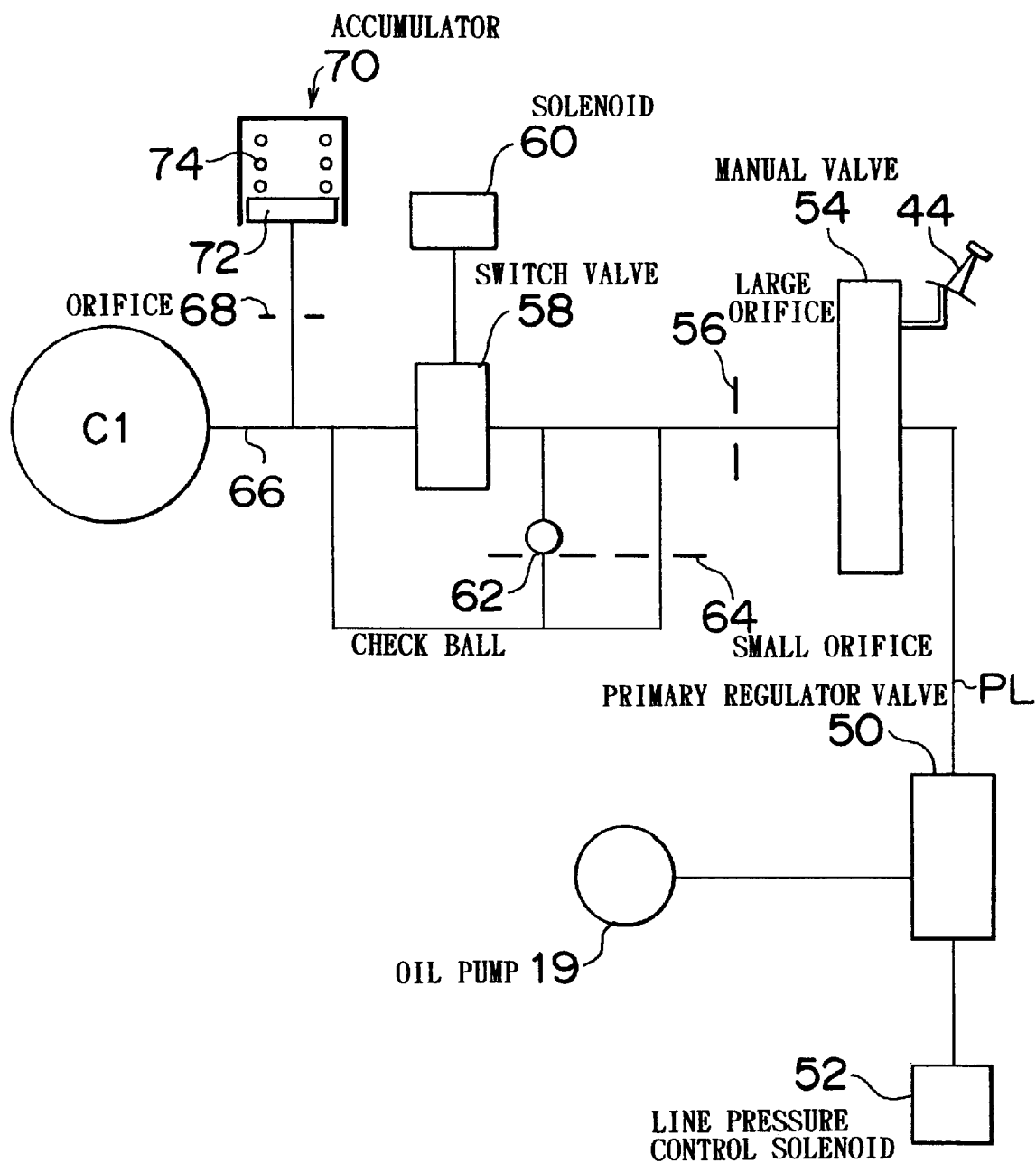
FIG. 3 is a hydraulic circuit diagram showing an essential portion of a hydraulic control device for executing a quick pressure reduction control.

Next, a structure for connecting the forward clutch C1 in the A/T 2 will be described. FIG. 3 is a hydraulic circuit diagram which shows an essential portion of the structure for connecting the forward clutch C1 in a hydraulic control device of the automatic transmission.

A primary regulator valve 50 is controlled by a line pressure control solenoid 52 so as to control an original pressure generated by the oil pump 19 to a line pressure PL. The line pressure PL is introduced to a manual valve 54. The manual valve 54 is mechanically connected to the shift lever 44, and in this case, communicates the line pressure PL with the forward clutch C1 side when a forward position, for example, a D (drive) position or a second position is selected.

A large orifice 56 and a switch valve 58 are interposed between the manual valve 54 and the forward clutch C1. The switch valve 58 is controlled by a solenoid 60 so as to selectively introduce or shut off the oil passing through the large orifice 56 relative to the forward clutch C1.

A check ball 62 and a small orifice 64 are assembled in parallel so as to bypass the switch valve 58. When the switch valve 58 is shut off by the solenoid 60, the oil passing through the large orifice 56 further reaches the forward clutch C1 via the small orifice 64. In this case, the check ball 62 functions such that a drain of an oil pressure in the forward clutch C1 is smoothly performed.

An accumulator 70 is arranged in an oil passage 66 between the switch valve 58 and the forward clutch C1 via an orifice 68. The accumulator 70 is provided with a piston 72 and a spring 74, functions to maintain a predetermined oil pressure determined by the spring 74 for a moment during the oil supply to the forward clutch C1, and reduces the shock generated at a moment toward completion of an engagement in the forward clutch C1.

In accordance with the present embodiment, the engine is started by bringing the electromagnetic clutch 26 into a connection state and by driving M/G 3. At this moment, the rotation of the M/G 3 is transmitted from the sun gear 33 to the carrier 34 in the deceleration mechanism R in deceleration by turning on the brake 31 and turning off the clutch 32. Accordingly, even when each capacity of the M/G 3 and the inverter 4 is reduced, a driving force sufficient for cranking the engine 1 can be obtained. After start of the engine 1, the M/G 3 functions as the power generator to charge battery 5 with electric energy at a time of, for example, braking the vehicle.

Upon start of the engine, the controller 7 detects the rotational speed of the M/G 3, and outputs a switching signal to the inverter 4 such that the rotation of the M/G 3 yields a torque and a rotational speed necessary for starting the engine 1. For example, in the case where the air conditioner switch 42 is on upon start of the engine, a greater torque will be required compared with a state where the air condition system is off. Accordingly the controller 7 outputs a switching signal so as to allow the M/G 3 to rotate at a high rotational speed with a higher torque.

When the vehicle stops in a state where the economy running switch 40 is turned on and a predetermined engine stop condition is established, the controller 7 outputs a signal for cutting the fuel supply to the engine 1, thus stopping the engine. An output signal line for cutting the fuel supply, however, is omitted in FIG. 2. The economy running mode signal is input to the controller 7 in response to depression of the economy running switch 40 provided within a vehicle cabin by a driver. Conditions such as "a vehicle speed of 0", "an accelerator is off" and "a shift lever position is D" are examples of the stop condition of the engine in the economy running mode.

Here, if the engine is not desired to be automatically stopped at the position D, the stop condition "the position of the shift lever is D" may be replaced by the condition "the position of the shift lever is N or P (non-drive position)".

In a state where the engine 1 is automatically stopped in the economy running mode, the controller 7 outputs the control signal for disconnecting the electromagnetic clutch 26, so as to interrupt power transmission between the pulley 22 and the engine 1. On the contrary, it is preferable to operate the air conditioner and the power steering unit even when the engine 1 is stopped. For such a reason, the controller 7 outputs the corresponding switching signal to the inverter 4 so that the M/G 3 rotates at a torque determined in conjunction with the load of the power steering pump and the air conditioner compressor.

In this case, the brake 31 is turned off, the clutch 32 is turned on and the electromagnetic clutch 26 is turned off. The above setting may connect the M/G 3 directly to the pulley 23, thus securing the rotational speed required for driving the auxiliary machinery 11, 16 and the like. Further, in order to use the M/G 3 as the power generator and drive the auxiliary machinery 11, 16 during operation of the engine, the brake 31 is turned off, the clutch 32 is turned on and the electromagnetic clutch 26 is turned on. This setting may connect the M/G 3 directly to the pulley 23 so as to prevent rotational speed of the M/G 3 and the auxiliary machinery 11, 16 from exceeding the allowable value. In this case, the same setting can be applied to the case where the clutch 32 is replaced by the one way clutch.

Next, an explanation will be given to the case where connection of the forward clutch C1 is achieved through an appropriate quick pressure increase control, smoothly with minimized shock when restarting the engine 1 that has been automatically stopped.

In FIG. 3, a line PL pressure controlled by a primary regulator valve 50 is supplied to the forward clutch C1 via the manual valve 54.

Here, when the solenoid 60 controls the switch valve 58 to an open state by a command of the quick pressure increase control from the controller 7, the line pressure PL passing through the manual valve 54 is supplied to the forward clutch C1 after passing through the large orifice 56. In this case, at a stage where the quick pressure increase control is executed, the accumulator 70 is kept from functioning due to a setting of a spring constant of the spring 74.

Thereafter, when the solenoid 60 controls to shut off the switch valve 58 by a command of finishing the quick pressure increase control from the controller 7, the line pressure PL passing through the large orifice 56 is supplied to the forward clutch C1 via the small orifice 64 at a relatively slow speed. Further, at this stage, since the oil pressure supplied to the forward clutch C1 becomes very high, the oil pressure of the oil passage 66 connected to the accumulator 70 moves the piston 72 upward in the drawing against the urging force of the spring 74. As a result, during operation of the piston 72, an increase in the oil pressure supplied to the forward clutch C1 is suspended, thereby allowing the forward clutch C1 to be engaged very smoothly.

Figure 4:
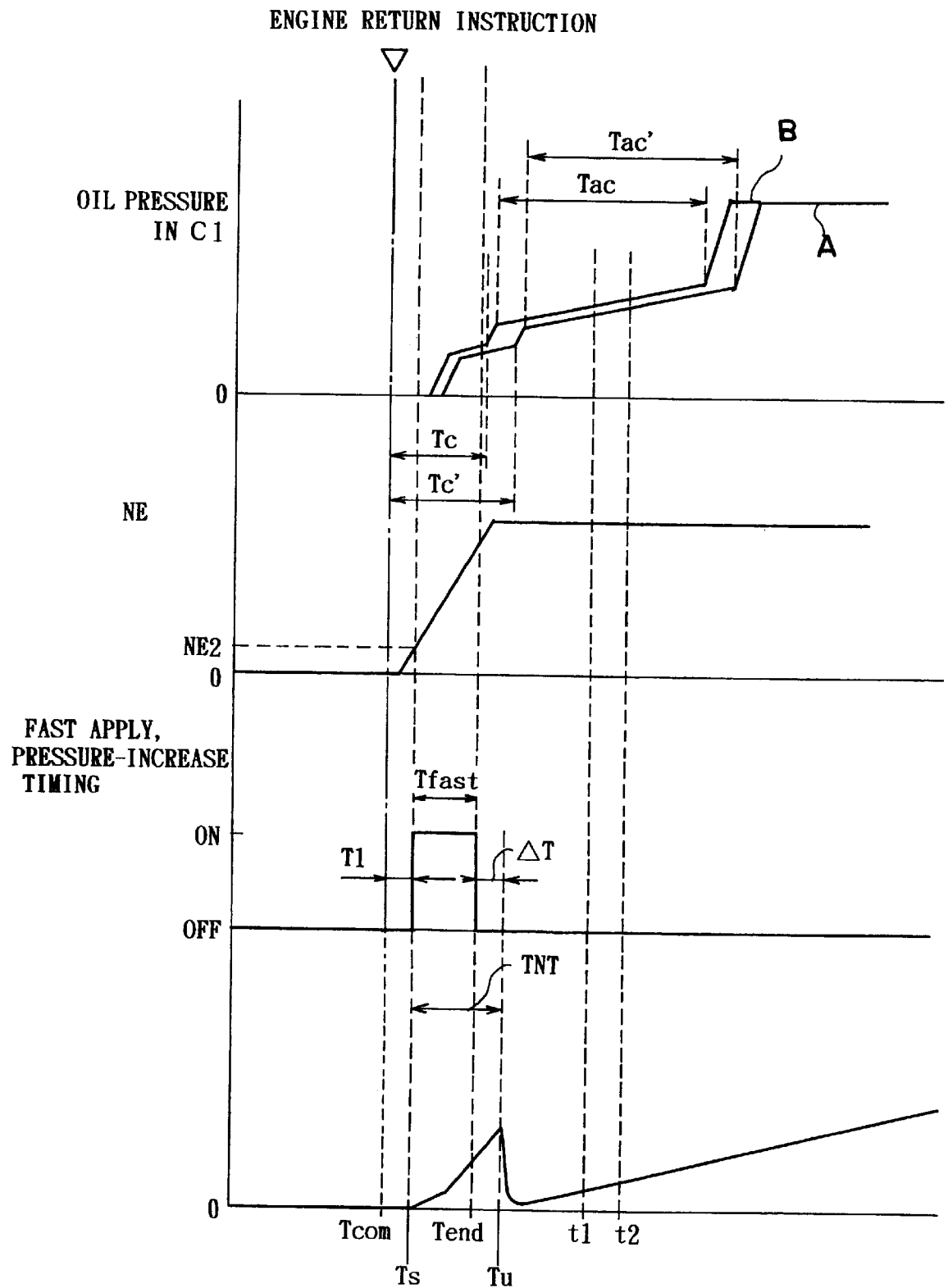
FIG. 4 is a graph showing an oil supply characteristic for a forward gear.

A supply characteristic of the oil pressure to the forward clutch C1 is shown in FIG. 4. In FIG. 4, a line A shows the case where executing the quick pressure increase control is not executed and a line B shows the case where such control is executed, respectively. Further, a portion defined as Tfast indicates a period (a predetermined period) for executing the quick pressure increase control. The period Tfast qualitatively corresponds to a period at which a piston (not shown) of the forward clutch C1 shortens the period for loading a so-called "clutch pack," and the engine revolution corresponds to a period slightly before reaching a predetermined idling rotational speed. In this case, Tc and Tc' correspond to a period taken to load the clutch pack of the forward clutch C1, and Tac and Tac' correspond to a period taken while the accumulator 70 functions.

In the case where the quick pressure increase control is not executed, since the oil is supplied via a route bypassing the switch valve 58, a substantially long time Tc' passes until the clutch pack of the piston in the forward clutch C1 is loaded or "shortened," such that the engagement is completed toward a time t2 after following a path shown by a line A in the drawing. That is, a relation Tc<Tc' is established, and it is understood that a long time is taken for engaging the clutch in the case where the quick pressure increase control is not executed. Accordingly, it causes a delay in starting the engine. Meanwhile, in this embodiment, since the quick pressure increase control is executed for the appropriate time period Tfast, it is possible to complete the engagement of the forward clutch at the time t1, with a relatively small degree of shock.

In this case, as is apparent from FIG. 4, the start timing Ts for the quick pressure increase control is set when the engine revolution (the rotational speed of the oil pump 19) NE becomes a predetermined value NE1. As mentioned above, the quick pressure increase control is not started concurrently with a restart command Tcom of the engine, because of a possibility that the time T1 taken from the state where the rotational speed of the engine 1 is zero to the state where it slightly starts (to reach the value of about NE1) greatly varies depending on the driving conditions.

When starting the quick pressure increase control concurrently with the restart command Tcom of the engine, the forward clutch C1 will complete the engagement during execution of the quick pressure increase control under the influence of the varying engine rotational speed, thus causing a risk of great engagement shock. As the timing greatly varies immediately after start of the engine, it is desirable to avoid such timing. Then, by setting the timing Ts when the rotation of the engine slightly starts increasing to a start timing for the quick pressure increase control, it is possible to realize a stable oil supply control with a small degree of variance, irrespective of a different driving environment.

Here, an explanation will be given with respect to setting the time Tfast (predetermined time) for executing the quick pressure increase control.

As for the vehicle with the automatic stop system mounted thereon, frequently, the vehicle may be required to restart immediately after a stop when approaching an intersection in an urban area, for example. In this case, if the quick pressure increase control is executed in a state where the oil within the oil passage 66 of the forward clutch C1 but not significantly drained, a substantially great shock may be generated. In accordance with the present embodiment, the control device is structured to detect the leaving amount of the oil within the oil passage 66 of the forward clutch C1 and determine the execution time Tfast (including 0) for the quick pressure increase control in accordance with the detected leaving amount of the oil. If it is determined to set the execution time Tfast to 0, the quick pressure increase control itself is not executed.

The leaving amount of the oil may be directly detected, for example, by the pressure sensor provided in the oil passage 66. More simply, however, it can be indirectly detected from the rotational speed of the oil pump 19. In the present embodiment, since the oil pump 19 is directly connected to the crank shaft 1a of the engine 1, it is possible to obtain the rotational speed of the oil pump 19 by detecting the engine revolution NE.

Figure 5:
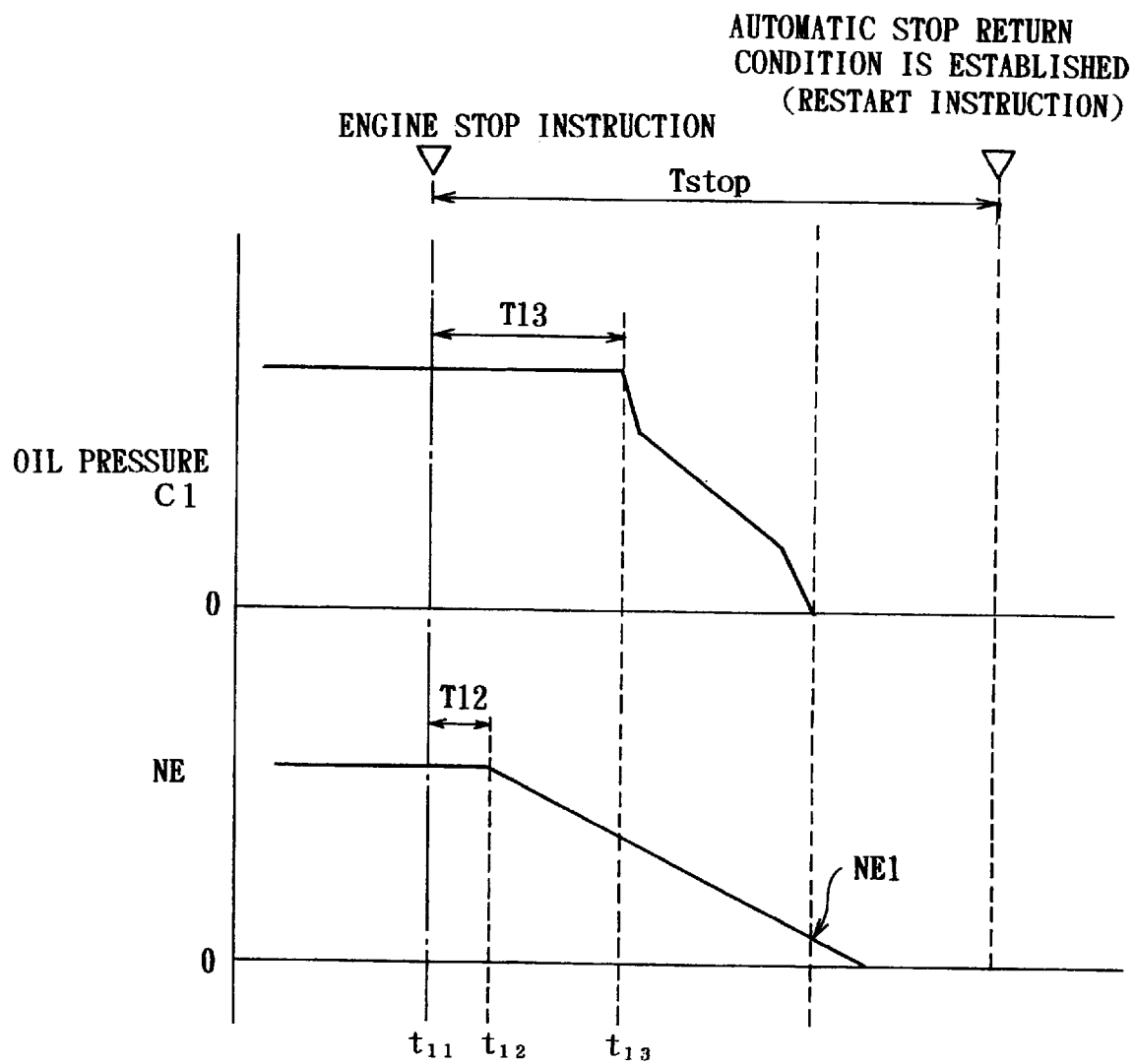
FIG. 5 is a graph showing a relation between a leaving amount of an oil and an engine revolution (a rotational speed of an oil pump)

FIG. 5 shows a relation between a drain characteristic of an oil pressure in the forward clutch C1 and the engine revolution (corresponding to the rotational speed of the oil pump) NE. When the engine stop command is output, the engine revolution NE is gradually decreased from a time t12 after the elapse of a slight delay T12.

On the contrary, the drain characteristic of the oil pressure in the forward clutch C1 is maintained after the stop command of the engine 1 has been output at the time t11 (even if the rotational speed of the oil pump 19 is lowered in the same manner as the engine revolution NE) for a period T13 which is longer than T12. Then it is sharply decreased from a time t13.

Since the characteristic has a relatively high reproducibility on the assumption that the oil temperature is kept unchanged, it can be estimated how much oil has been drawn out from the oil passage 66 at present by obtaining an elapsed time from output of the engine stop command.

Accordingly, by changing and setting the execution time (predetermined time) Tfast for the quick pressure increase control on the basis of the time Tstop from other engine stop command output to the restart command output in conjunction with the characteristic shown in FIG. 5, it is possible to minimize the engagement shock in spite of a condition that the engine 1 is restarted immediately after the automatic stop.

In this case, as is apparent from the characteristic shown in FIG. 5, the engine revolution NE (the rotational speed of the oil pump) is reduced substantially linearly from the time t12 slightly after the time when the engine stop command is output. Accordingly, it is possible to indirectly estimate the leaving amount of the oil from the engine revolution NE.

Next, an explanation will be given likewise with respect to another method for setting the execution time (predetermined time) Tfast for the quick pressure increase control in an optimum manner.

Figures 6, 7:
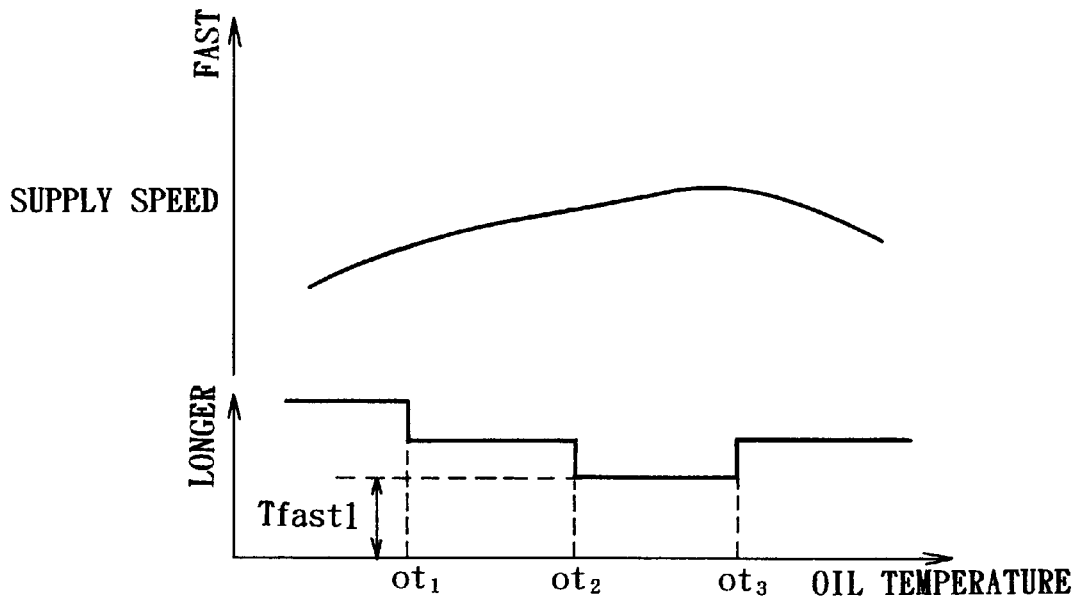
FIG. 6 is a graph showing a relation between an oil temperature, a supply speed of an oil and a time for executing a quick pressure increase control.
FIG. 7 is a map showing a relation of an engine revolution and temperature of an engine cooling water with a time period for executing a quick pressure increase control.

A graph in an upper stage of FIG. 6 shows a relation between a temperature and a supply speed of an oil in the automatic transmission. The oil in the automatic transmission has a viscosity that varies with temperature. At a low temperature (for example, at 20° C. or less), as the viscosity of the oil becomes high, oil is supplied to the forward clutch C1 at a slower rate compared with the case at a normal temperature even when the quick pressure increase is executed for the same time period. Accordingly, it is necessary to execute the quick pressure increase control at a low temperature for a longer time than the case at the normal temperature. On the contrary, when the oil temperature becomes higher than the normal state, for example, at a temperature of 80° C. or greater, the viscosity of the oil is excessively small and the leaking amount from each of the seal portions and the like in the valve body is increased, so that an amount of the oil supplied to the forward clutch C1 tends to be reduced even when the quick pressure increase control is executed for the same time.

Accordingly, as shown in a lower stage of FIG. 6, in conjunction with the property, for example, by setting the oil temperatures to ot1, ot2 and ot3 as the boundary with respect to the execution time Tfast1 for the quick pressure increase control at the normal temperature, when an actual executing time Tfast is set by multiplying a certain coefficient or adding (or subtracting) a certain time therewith (or therefrom), it is possible to quickly engage the forward clutch C1 in a state corresponding to the driving environment, while preventing excessive engagement shock.

In this case, it is not always necessary to directly detect the oil temperature in the automatic transmission by the oil temperature sensor. For example, oil temperature can be indirectly detected using the information from the sensor 47 for the engine cooling water temperature Tcol mounted on the vehicle. Further, the determination of Tfast1 is not limited to two or three stages of oil temperature as mentioned above. However, it may be possible to depend on the oil temperature (along an inherent property as much as possible).

Further, accurate setting can be performed by combining the execution time set in correspondence to the oil leaving amount mentioned above, with the adjustment of the execution time for the quick pressure increase control with respect to the oil temperature. For example, when setting the execution time in accordance with the leaving amount, increasing and reducing the execution time Tfast in accordance with the oil temperature, and mapping in the manner shown in FIG. 7, it is possible to set an optimum execution time in correspondence to current driving conditions.

In the embodiment mentioned above, the control device is configured to execute the quick pressure increase control by adjusting a communication degree of the oil passage to the forward clutch C1 by using the switch valve 58, however, a method of quickly supplying the oil to the forward clutch C1 is not limited to this method.

For example, in the embodiment mentioned above, the control device is configured to control the line pressure PL with the primary regulator valve 50, however, the structure may be made such as to set a control value (a control target value) of the line pressure PL adjusted by the line pressure control solenoid 52, higher than the normal value. In this case, an aspect of the quick pressure increase control is determined by a multiplying the pressure control value of the line pressure LP and the time of maintaining the high pressure control value.

Further, in the embodiment mentioned above, the structure is configured to switch the supply degree of the oil to the forward clutch C1 in an on-off manner. However, when the control device is configured to duty control the switch valve 58 by the duty solenoid, it is possible to more finely set the supply degree (the control target pressure for the quick pressure increase control) by the switch valve 58, for example. That is, it is possible to realize the control by the multiplying between the quick pressure increase control and the executing time also by means of the switch valve 58. Further, of course, it is possible to combine the control due to changing of the control pressure value of the line pressure LP with the control due to the switch valve 58.

Next, an explanation will be given on a control flow with respect to the quick pressure increase control executed by the controller 7 mentioned above.

Figure 1:
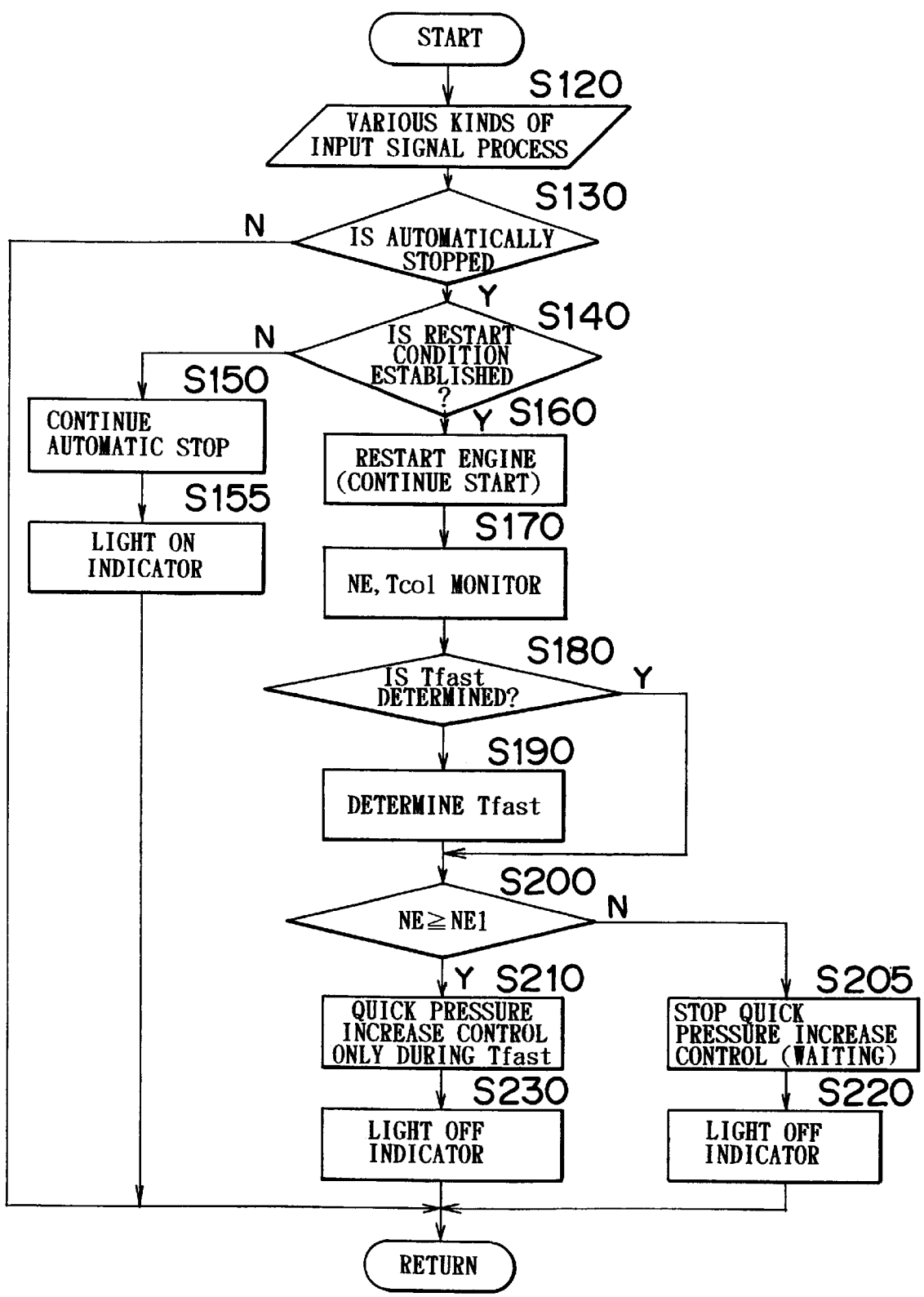
FIG. 1 is a flow chart of a control executed when restarting an engine of a vehicle in accordance with a first embodiment.

In FIG. 1, in step S120, an input signal from each of the sensors is processed. In step S130, it is determined whether or not the engine is currently under an automatic stop state due to an economic running mode. When the engine is under the automatic stop state, the process goes to step S140 where it is determined whether or not a restart condition under the automatic stop state is established. In the case where the restart condition is not established, the process goes to step S150 where the automatic stop state is maintained, and in step S155, an indicator (not shown) is turned on.

On the contrary, when it is determined that the restart condition has been established, the process goes to step S160 where the engine is restarted. Next, in step S170, an engine revolution (a rotational speed of the oil pump) NE as an index for detecting the oil leaving amount and an engine cooling water temperature Tcol as an index for detecting the oil temperature are monitored, and in accordance with these values, in step S190, the execution time Tfast for the quick pressure increase control previously set by a map of NE-Tcol as shown in FIG. 7 is determined.

Thereafter, in step S200, it is determined whether or not the engine revolution NE reaches a predetermined value NE1, and if NE<NE1, the process goes to step S205 and S220 where the quick pressure increase control is stopped (a waiting state: an indicator is turned off). If NE≧NE1, the process goes to step S210 where the quick pressure increase control is executed for the time Tfast set in the step S190 and in step 230, the indicator is switched off after the quick pressure increase control time Tfast expires.

In the case where the execution time Tfast for the quick pressure increase control is set to 0 in step S190, the quick pressure increase control is not substantially executed even during step S210.

In the control flow, the control device is configured to finely set the execution time Tfast for the quick pressure increase control in accordance with the leaving amount of the oil and the oil temperature. However, in order to further simplify the control, the control device can be configured, for example, to on/off, that is, execute or not execute the quick pressure increase control in accordance with the leaving amount of the oil or the oil temperature.

Further, for example, the control device can be configured such that if the shift lever is at a driving position such as D, the engine is not automatically stopped even when the vehicle stops, and only in case of the non-drive position like N, the engine is automatically stopped. In this case, it is necessary to add "a non-drive position" to the stop conditions and "the shift lever is not at the non-drive position" is added to the restart conditions in step S140.

The leaving amount of the oil at the stop time of the engine can be estimated and detected in accordance with the time elapsed between the automatic stop command for the engine, and the output of the restart command. That is, it is possible to estimate and detect the leaving amount of the oil in accordance with the time elapsed between the command to automatically stop the engine upon establishment of the stop condition at N position, and the command to restart the engine upon the position transfer from N to D, or in accordance with the time elapsed between the command to automatically stop the engine upon establishment of the predetermined stop condition by the position transfer from D to N, and the command to restart the engine upon establishment of the restart condition by the position returning to D.

In accordance with the present embodiment, since the control device is configured to change a method of the oil supply in accordance with at least one of the leaving amount of the oil in the automatic transmission and the oil temperature, a predetermined clutch in the automatic transmission can be engaged quickly with a small engagement shock, eliminating the need of such devices as the large-sized accumulator and the large-sized battery.

Next, a second embodiment in accordance with the present invention will be described below.

Figure 8:
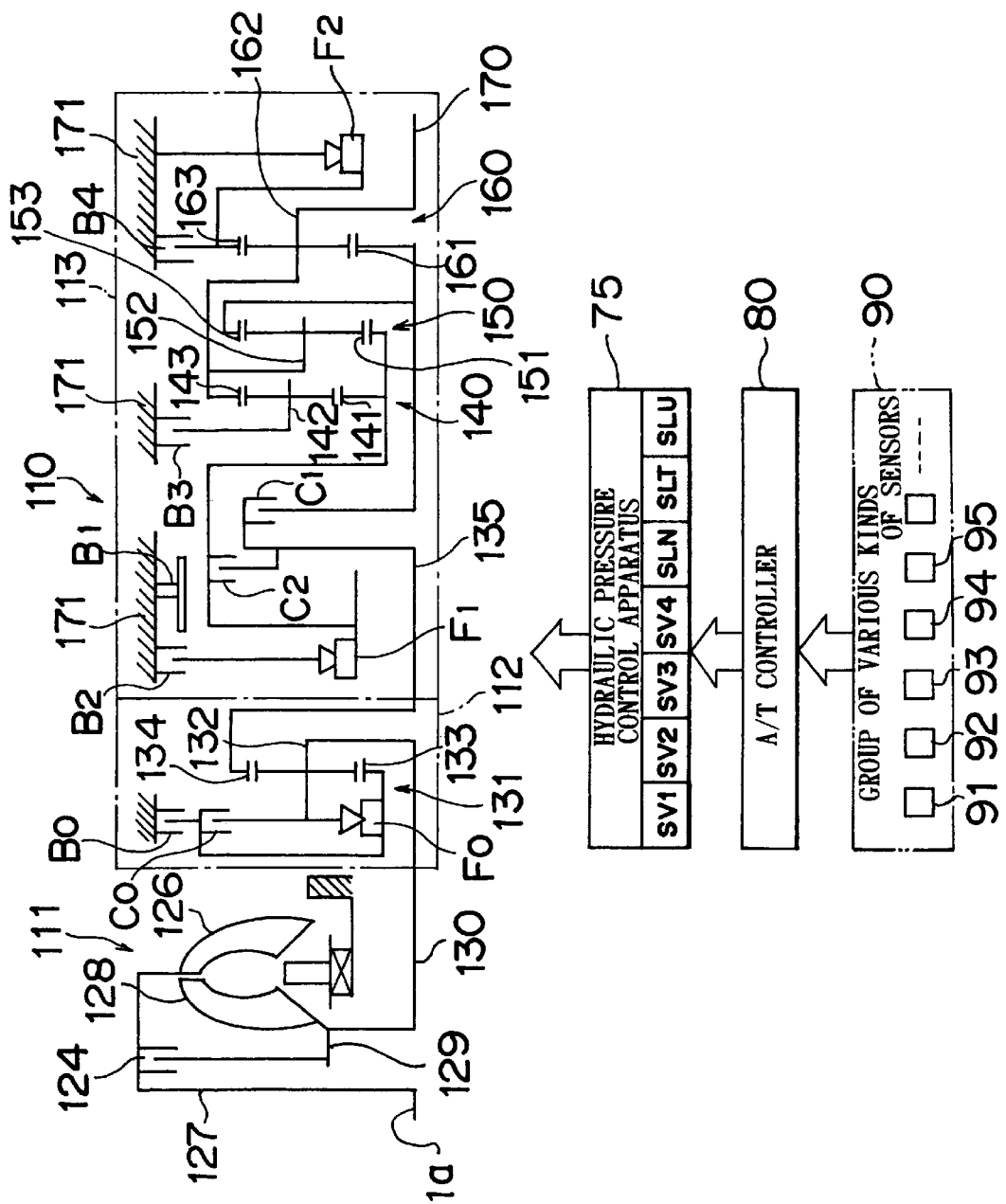
FIG. 8 is a schematic view of an automatic transmission in an automatic transmission system.

The present embodiment is applied to a drive system (FIG. 2) structured in the same manner as that of the first embodiment. FIG. 8 is a skeleton view of an automatic transmission in accordance with the present embodiment.

As shown in FIG. 8, the A/T 2 is provided with a torque converter 111, a sub transmission portion 112 and a main transmission portion 113.

The torque converter 111 is provided with a lock up clutch 124. The lock up clutch 124 is provided between a front cover 127 integrally provided with a pump impeller 126 and a member (hub) 129 integrally provided with a turbine liner 128.

The crank shaft 1a of the engine 1 shown in FIG. 2 is connected to the front cover 127. An input shaft 130 connected to the turbine liner 128 is connected to a carrier 132 of a planetary gear mechanism 131 for an overdrive constituting the sub transmission portion 112.

A clutch C0 and a one way clutch F0 are provided between the carrier 132 and a sun gear 133 in the planetary gear mechanism 131. The one way clutch F0 is engaged such that the sun gear 133 normally rotates relative to the carrier 132 (rotates in a rotational direction of the input shaft 130).

Meanwhile, there is provided a brake B0 for selectively stopping the rotation of the sun gear 133. Further, a ring gear 134 corresponding to an output element of the sub transmission portion 112 is connected to an intermediate shaft 135 corresponding to an input element for the main transmission portion 113.

In the sub transmission portion 112, since the whole of the planetary gear mechanism 131 integrally rotates in a state where the clutch C0 or the one way clutch F0 is engaged, the intermediate shaft 135 rotates at the same speed as that of the input shaft 130. Further, in the state where the brake B0 is engaged to stop the rotation of the sun gear 133, a speed of the ring gear 134 is increased with respect to the input shaft 130 so as to normally rotate. That is, the sub transmission portion 112 can set two-stage switching between high and low.

The main transmission portion 113 is provided with three sets of planetary gear mechanisms 140, 150 and 160, which are connected in the following manner.

A sun gear 141 of the first planetary gear mechanism 140 and a sun gear 151 of the second planetary gear mechanism 150 are integrally connected to each other, and a ring gear 143 of the first planetary gear mechanism 140, a carrier 152 of the second planetary gear mechanism 150 and a carrier 162 of the third planetary gear mechanism 160 are connected. Further, an output shaft 170 is connected to the carrier 162 of the third planetary gear mechanism 160. Still further, the ring gear 153 of the second planetary gear mechanism 150 is connected to the sun gear 161 of the third planetary gear mechanism 160.

In the gear train of the main transmission portion 113, it is possible to set a backward stage and four forward stages, and clutches and brakes therefor are provided in the following manner.

That is, a forward clutch C1 is provided between the ring gear 153 of the second planetary gear mechanism 150, and the sun gear 161 of the third planetary gear mechanism 160 and the intermediate shaft 135, and a clutch C2 is provided between the sun gear 141 of the first planetary gear mechanism 140, and the sun gear 151 of the second planetary gear mechanism 150 and the intermediate shaft 135.

Further, a brake B1 is arranged for stopping a rotation of the sun gears 141 and 151 of the first and second planetary gear mechanisms 140 and 150. The one way clutch F1 and the brake B2 are arranged between the sun gears 141 and 151 and the casing 171 in series. The one way clutch F1 is structured to engage when the sun gears 141, 151 intend to inversely rotate (rotate in an opposite direction to the rotational direction of the input shaft 135).

A brake B3 is provided between the carrier 142 of the first planetary gear mechanism 140 and the casing 171. Further, a brake B4 and a one way clutch F2 are arranged with respect to the casing 171 in parallel as an element for stopping the rotation of the ring gear 163 of the third planetary gear mechanism 160. In this case, the one way clutch F2 is structured to engage when the ring gear 163 intends to inversely rotate.

In the A/T 2, it is possible to change the speed corresponding to one backward stage and five forward stages as a result. An engagement operation table of each of the clutches and the brake (a friction device) for setting the gear position will be described in FIG. 9. In FIG. 9, a symbol O denotes an engagement state, a symbol • denotes a state of engaging only when an engine brake should be secured, a symbol Δ denotes a state of engaging but is not associated with a power transmission, and a blank denotes a release state, respectively.

Figure 10:
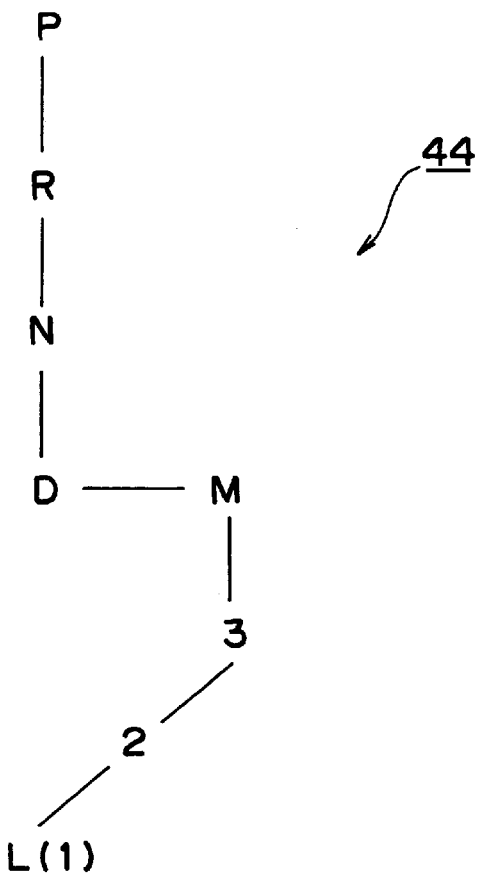
FIG. 10 is a view showing an arrangement of a gate in a shift position.

In FIG. 9, when the shift of the automatic transmission is normally at the D position, it is controlled by the controller 7 so as to automatically start at a first speed. In recent years, various methods of controlling the automatic transmission have been suggested and practiced. For example, a gate type automatic transmission as shown in FIG. 10 has been suggested, and this is structured to allow for change in shift operation such as shift up and a shift down by means of buttons 190, 192 provided in a steering wheel 180 shown in FIG. 11 by moving the shift lever 44 to a gate of "M" (manual) disposed rightward of the shift position "D" in addition thereto.

Accordingly, in this device, the driver is allowed to manually change the gear of the automatic transmission freely, for example, the vehicle can be started from the gear position engaged with the second speed in the "M" mode. Additionally, it is clearly understood that the vehicle can be started from the third speed and the fourth speed (although this may deteriorate the starting performance).

That is, the vehicle is not always started from the first speed in the D position but from any other speed depending on the manual operation of the driver.

As shown in FIG. 9, when normally shifting from the N position to the first speed in the D position, it is sufficient to supply the oil only to the clutch C1. However, when shifting from the stop state of the engine 1 to the first speed in the D position by restarting, the clutch C0 should be simultaneously engaged with clutch C1. In the manual mode, it is necessary to further engage the brake B4 so as to secure the engine brake even when started likewise at the first speed. In the same manner, in case of starting at the second speed and starting at the third speed, the type and the number of the clutches and brakes to be engaged may vary depending on the time both for normal driving and securing the engine brake.

Accordingly, depending on the respective cases, it is necessary to increase a supply amount of the oil for executing the quick pressure increase control.

When employing a continuously variable transmission, the need for starting at the gear ratio other than the lowest one is considered. For this, the quick pressure increase control is executed by focusing on the amount of the oil supplied to the hydraulic sheave variable with the achieved "speed bear ratio".

An engagement or disengagement of each of the clutches and brakes (friction device) shown in FIG. 8 is executed by driving solenoid valves SV1, SV2, SV3, SV4, SLN, SLT and SLU within the hydraulic control apparatus 75 controlled on the basis of commands from the A/T controller 80.

In this case, the SV1, SV2 and SV3 each denoting a solenoid valve for shifting, SV4 denotes a solenoid valve for operating an engine brake, the SLN denotes a solenoid valve for controlling a back pressure of the accumulator, the SLT denotes a solenoid valve for controlling a line pressure and the SLU denotes a solenoid valve for a lock up.

The A/T controller 80 is linked with the controller 7 as mentioned above, and it is structured such that signals from a group of various kinds of sensors 90 (for example, a vehicle speed sensor 91, an engine revolution sensor 92, a water temperature sensor 93, an oil temperature sensor 94, a brake sensor 95 and the like) are input to control the solenoid valves and the like such that the respective clutches and the brakes (friction device) can be engaged or disengaged.

In this case, since the structure of engaging the forward clutch C1 in the A/T 2 is identical to that of the first embodiment shown in FIG. 3, the explanation thereof will be omitted.

Further, in the present embodiment, a predetermined restart condition for restarting the automatically stopped engine 1 includes, for example, a case that any one of the conditions "a vehicle speed 0", "a foot brake on" and "an accelerator off" has not yet established. Further, in case of automatically stopping only at the N range, the engine is restarted assuming that there exists an intention of "starting" when the shift position is changed from "N" to "D". In this case, when changing the shift position from "N" to "D", it is assumed to have another condition, for example, the engine does not start when the brake is not applied to the wheel. Additionally, the engine is automatically started or "returned" if the charging amount (SOC: State of Charge) of the battery is insufficient.

In accordance with the first embodiment as mentioned above, the quick pressure increase control is executed in accordance with the leaving amount of the oil in the oil passage 66 of the clutch C1. Additionally, in the present embodiment, the quick pressure increase control is learned.

For example, the engagement characteristic is gradually changed (as the elapse of time) due to deterioration or wear of the clutch pack (not shown). Therefore the controllability is likely to be degraded so as to cause sudden engagement of the clutch or lengthen the time required for engaging the clutch while executing the quick pressure increase control at the same pressure for the same time. Further, the property of the oil is influenced (hardened or softened) by the ambient temperature and the like during the oil supply, and the oil is not always supplied at a constant pressure and flow rate. Therefore the controllability is likely to be degraded if the quick pressure increase control is executed uniformly for the execution time Tfast.

That is, the execution time Tfast for the quick pressure increase control is required to be set to a value appropriately corresponding to the condition. In this embodiment, the oil supply states in the oil passage 66 of the forward clutch C1 immediately before starting of the engine, namely, the leaving amount and the temperature of the oil in the oil passage 66 of the forward clutch C1 are detected to determine the execution time Tfast (including 0) for the quick pressure increase control in accordance with the detected values. The quick pressure increase control is further configured to determine whether or not the execution mode is appropriate. Then the learning control of the execution mode for the quick pressure increase control is executed based on the judgment result.

In this case, the exact judgment with respect to adequacy of the execution mode for the quick pressure increase control is executed on the basis of a time ΔT elapsing from a time Tend when the command for finishing the quick pressure increase control is detected to a time Tu when the clutch actually starts the engagement (to be described later in detail).

Further, in this case, in order to consider the oil supply state (the leaving amount of the oil) in the clutch oil passage immediately after starting of the engine, a lapse time TST starting with a command to automatically stop the engine is counted and utilized.

The execution time Tfast for the quick pressure increase control is set in accordance with the leaving amount of oil as described above.

An explanation will be given with respect to a method for determining whether or not the execution mode for the quick pressure increase control is adequate and executing the learning control of the execution mode for the quick pressure increase on the basis of the judgment.

As shown in FIG. 4, after executing the quick pressure increase control, the forward clutch C1 quickly shortens in pack clearance and starts engagement at a time when the pack clearance is completely eliminated. In this case, the pack clearance elimination is determined (the pack is shortened) after the time Tu when the turbine rotational speed NT is temporarily reduced.

Assuming that the time elapsing from the time Tend when the command for finishing the quick pressure increase control is output to the time Tu when the turbine rotational speed NT is temporarily reduced (the pack clearance is eliminated) is set to $\Delta T$, the time $\Delta T$ corresponds to the value obtained by subtracting the time Tfast when executing the quick pressure increase control from the time TNT elapsing from the start time Ts for the quick pressure increase control to the time Tu when the pack clearance is eliminated.

The time $\Delta T$ is detected to determine whether or not the detected value is adequate. That is, when the time $\Delta T$ is greater (longer) than a predetermined value TG1, it may be determined as "excessive pack clearance".

As mentioned above, it is determined whether or not the time $\Delta T$ is adequate on the basis of the time $\Delta T$ elapsing after the quick pressure increase control until the clutch pack clearance is completely shortened. Then the learning control is executed in accordance with the judgment so as to be reflected in the execution time Tfast for the next quick pressure increase control.

Here, a method of determining with respect to adequacy of the time $\Delta T$ will be described further in detail.

For example, it is determined whether or not the time $\Delta T$ is greater (longer) than the predetermined value (predetermined time) TG1 as mentioned above. In the case where the time $\Delta T$ is greater (longer) than the predetermined value (predetermined time) TG1, it is determined that the clutch pack can be further shortened (wide clutch pack clearance). On the contrary, in the case where the time $\Delta T$ is smaller (shorter) than the predetermined value (predetermined time) TG1, it is determined that the clutch pack clearance is within the predetermined (good) range.

Further, the adequacy of the time $\Delta T$ may be determined on the basis of its time length corresponding to the time TNT as mentioned above.

Still further, the adequacy of the time $\Delta T$ may be determined by previously preparing a given time range $\Delta Ttgt1$ to $\Delta Ttgt2$ (not shown) allowing ideal clutch engagement (having an ideal pack clearance), and determining if the actual time T is within the ideal time range $\Delta Ttgt1$ to $\Delta Ttgt2$ ($\Delta Ttgt1 < \Delta Ttgt2$).

Next, an explanation will be given with respect to a method of executing a learning control of the execution mode of the quick pressure increase on the basis of the judgment.

When it is determined that the time $\Delta T$ was greater (longer) than the predetermined value (predetermined time) TG1 ($\Delta T > TG1$), the execution time Tfast for a subsequent or "next" quick pressure increase control is set to be longer than that for the present control, in accordance with the judgment that there exists excessive clutch pack clearance. When the execution time Tfast for the quick pressure increase control is lengthened, the pack clearance becomes smaller owing to the extension of the time for quick pressure increase control. Accordingly, the clutch is engaged more quickly after the quick pressure increase control, thus avoiding delay in the start time and improving a response.

On the contrary, in the case where the time $\Delta T$ is equal to or less than the predetermined value (predetermined time) TG1 ($0 < \Delta T \leq TG1$), or in the case where an ideal range ($0 < \Delta Ttgt1 \leq \Delta T \leq \Delta Ttgt2$) is set, it is determined that a sufficient pack clearance exists as long as the time $\Delta T$ is within the ideal range, and the execution time Tfast for the subsequent quick pressure increase control is left unchanged.

Here, in the case where the time $\Delta T$ is too small (too short) to fall within the ideal time range ($\Delta T < \Delta Ttgt1$) or time $\Delta T$ is equal to or less than 0 ($\Delta T \leq 0$), it means that completion of the quick pressure increase control is too late, that is, the state immediately before the sudden clutch engagement or the state of being already engaged. Then the setting is changed (leaning control) to shorten the execution time Tfast for the subsequent quick pressure increase control.

That is, the quick pressure increase control time Tfast is changed in accordance with the time $\Delta T$ (the execution mode is subjected to leaning control).

The quick pressure increase time Tfast may be determined according to a predetermined map in accordance with the time $\Delta T$, or may be previously set, for example, X % with respect to the time $\Delta T$. Further, it may be given by a formula of Tfast=Tfast×M ($\Delta T - TG1$) where X and M are constants.

Further, it is possible to suitably change a gain corresponding to a magnitude of the time $\Delta T$ and a condition thereof.

Still further, in accordance with the present invention, the control is executed to change the quick pressure increase control time Tfast on the basis of the time $\Delta T$. However, it is not limited to the execution time Tfast for the quick pressure increase control. The learning may be realized by changing the control target pressure and the multiplication between the control target pressure and Tfast. When the control target pressure is set to a higher value, the pack clearance can be controlled to contract more quickly. On the contrary, when the control target pressure is set to a lower value, it is possible to lengthen the time between completion of the quick pressure increase control and the start of the engagement.

Further, the learning control mentioned above may be executed at every shift (gear stages) achieved at restart of the engine.

It is preferable to execute learning control at every gear stage because restarting is not always initiated by a clutch connection from the first speed in the position D. Further the type and the number of the friction devices to be engaged concurrently with restarting may vary with the gear stage, a flow rate of the oil required for connecting the clutch may accordingly vary when starting at a speed other than the first speed. Therefore, more suitable learning control can be executed by conducting the learning control at every type of the gear stage achieved at restarting.

Further, even in the same gear stage, preferably the learning control is differentiated on the basis whether or not the friction device (B1, B4, C0 and the like) engaged for securing the engine brake is simultaneously engaged with C1 at restarting.

Specifically in this case, it is sufficient to set and change, for example, a gain in the learning control on the basis of whether or not the friction device engaged for securing the engine brake is engaged at restarting.

Here, in the continuously variable transmission, the control device is configured to learn and control at every "speed change ratio".

As shown in FIG. 12, an excellent learning process can be conducted, for example, by dividing the oil temperature range into three groups, equal to θ1 or less, between θ2 and θ3, and to equal to θ4 or greater, at every stop gear stage and by mapping an optimum learning threshold (for example, TG1) on the basis whether or not the friction device for securing the engine brake is engaged.

Here, an explanation will be given with respect to an execution environment for executing the learning control in accordance with the present embodiment.

First, the learning control is executed only when the engine torque TE (not shown) is stable at restarting the engine.

Basically, the time ΔT as a reference value for executing the learning control is a latter half portion of the engine restart, and the engine torque TE is near the idling state since the engine revolution NE is near the idling rotational speed. However, in the case where the engine torque TE is shifted due to depression of the accelerator, it is probable that an accurate learning value cannot be set. The learning process, thus, is not executed.

In this case, detection of the engine torque TE can be estimated based on the engine revolution NE and the throttle opening.

Secondly, the learning control is executed only when the temperature of the oil (the oil temperature) is within the predetermined range. This is because an accurate learning result cannot be obtained because when the oil temperature is out of the predetermined range, its properties may change (harden or soften). The same effect also occurs in the case where the engine stops for a long time and starts thereafter, when the ambient temperature is low, and when the oil temperature increased excessively high in summer time, for example.

Here, execution of the quick pressure increase control is restricted on the basis of the oil. However the temperature (threshold) for executing the learning control can be set to be different from that for executing the quick pressure increase control, such that reliability is further improved by executing learning control only at the more suitable oil temperatures (stable oil temperatures).

Thirdly, the learning control may restrict execution of the learning control by a water temperature in the engine.

For example, the control device may be configured to restrict execution of the learning control by the temperature of the water in the engine, similar to the operation using oil temperature. The influence of dragging in the engine can be removed by preventing execution of the learning control when the water temperature is low.

Fourthly, the learning control is changed according to the oil supply state (the leaving amount of oil) in the oil passage immediately before restarting of the engine.

If the lapse time TST starting with a command to stop the engine or the time Tstop (see FIG. 5) starting with a command to stop the engine and ending with a command to restart the engine is known, it is possible to estimate how much oil has left the oil passage (i.e., the remaining amount of oil).

Therefore, while considering the characteristic as shown in FIG. 5, the learning control is changed or set based on the lapse time TST starting with a command to stop the engine or the time Tstop (see FIG. 5) starting with a command to stop the engine and ending with a command to restart the engine.

This is because, for example, the quick pressure increase control executed when there is oil remaining in the oil passage is inappropriate as the basis for learning the following quick pressure increase control.

Hence, in this embodiment, it is determined whether to conduct the learning process of the quick pressure increase control or not according to the remaining amount of oil in the oil passage. For such determination, the lapse time TST starting with a command to stop the engine is counted. Unless the lapse time TST has reached the predetermined time T1, the learning control is not executed.

If the lapse time TST is equal to or shorter than the predetermined time T1, the learning mode may be determined in accordance with the lapse time TST. For example, as will be shown below, the learning modes of the execution time periods (TfastA, TfastB, TfastC, TfastD) of the quick pressure increase control under the respective conditions may be determined based on the relationship between the lapse time TST and the predetermined time periods T1, T2 and T3 (T1>T2>T3).

Condition A: TST≧T1 . . . TfastA
Condition B: T1>TST≧T2 . . . TfastB
Condition C: T2>TST≧T3 . . . TfastC
Condition D: T3>TST . . . TfastD For example, as the learning modes for the aforementioned conditions A through D, the following can be mentioned.

(1) The learning control is executed only under the conditions A through C. The execution of the learning control is prohibited under the condition D.

(2) Under the conditions A through D, the learning control is executed while restricting a change in execution time (TfastA through TfastD) of the quick pressure increase control with respect to a preceding learning value. In this case, as regards TfastA through TfastD, the maximum allowable value of the change with respect to the preceding learning value is set such that the following relationship is established: TfastA>TfastB>TfastC>TfastD. Here, if the maximum allowable change with respect to a preceding value of TfastD is set to, for example, zero, the learning process is virtually prohibited under the condition D.

(3) Only when the time for stopping the engine is reproductively located within the respective execution time periods of the quick pressure increase control (only when the conditions A through D are reproduced), TfastA through TfastD are handled as learning values to be adopted. This mode focuses on the fact that the learning value is trustworthy if the time periods for stopping the engine are within the same range.

(4) The execution time TfastD for the quick pressure increase control under the condition D is prevented from being learned. The execution time periods TfastB and TfastC for the quick pressure increase control under the conditions B and C are multiplied by respective coefficients and utilized to determine a learning value of TfastA (Instead of directly learning TfastB and TfastC, they are utilized to determine a learning value of TfastA next time).

Accurate learning control can be executed by limiting the environment at the execution thereof as mentioned above.

Finally, the flow of the present embodiment will be described referring to a control flow.

Figure 13:
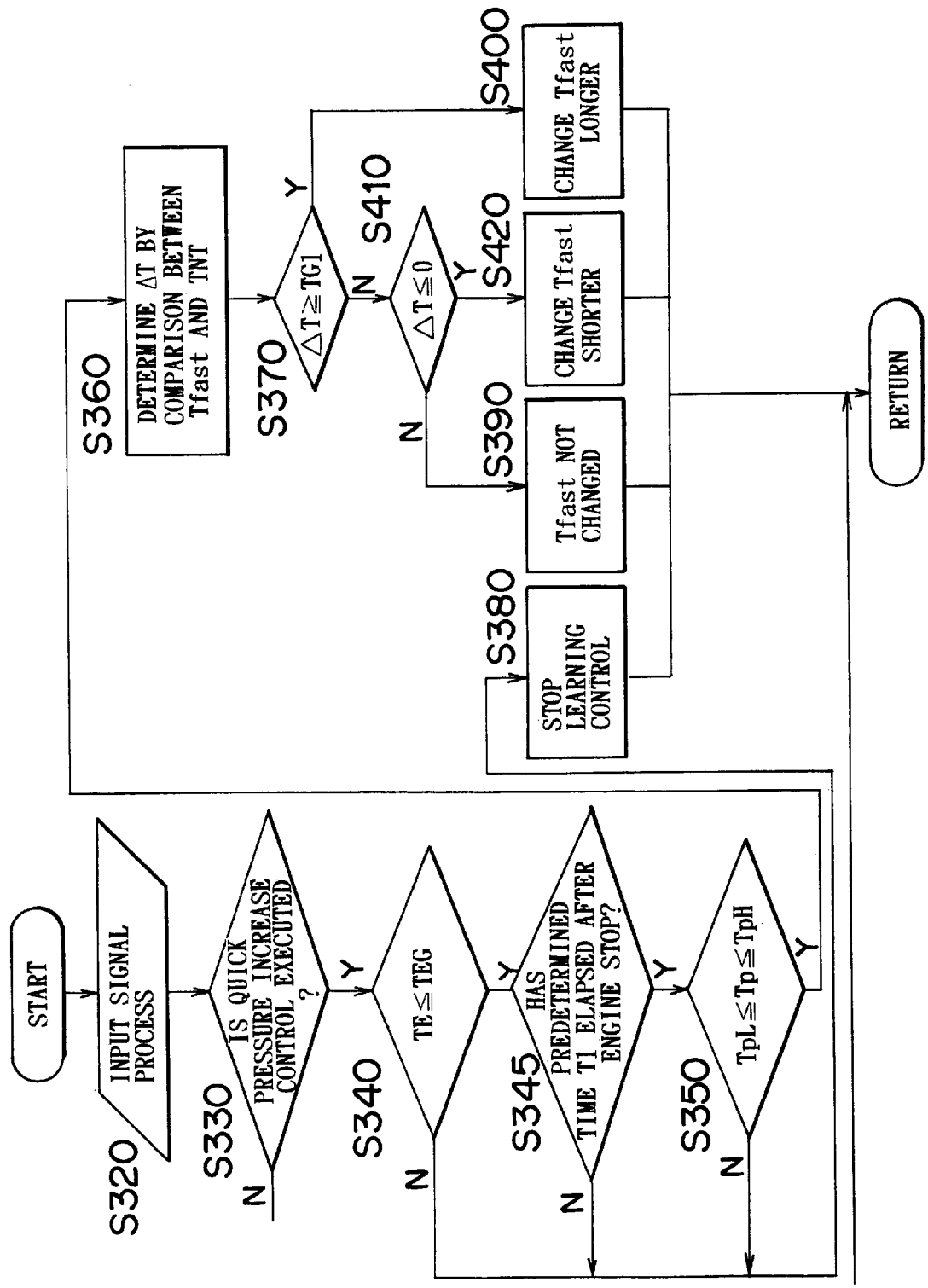
FIGS. 13 and 14 are flow charts of a control in accordance with a second embodiment.
Figure 14:
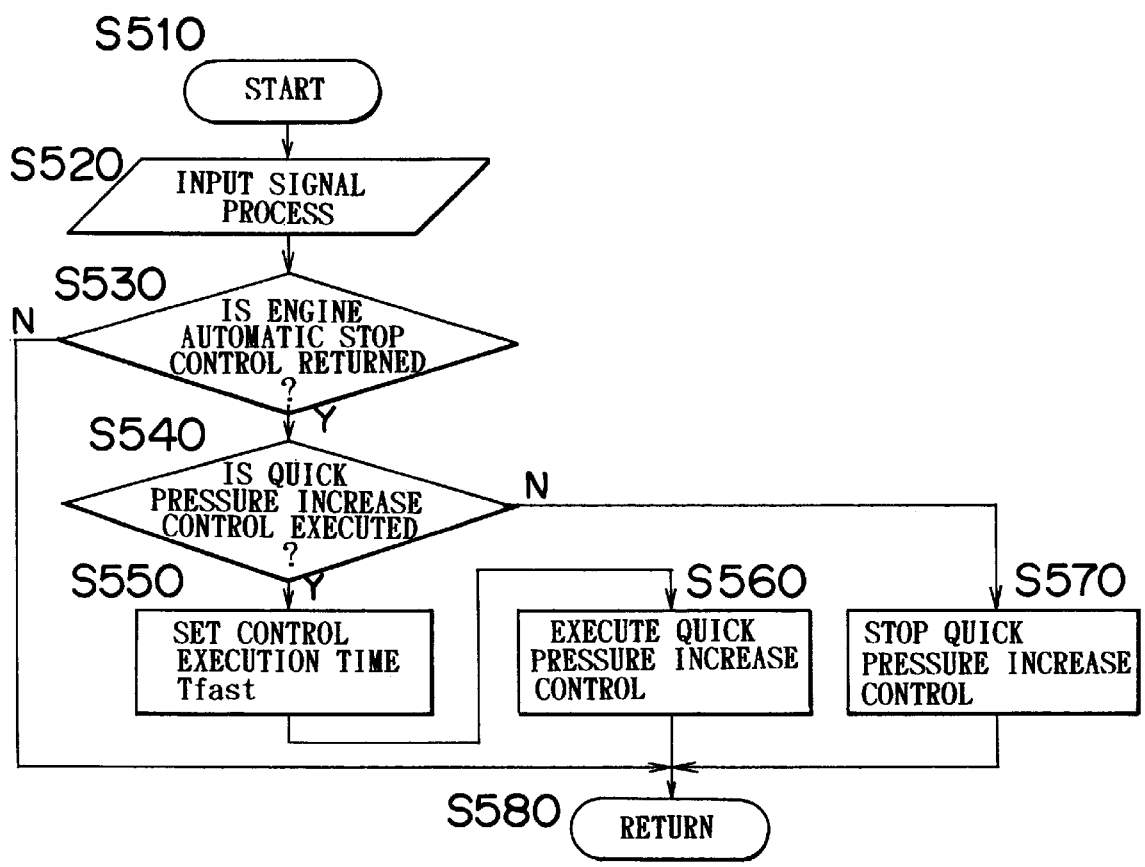

FIG. 13 shows a control flow for executing the learning control, and FIG. 14 shows a control flow for changing the time Tfast for the quick pressure increase control on the basis of the learning value obtained by the learning control of FIG. 13.

In FIG. 13, in step S320, the input signal from each sensor is processed by the controller 7 and the A/T controller 80 linked therewith. When the various signals are processed and the restart condition is established, the process proceeds to step S330 where the engine is restarted and the quick pressure increase control is executed. In step S330, if the quick pressure increase control is not executed because the leaving amount of the clutch is small as mentioned above, the learning control is not executed (can not be executed), then it is returned.

In step S340, it is determined whether or not the engine torque TE is stable. That is, it is determined whether or not the engine torque TE is equal to or less than the predetermined engine torque TEG corresponding to the judgment standard whether or not it is unstable.

Engine torque TE is determined to be stable when the engine torque TE during engine restart (the return control) is equal to or less than the engine torque TEG. If it is determined that the engine torque TE is unstable, the process proceeds to step S380 where the learning control is stopped and returned.

In step S345, as is the case with step S340, as the postulate in executing the learning control, it is determined whether or not the lapse time TST starting with a command to stop the engine has exceeded the predetermined time T1. If TST<T1, it can be judged that oil has not been drained from the oil passage. Therefore, the process proceeds to step S380 where the learning control is suspended. Then the process returns to the initial step.

In step S350, as a prior condition for executing the learning control in the same manner as step S340, it is determined whether or not the oil temperature Tp of the automatic transmission falls in the range between a lower limit value TpL and an upper limit value TpH. Since the oil is frequently hardened as mentioned above when the oil temperature is low (Tp<TpL) and an accurate result can not be expected even when executing the leaning control, the process proceeds to step S380 and the learning control is stopped. When the oil temperature is high (TpH<Tp), an accurate result can not be likewise expected, thus the learning control is stopped.

Here, it may be determined only whether or not the oil temperature Tp of the automatic transmission is equal to or higher than the lower value TpL (TpL≦Tp).

In step S360, a time TNT elapsing from the start time for the quick pressure increase control to the time Tu when the clutch pack clearance is shortened (the time when the turbine rotational speed NT is temporarily dropped down) is compared with the execution time Tfast for the quick pressure increase control, and the time ΔT is calculated. In this case, as mentioned above, the time ΔT corresponds to a time after the finish command for the quick pressure increase control until the clutch pack is completely shortened (the time until the pack clearance is eliminated). In step S370, it is determined whether or not the time ΔT is equal to or greater than the predetermined value TG1[m]. The predetermined value TG1[m] in this case corresponds to a threshold set on the basis of the gear stage, necessity of securing the engine brake, and the oil temperature. In the case where the time ΔT is equal to or greater than the predetermined value TG1[m], it is determined that "the pack clearance is wide (sufficient)", and the setting of the learning control value is changed to lengthen the execution time for the next quick pressure increase control. Further, in the case where the time ΔT is smaller than the predetermined value TG1[m], the learning value is kept unchanged and the next quick pressure increase control time Tfast is executed for the same time as the preceding one (step S390). In this case, when the time ΔT assumes a negative value, the setting is changed such that the next quick pressure increase time Tfast is shortened (steps S410 and S420).

In step 380, instead of suspending the learning control, the learning mode may be changed in accordance with the lapse time TST starting with a command to stop the engine.

Further, the state of oil in the oil passage may be estimated based on a parameter other than the lapse time TST.

Next, a control flow in FIG. 14 will be described below.

FIG. 14 is a control for determining whether or not the quick pressure increase control is executed. In step S520, the input signals are processed. In step S530, it is determined whether or not the restart condition for the engine automatic stop control is established and returned. When the engine is not restarted, it is returned.

After the engine restarts, in step S540, it is determined whether or not the condition for executing the quick pressure increase control is established. Specifically after the engine automatic stop command, it is determined whether or not the oil is completely discharged. When it is determined that at least a predetermined amount of the oil is discharged, it is determined that the quick pressure increase control can be executed. In this case, when executing the quick pressure increase, the time when the engine revolution NE becomes equal to or greater than the predetermined value NE1 is set to the start timing for the quick pressure increase control.

In step S550, the execution time Tfast for the quick pressure increase control is set. The execution time Tfast for the quick pressure increase control is controlled by the timer. However as mentioned above, the execution time Tfast for the quick pressure increase control is learned and controlled on the basis of the time ΔT from the finish time Tend for the quick pressure increase control to the time Tu when the clutch pack starts engaging (the turbine rotational speed is temporarily reduced), thereby being reset. Accordingly, it is possible to execute the quick pressure increase control until the clutch pack is shortened as much as possible, thus increasing a start performance. In this case, the method of executing the learning control has been already mentioned in detail.

In step S560, the quick pressure increase control is actually executed. In this case, the forward clutch C1 is controlled for forward driving, and the direct clutch C2 is controlled for backward driving. Here, in the case of changing the control target pressure of the line pressure, all the clutches engaged at the restart are subjected to the control.

When the condition of executing the quick pressure increase control is not established in step S540, the process proceeds to step S570 where the quick pressure increase control is stopped.

Here, in the present embodiment, an example of the automatic transmission having stages is shown, however, the structure can be applied to a manual transmission (M/T) provided with an automatic clutch and a continuously variable transmission.

In accordance with the second embodiment mentioned above, since the control device is configured to determine whether or not the execution mode for the quick pressure increase control is adequate when supplying the oil for engaging the clutch of the automatic transmission at starting, and to control, to learn, and change the execution mode for the quick pressure increase control, it is possible to engage the predetermined clutch of the automatic transmission quickly with little engagement shock.

Next, a third embodiment in accordance with the present invention will be described below.

The present embodiment sets the stop condition for the engine 1 when "the vehicle speed is 0", "the accelerator off", "the brake on", "the shift position is a non-drive position", and "these conditions are continued for a predetermined time Tstop". The predetermined time Tstop is designed to be counted by the timer, and is input to the controller 7 and the A/T controller 80 and is processed.

In this case, the predetermined time Tstop corresponds to the time until starting the automatic stop for the engine and can be changed and set in accordance with the conditions. The control device can be structured to set the predetermined time Tstop to 0 and to automatically stop the engine immediately after the predetermined stop condition is established, or it can be configured to set the time Tstop to infinity so as to substantially inhibit the automatic stop for the engine.

Hereinafter, a quick pressure increase control in accordance with the present embodiment will be described below.

As is apparent from FIG. 9, a problem may occur at restarting the engine in that the number of the clutches to be engaged varies depending on the starting speed from the D position of the shift position of the automatic transmission, resulting in differing required oil flow rates.

When the required flow rate of the oil changes, the effect of the quick pressure increase cannot be sufficiently obtained and shock owing to the speed change may be generated.

In the present embodiment, in order to solve the problem, the execution mode of the quick pressure increase control is changed in accordance with the gear position existing at restarting the engine. In particular, the execution time Tfast for the quick pressure increase control and the control target value PL1 of the supply oil pressure for the quick pressure increase control will be changed.

For example, in the case of starting in a state where the shift position is fixed to the second position, as shown in FIG. 9, B3 is also engaged in addition to C1 (and C0). Accordingly, a further flow rate of the oil is required in comparison with the case of starting from the first speed in the D position.

Therefore, when starting in the state where the shift position is fixed to the second speed, in order to secure the corresponding flow rate of the oil, the control device is configured to set the execution time Tfast for the quick pressure increase control to be longer than that for the first speed start.

Further, in the case of starting in the state where the shift position is fixed to the third speed, engagement of B3 is not required. However, it is necessary to further connect B2 and C0 (and B1), so that the flow rate of the oil required for the quick pressure increase control is further increased. Accordingly, the control device is configured to set the execution time Tfast for the quick pressure increase control to be longer than the case of starting at the second fixed speed position.

In the case of starting at the other gear positions (the fourth speed, a sport mode and the like), the control device is configured to set the execution time Tfast for the proper quick pressure increase control in accordance with the number of the clutches to be engaged.

In the case where the frictional engagement device (B1, B4, C0 and the like) connected for securing the engine brake is simultaneously connected to the predetermined clutch (for achieving the gear position) at the restart time, the amount of the oil supplied to the clutch is changed. Accordingly, in this case, additional oil supply is required. In this case, in order to secure the proper flow rate of the oil in accordance with the number of the connected clutches, the control device is configured to set the execution time Tfast for the quick pressure increase control.

In the present embodiment, the quick pressure increase control is executed by employing the switch valve 58 and adjusting the communication degree of the oil passage to the forward clutch C1. However, the method of quickly supplying the oil to the forward clutch C1 is not limited to this method.

For example, it is possible to set the controlled pressure value (the control target pressure PL1) of the line pressure PL adjusted by the line pressure control solenoid 52 to be higher than the normal value. In this case, the execution mode for the quick pressure increase control is determined by multiplication of the controlled value of the line pressure and the time for maintaining the controlled pressure at a high value. Further, when changing the control target value PL1 for the supply oil pressure, for example, it is possible to previously set an increase rate for the control target value PL1, for example, x % increase of the control target value PL1 at the first speed starting, y % increase for starting at the second speed, and z % increase for starting at the third speed starting, in the same manner. Here, x, y and z are constants.

Further, in the embodiment mentioned above, it is structured to switch the supply degree of the oil to the forward clutch C1 in an on-off manner by the switch valve 58. However, when it is structured to duty control the switch valve 58, for example, by a duty solenoid, it is possible to finely set the supply degree (the control target value for the quick pressure increase control) by the switch valve 58. That is, it is also possible to realize the control by multiplying with respect to the execution time Tfast for the quick pressure increase control by the switch valve 58.

Further, the setting of the execution time Tfast for the quick pressure increase control is changed in accordance with the gear position, however, it may be changed and set in accordance with the discharge amount of the oil at the engine stop time.

A flow of the control in accordance with the present embodiment will be described below with reference to a flow chart shown in FIG. 15.

Figure 15:
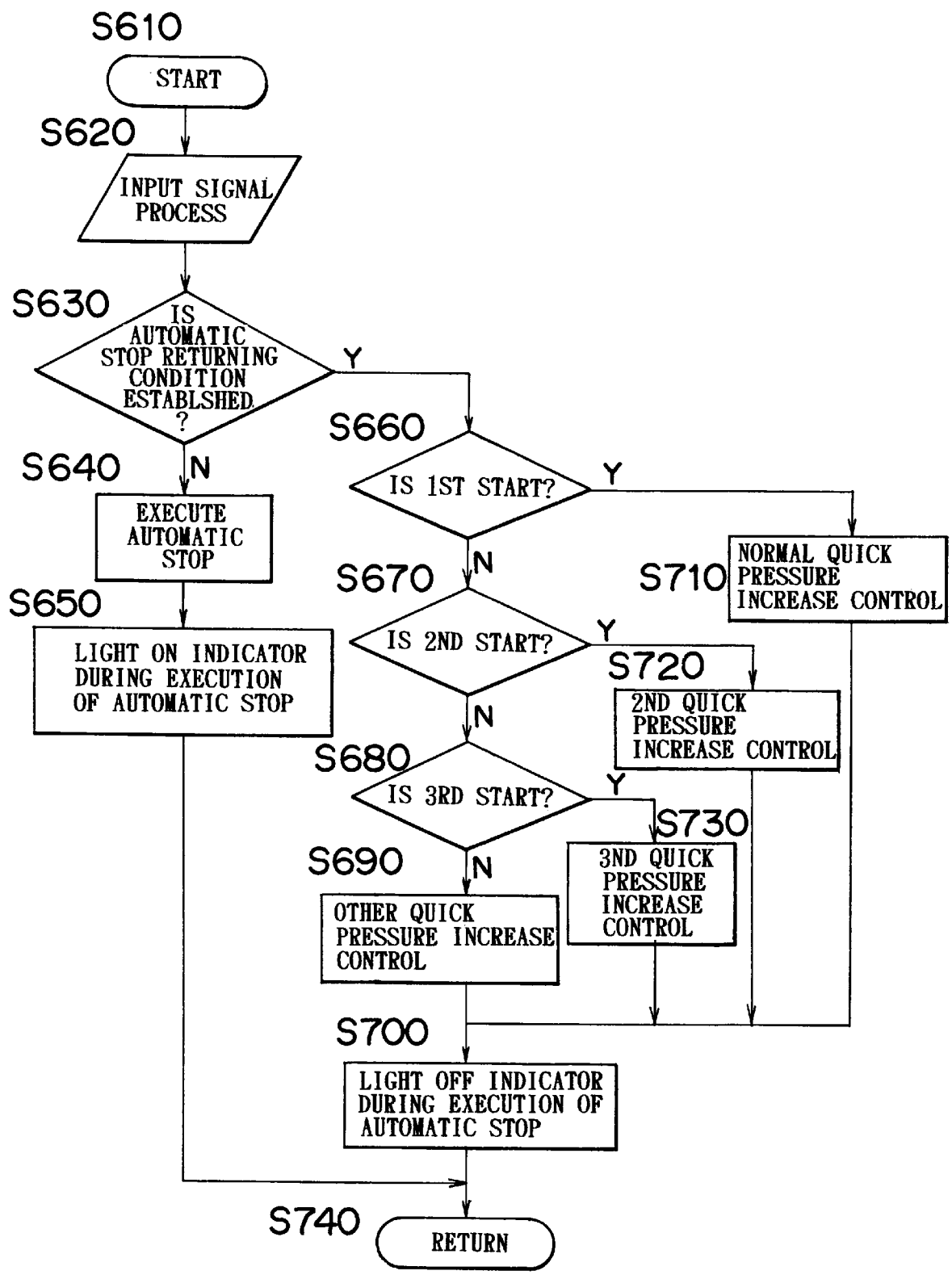
FIG. 15 is a flow chart of a control in accordance with a third embodiment.

FIG. 15 is a control flow executed during an automatic stop of the engine.

After starting of the routine in step S610, input signals from various sensors are processed to the controller 7 and the A/T controller 80 linked therewith in step S620. Here, the position of the shift position is also input.

In step S630, it is determined whether or not the restart (automatic stop and return) condition is established after processing the various signals.

Here, in the case where the restart condition is not prepared, the automatic stop of the engine is continued (step S640), and in step S650, the indicator for the engine automatic stop condition is kept on.

In the case where the automatic stop and return condition of the engine is established in step S630, it is determined as to which gear position is executed for restarting at the automatic stop condition, the first, second and third, in steps S660, S670 and S680, respectively. That is, it is determined as to what speed stage the start is executed. In the case of starting at the first speed, the normal quick speed pressure increase control is executed in step S710. In the case where the gear position at the start time is set to the second or the third speeds, for example, in the manual mode (refer to FIGS. 10 and 11), the quick pressure increase control for the second and the third speeds is executed.

Here, in the case of avoiding the first speed due to a solenoid fail (trouble) and a valve stick, since it is controlled to start at the second start, the quick pressure increase for the second speed is executed.

In step S690, the control device is configured to supply oil at the other gear position (the fourth speed start, the sport mode and the like) considering the required flow.

Since the engine restarts after the execution of the quick pressure increase control, the indicator for the engine automatic stop execution is turned off.

Here, in the present embodiment, an example of the automatic transmission with stages is shown, it can be also applied to the manual transmission (M/T) with the automatic clutch and the continuously variable transmission.

In accordance with this third embodiment, since the quick pressure increase control is executed in order to engage the predetermined clutch early at restarting the engine and the execution mode is changed in accordance with the gear position (the number of the clutch) existing at restarting the engine, it is possible to execute an appropriate quick pressure increase control and it is possible to quickly engage the clutch without generating engagement shock.

Next, a fourth embodiment in accordance with the present invention will be described below.

The present embodiment is also applied to the device shown in FIG. 2 in the same manner as the embodiments mentioned above.

Figure 16:
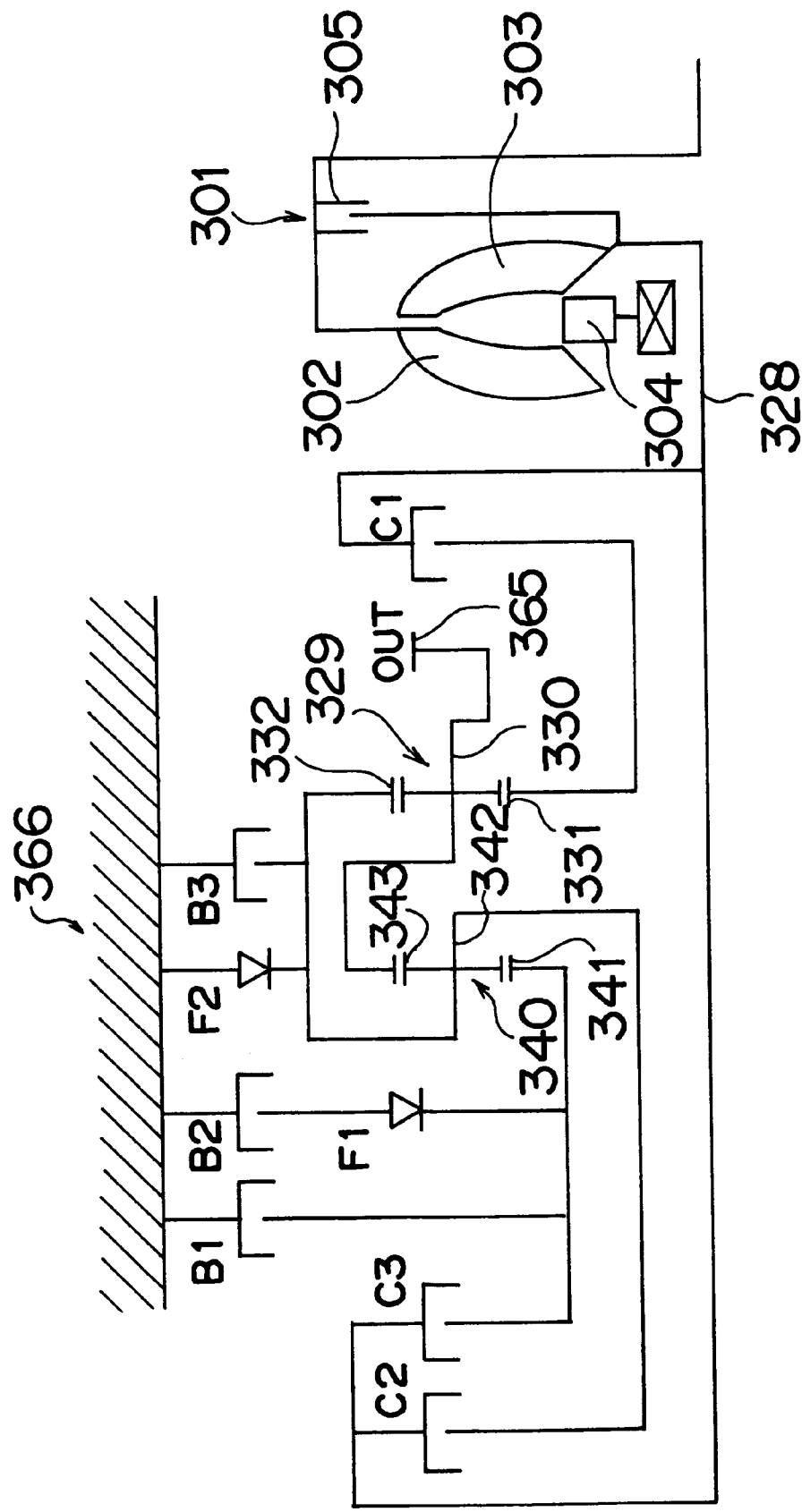
FIG. 16 is a schematic view of a gear train in a transmission.

FIG. 16 is a view showing an embodiment of a gear train of the A/T 2, and in the structure shown here, it is structured to set the gear position including four forward stages and one backward stage.

In order to transmit the power from the engine 1 to the drive wheel, the A/T 2 is provided with a torque converter 301 for converting the power from the engine 1 into a kinetic energy of the fluid by a rotation of a pump impeller 302 directly connected to an output shaft of the engine, transmitting the kinetic energy due to the flow of the fluid to a turbine liner 303 via a stator 304, and rotating the output shaft so as to transmit the power. The A/T 2 also includes a transmission for converting the driving force transmitted from the torque converter 301 into the driving force required for the vehicle.

In this case, the torque converter 301 is provided with a lock up clutch 305 and is structured to directly connect the output shaft of the engine and an output shaft of the torque converter when the vehicle speed is equal to or greater than a fixed value.

An input shaft 328 of the transmission is connected to the output shaft connected to the turbine liner 303. The transmission is provided with a gear train and is normally constituted by combining a planetary gear mechanism, clutch, brake and the like, thereby providing plural kinds of speed change ratios and forward and backward movement. Hereinafter, the detail explanation will be described.

The input shaft 328 of the transmission connected to a turbine hub 304 of the torque converter 301 is connected to a sun gear 331 of a first planetary gear mechanism 329 via a forward clutch C1.

The first planetary gear mechanism 329 has a ring gear 332 including internal teeth on an inner peripheral surface, the sun gear 331 arranged in the center of the ring gear 332 and a pinion gear arranged between the sun gear 331 and the ring gear 332 and held by the carrier 330 such that the pinion gear relatively rotate around the sun gear 331 while meshing with the sun gear 331 and the ring gear 332.

On the contrary, the input shaft 328 of the transmission is connected to a carrier 342 of a second planetary gear mechanism 340 via clutch C2 and is connected to a sun gear 341 of the second planetary gear mechanism 340 via clutch C3. Then, the ring gear 343 of the second planetary gear mechanism 340 and the carrier 330 of the first planetary gear mechanism 329 are connected to each other.

Further, a band brake B1 for stopping a rotation of the sun gear 341 of the second planetary gear mechanism 340 is provided between the sun gear 341 and a casing 366. Further, a band brake B2 for selectively stopping a rotation of the sun gear 341 via a one way clutch F1 is provided between the sun gear 341 and the casing 366.

Further, the one way clutch F2 and the band brake B3 are provided in parallel between the ring gear 332 of the first planetary gear mechanism 329 and the carrier 342 of the second planetary gear mechanism 342.

Then, the engine output that has been input via the input shaft 328 is finally transmitted through an output shaft 365 connected to the carrier 330 of the first planetary gear mechanism 329 to the drive wheel.

Figures 17, 18:
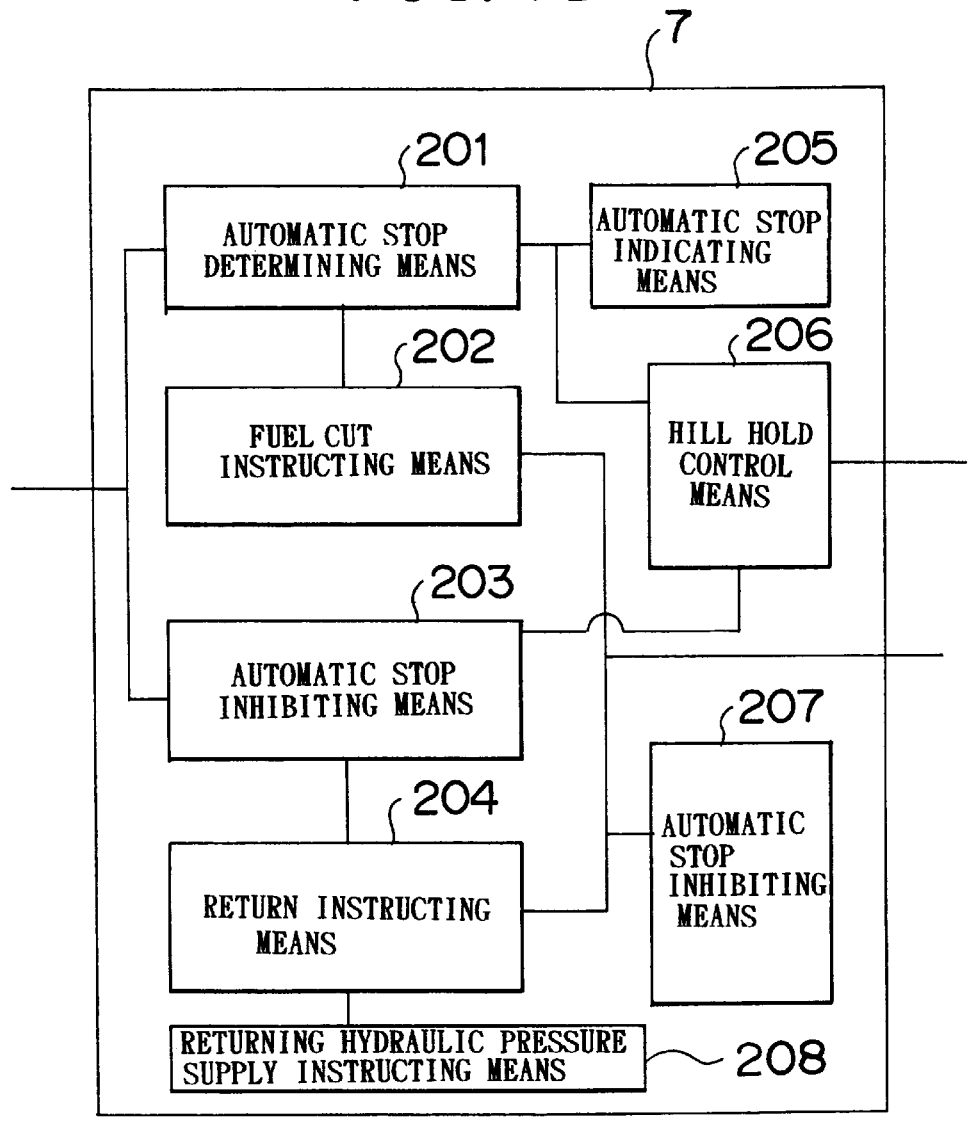
FIG. 17 is a view showing an operation state of the transmission.
FIG. 18 is a block diagram of an automatic stop and return device in a controller.

In the A/T 2 mentioned above, it is possible to set the gear position of the four forward stages and the one backward stage by engaging and releasing each of the clutches and the brakes in the manner shown by an operation table in FIG. 17. Referring to FIG. 17, a symbol O indicates an engagement state, a symbol • indicates an engagement state at the engine brake, and a blank space indicates a disengagement state.

A control of the torque converter 301 mentioned above and an engagement and disengagement of each of the clutches and brakes are performed by the actuator operated by an oil pressure, and an oil pressure control device having a hydraulic circuit for driving the actuator is provided.

Next, an automatic stop and start device for the engine 1 will be described below.

The automatic stop device for the engine 1 can be realized by a control program stored in the ROM in the controller 7. The device is provided, as shown in FIG. 18, with automatic stop determining means 201 for determining an execution condition for automatically stopping the engine 1, fuel cut instructing means 202 for cutting a fuel supply to the engine 1 when it is determined by the automatic stop determining means 201 that the automatic stop condition is established, automatic return determining means 203 for determining the execution condition for restarting the engine 1, and return instructing means 204 for restarting the fuel supply while driving the M/G 3 so as to restart the engine when it is determined by the automatic return determining means 203 that the engine 1 should be restarted.

Inputs for signals such as those from the vehicle speed sensor, a signal indicating a position of the shift lever, a signal from the acceleration sensor, a brake pedal signal and the like, are included in the automatic stop determining means 201 and the automatic return determining means 203.

The automatic stop determining means 201 determines that the engine should be stopped under the conditions, for example, "the vehicle speed is 0", "the brake pedal is depressed", "the acceleration pedal is not depressed", "the water temperature of the engine and the working fluid temperature of the A/T are fixed", "the position of the shift lever is at the D or N" and the like. As mentioned above, the configuration for executing the automatic stop and start control when the shift position is at the D or N position is called a D economic running, and the configuration for executing the automatic stop and start control only when the shift is at the N position and not executing the automatic and start control at the other positions is called an N economic running. It is also possible to select the D economic running or the N economic running.

On the contrary, the automatic return determining means 203 determines that the engine should be restarted, for example, when the acceleration pedal is depressed or the brake is turned off.

In this case, the automatic stop starting means is provided with an automatic stop indicating means 205 for turning on a control execution indicator provided in the driver's seat, for example, a lamp to inform the driver that the engine is automatically stopped when it is determined by the automatic stop determining means 201 that the automatic stop condition is established.

Further, the automatic stop starting device is provided with automatic stop inhibiting means for inhibiting the automatic stop control, for example, when the transmission is at the high speed stage. The automatic stop control is inhibited, for example, when the various kinds of valves of the transmission are not operated and the transmission is at the high speed stage under a fail state. More particularly, it is in the case that a 1-2 shift valve 404 in FIGS. 19 and 20 mentioned below or a cut off valve 440 in FIG. 21 are not operating.

Further, the automatic stop inhibiting means inhibits the automatic stop control when operating in a snow mode for performing a second speed start. There is a case that a change to the snow mode is performed when the shift lever is at the N position. In that case, the automatic stop state is immediately stopped. On the contrary, it is considered that the snow mode is not allowed unless the automatic stop control is stopped. This is because the automatic stop starting control in accordance with the present invention is operated only when performing the first speed start. In the case of the snow mode, it is possible to determine by the automatic stop determining means 201 that "the automatic stop should not be performed", so that the automatic stop starting device is not operated.

In this case, when the engine is operated while the vehicle is stopped, a creep force for moving the vehicle forward is operated as long as the shift lever is at the D position. Accordingly, on a gentle slope or the like, the creep force can prevent the vehicle from moving backward.

However, in accordance with the present invention, the engine is stopped as the vehicle stops, so that the creep force is not operated. Accordingly when the vehicle stops on the slope, it will move backward unless the brake is continuously depressed.

Then, when it is determined by the automatic stop determining means 201 that the automatic stop condition is established, there is provided hill hold control means 206 for holding the master cylinder fluid pressure of the brake device to maintain the brake force. In this case, it is preferable that the hill hold control is performed by driving the actuator for an antilock brake system (ABS). Further, it is possible to mechanically lock a rotational shaft connected to the wheel.

Next, a hydraulic pressure circuit showing a feature in accordance with the present invention will be described with reference to FIG. 19.

Figure 19:
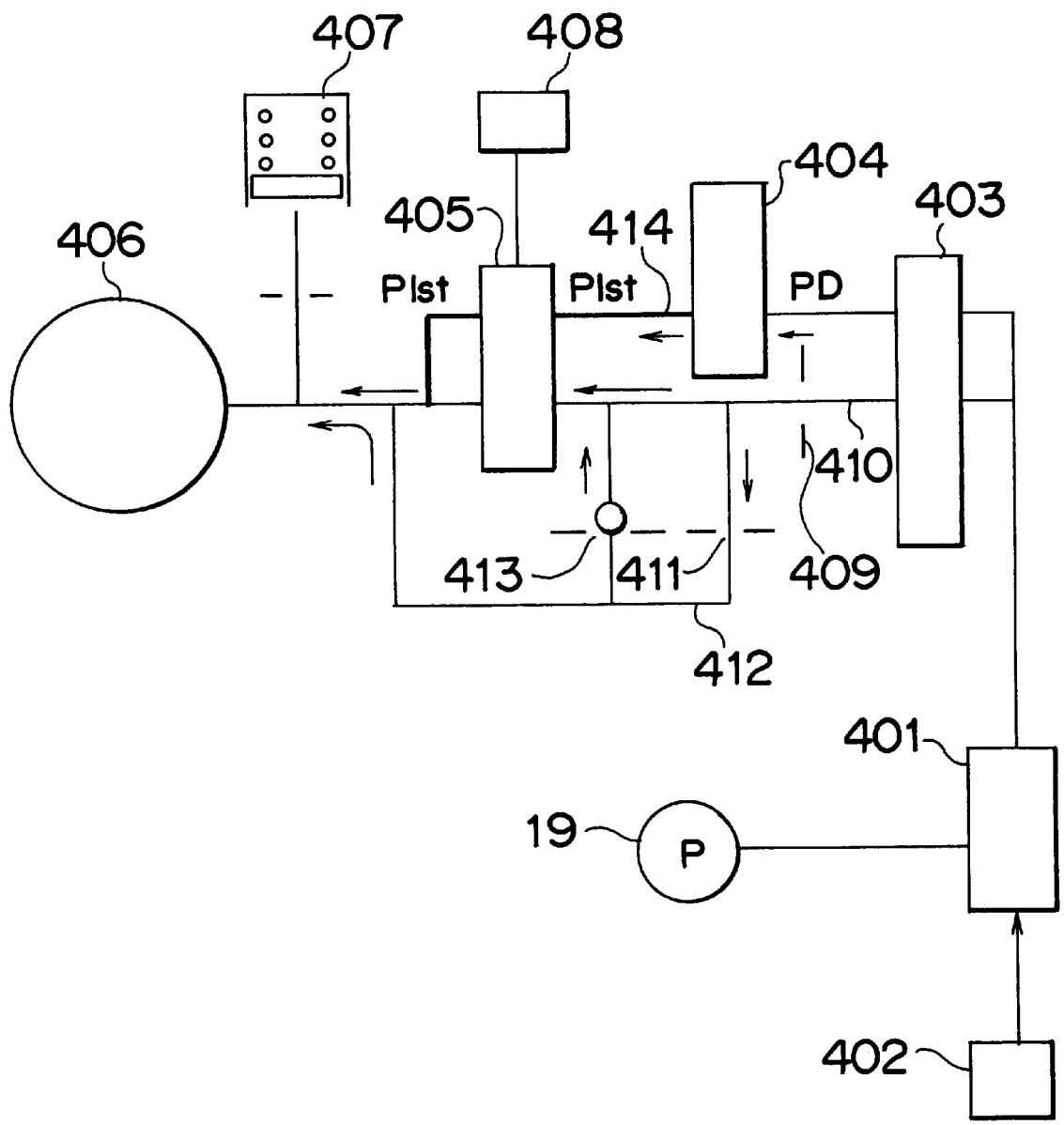
FIGS. 19 to 21 are views each showing a hydraulic circuit provided with a hydraulic passage for return.

FIG. 19 represents a part of the hydraulic pressure circuit for operating and controlling the transmission, including an oil pump 19 driven by the engine 1, a primary regulator valve 401 controlling the oil pressure from the oil pump 19 by the line pressure control solenoid 402 also as to supply as a predetermined line pressure, a manual valve 403 moving interlocked with the shift lever within the driver's seat so as to introduce the line pressure from the primary regulator valve 401 to the operation portion in accordance with each of the positions, a 1-2 shift valve 404 introducing the line pressure to a C1 clutch (a forward clutch) 406 within the transmission, a switch valve 405 selectively supplying the oil pressure from the 1-2 shift valve 404 and the manual valve 403, and an accumulator 407 for the C1 clutch 406. In this case, reference numeral 408 denotes a driving solenoid for the switch valve 405.

Further, there are provided a first hydraulic pressure passage 410 (a normal hydraulic pressure passage) supplying an oil pressure to the C1 clutch 406 from the manual valve 403 via a large orifice 409 and the switch valve 405, a second hydraulic pressure passage 412 branched from the first hydraulic pressure passage 410 after passing through the large orifice 409 and supplying the oil pressure to the C1 clutch 406 via a small orifice 411, and a check valve 413 including a check ball connected between the first hydraulic pressure passage 410 after passing through the large orifice 409 and the second hydraulic pressure passage 412 in parallel with the portion of the small orifice 411. The check valve 413 is set such that a direction from the side of the C1 clutch 406 to the side of the manual valve 403 is a normal direction.

Further, there is provided a returning hydraulic pressure passage 414 supplying an initial oil pressure for returning from the 1-2 shift valve 404 to the C1 clutch 406 via the switch valve 405. The returning hydraulic pressure passage 414 and the switch valve 405 constitute the quick pressure increase means.

When the engine is normally operated, the switch valve 405 selects the first hydraulic pressure passage 410, and the returning hydraulic pressure passage 414 is shut off. In the case where the engine is temporarily stopped by the automatic stop and start device of the engine and thereafter is restarted, the switch valve 405 shuts off the first hydraulic pressure passage 410 and opens the returning hydraulic pressure passage 414. Accordingly, the line pressure supplied from the manual valve 403 is supplied to the C1 clutch 406 from the returning hydraulic pressure passage 414 and the second hydraulic pressure circuit 412.

In this case, FIG. 20 corresponds to a particular illustration of the structure shown in FIG. 19, and shows a 4-3 timing valve 421 subsequently connected the 1-2 shift valve 404, an accumulator 407 for the C1 clutch 406 subsequently connected to the 4-3 timing valve 421 and a solenoid valve 408 for operating each of the 4-3 timing valves 421.

Figure 20:
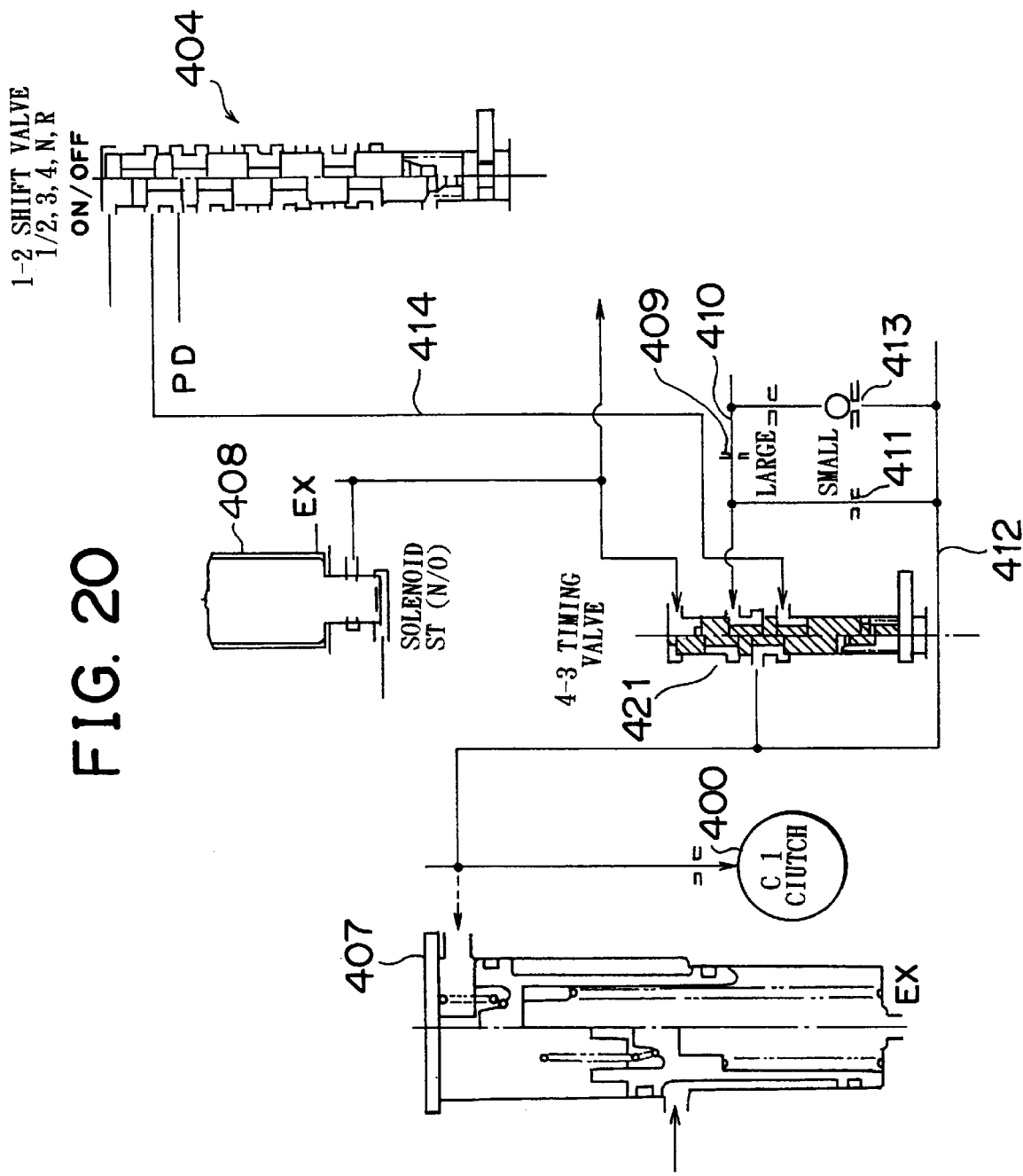
Figure 21:
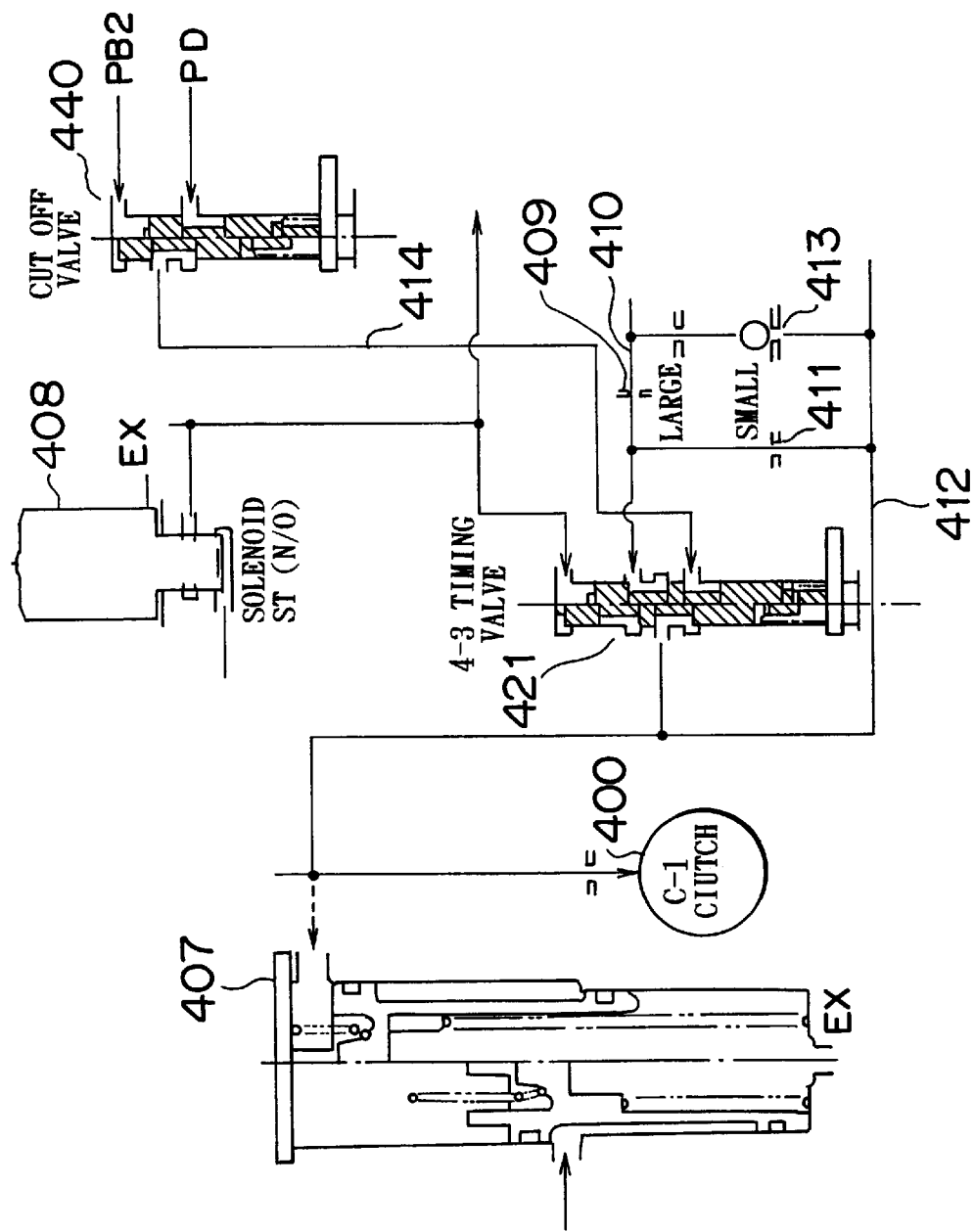

Further, FIG. 21 shows an example in the case where a cut off valve 440 is exclusively provided for supplying a returning oil pressure in place of the 1-2 shift valve 404 shown in FIG. 20 and the oil pressure from the cut off valve is used. In this case, an initial pressure of the cut off valve 440 corresponds to an oil pressure of the transmission (PD pressure) generated in accordance with a predetermined position of the shift lever. Further, a signal pressure of the cut off valve 440 corresponds to an oil pressure of the B2 brake (PB2) engaging at the second speed or greater. In this example, since the 4-3 clutch is also engaged at the 4-3 down shift, the PB2 is used for cutting the increased pressure oil passage at the third and fourth speeds, in order to prevent the pressure increasing means from operating at that time.

In these embodiments, the 4-3 timing valve 421 corresponds to the switch valve 405 in the embodiment shown in FIG. 19, and the solenoid valve 408 is closed at the normal drive. Accordingly, the oil pressure is applied to the spool rear end portion of the 4-3 timing valve 421 so as to move forward the spool (a right side of the valve in FIG. 21). In this state, the first hydraulic pressure passage 410 supplying the oil pressure to the C1 clutch 406 via the large orifice 409 having a large orifice diameter and the switch valve 405 (a 4-3 timing valve 421) is communicated, thereby applying an oil pressure to the C1 clutch 406. When the engine is restarted after being automatically stopped, the solenoid valve 408 is opened to drain the oil pressure in the rear end portion of the spool in the 4-3 timing valve, thus moving the spool backward. Accordingly, the first hydraulic pressure passage 410 is shut off, and the returning hydraulic pressure passage 414 for supplying the returning initial pressure from the 1-2 shift valve 404 or the cut off valve 440 to the C1 clutch 406 via the switch valve 405 (the 4-3 timing valve) is connected. Then, since there is the second hydraulic pressure passage 412 branching from the first hydraulic pressure passage 410 and supplying the oil pressure to the C1 clutch 406 via the small orifice 411 although the first hydraulic pressure passage 410 is shut off, the oil pressure can be supplied to the C1 clutch 406 from the returning hydraulic pressure passage 414 and the second hydraulic pressure passage 412 when the engine is automatically returned.

Comparing the returning hydraulic pressure passage 414 with the first and second hydraulic pressure passages 410 and 412, since the returning hydraulic pressure passage 414 has no orifice and the first and second hydraulic pressure passages 410 and 412 have the large orifice 409 and the small orifice 411, the oil pressure from the returning hydraulic pressure passage 414 is more quickly supplied to the C1 clutch 406 than the oil pressure supplied from the first and second hydraulic pressure passages 410 and 412.

In the embodiment shown in FIG. 20, the D position pressure is supplied to the switch valve 421 via the manual valve 403 and the 1-2 shift valve 404, however, the oil pressure corresponds to an oil pressure generated only at the first speed by being passed through the 1-2 shift valve 404. In this case, it is set to the oil pressure only at the first speed because it is not desired to deliver the oil pressure to the C1 at the 4-3 shift down. Since the hydraulic pressure passage has no orifice or the orifice diameter can be exclusively determined if the orifice is provided, it is possible to design the device in a relatively easy manner.

An operation state of the hydraulic pressure circuit will be shown in TABLE 1 to TABLE 3. In this case, the PD pressure denotes an oil pressure generated when the shift lever is positioned at the predetermined drive position, and an ST denotes ON (O) and OFF (X) of the solenoid 408.

TABLE 1

(1) Restart time after automatic stop
a) 4-3 timing valve

| timing | 4-3 timing valve | ST | ST oil pressure |
|---|---|---|---|
| Initial oil pressure at non supply time | Office large | Right X | O |
| Initial oil pressure at supply time | PD + orifice small | Left O | X | b) 1-2 shift valve or CUTOFF VALVE
 PD pressure (1$^{st}$)

TABLE 2

Shift Position: N → D
a) 4-3 timing valve

| Timing | 4-3 timing valve | ST | ST oil pressure |
|---|---|---|---|
| Normal time | Orifice large | Right X | O | b) 1-2 shift valve or CUTOFF VALVE
 PD pressure (1$^{st}$) [cut by the 4–3 timing valve]

TABLE 3

Shift Position: 4th → 3 rd
a) 4-3 timing valve

| Timing | 4-3 timing valve | | ST | ST oil pressure |
|---|---|---|---|---|
| Large orifice time | Orifice large | Right | X | O |
| Small orifice time | Orifice small | left | 0 | X | b) 1-2 shift valve or CUTOFF VALVE
 No oil pressure (2$^{nd}$, 3$^{rd}$ and 4$^{th}$)

When the engine is restarted after the automatic stop shown in TABLE 1, hydraulic pressure passage is switched by switching the 4-3 timing valve 405 due to the operation of the solenoid valve (ST) 408, so that the PD pressure from the 1-2 shift valve or the cut off valve is supplied to the C1 clutch through the returning hydraulic pressure passage 414 as the initial oil pressure. At this time, the PD pressure is supplied by being throttled by the small orifice from the first and second hydraulic pressure passages 410 and 412 by switching of the 4-3 timing valve 405.

When the initial oil pressure is not supplied, the returning hydraulic pressure passage 414 is shut off by switching the 4-3 timing valve 405 due to the operation of the solenoid valve (ST) 408, so that the PD pressure is supplied by being throttled by the large orifice 409 from the first hydraulic pressure passage 410.

As shown in TABLE 2, when moving from the N position to the D position, the returning hydraulic pressure passage 414 is shut off by switching the 4-3 timing valve 405 due to the operation of the solenoid valve (ST) 408, so that the PD pressure is supplied by being throttled through the large orifice 409 from the first hydraulic pressure passage 410.

When moving from the fourth speed to the third speed shown in TABLE 3, the hydraulic pressure passage is switched by switching the 4-3 timing valve 405 due to the operation of the solenoid valve (ST) 408, so that the returning hydraulic pressure passage 414 is opened. However, since there is no initial pressure of the 1-2 shift valve or the cut off valve, the oil pressure from the returning hydraulic pressure passage 414 is not supplied to the clutch C1. On the contrary, the oil pressure in the throttle passage in the small orifice 411 is applied from the first and second hydraulic pressure passages 410 and 412 by switching the 4-3 timing valve 405, so that the oil pressure is supplied to the clutch C1. This corresponds to the small orifice time in the table and it is operated by an engagement of C1 at the 4-3 shift down time.

Here, in the present embodiment, the oil pressure applied from the returning hydraulic pressure passage 414 to the C1 clutch 406 uses the oil pressure from the 1-2 shift valve 404 or the cut off valve, however, the oil pressure is not limited to this, and an oil pressure from any passage may be used as far as it can be applied from the returning hydraulic pressure passage 414 independent from the inherent hydraulic pressure passage.

Further, on the controller as mentioned above, the returning hydraulic pressure supply instructing means 208 which operates the switch valve 405 for a predetermined time after the engine is restarted so as to supply the returning initial oil pressure to the C1 clutch 406 is realized by a program.

As mentioned above, since the control device is configured to use the 4-3 timing valve as the switch valve and to time the switching timing by the solenoid valve 408 due to the solenoid, the components in existing hydraulic pressure devices can be employed. Accordingly, sophistication or enlargement of the device can be provided at a low price.

In addition to the quick pressure increasing means mentioned above, in FIG. 19, the control device may be configured to increase the controlled pressure valve of the primary regulator valve 401 by the line pressure control solenoid 402 and to provide with pressure increasing means for increasing and controlling the line pressure. In this case, the returning hydraulic pressure passage 414 is not provided, and the oil pressure is supplied from the inherent hydraulic pressure passage 410 also when the engine is restarted. Accordingly, the second hydraulic pressure passage 412 may be omitted.

When the pressure is increased by the pressure increasing means when the engine is restarted, in comparison with the pressure when the oil pressure is normally supplied, the oil can be supplied under an increased pressure faster than in the case of a hydraulic pressure passage having the same pressure loss.

Further, as an alternative quick pressure increasing means, a variable throttling orifice which temporarily loosens a throttling degree of the orifice provided in the normal hydraulic pressure passage when the engine is restarted, may be provided.

Hereinafter, a control example of the present embodiment will be described below with reference to a flow chart in FIG. 22 and the timing charts in FIGS. 23 and 24.

In the state where the engine is started and the driving position is set to the D position by the shift lever, the line pressure controlled by the primary regulator valve 401 is finally supplied to the C1 clutch 406 corresponding to the forward moving frictional engagement device via the manual valve 403. When the C1 clutch 406 is engaged, as is apparent from the operation table in FIG. 17, the vehicle is under the forward moving state.

For example, in the case where the brake is depressed and the vehicle is stopped because a traffic signal at an intersection turns red under the state mentioned above, the automatic stop determining means 201 determines an execution condition for the automatic stop of the engine. Under the stop at the intersection, the conditions such as "the vehicle speed is 0", "the brake pedal is depressed", "the accelerator pedal is not depressed", "the water temperature and the working fluid temperature of the A/T is within the predetermined range" and "the position of the shift lever is at the D or N" are satisfied, so that it is determined that the engine should be stopped.

When it is determined that the automatic stop conditions are prepared by the automatic stop determining means 201, the fuel supply to the engine is cut by the fuel cut instructing means 202. Then, the engine stops and the rotational speed NE thereof gradually drops. In this state, the controller 7 outputs the control signal for breaking to the electromagnetic clutch 26, so that the pulley 22 and the engine 1 are disconnected. Since the drive of the oil pump 19 is stopped when the engine stops, the oil stored in the C1 clutch 406 and the accumulator 407 for the C1 clutch is drained via the check valve 413 (a line (a) in FIG. 23). The C1 oil pressure is constant for some time after the engine stops due to the oil pressure from the accumulator 407.

Figure 22:
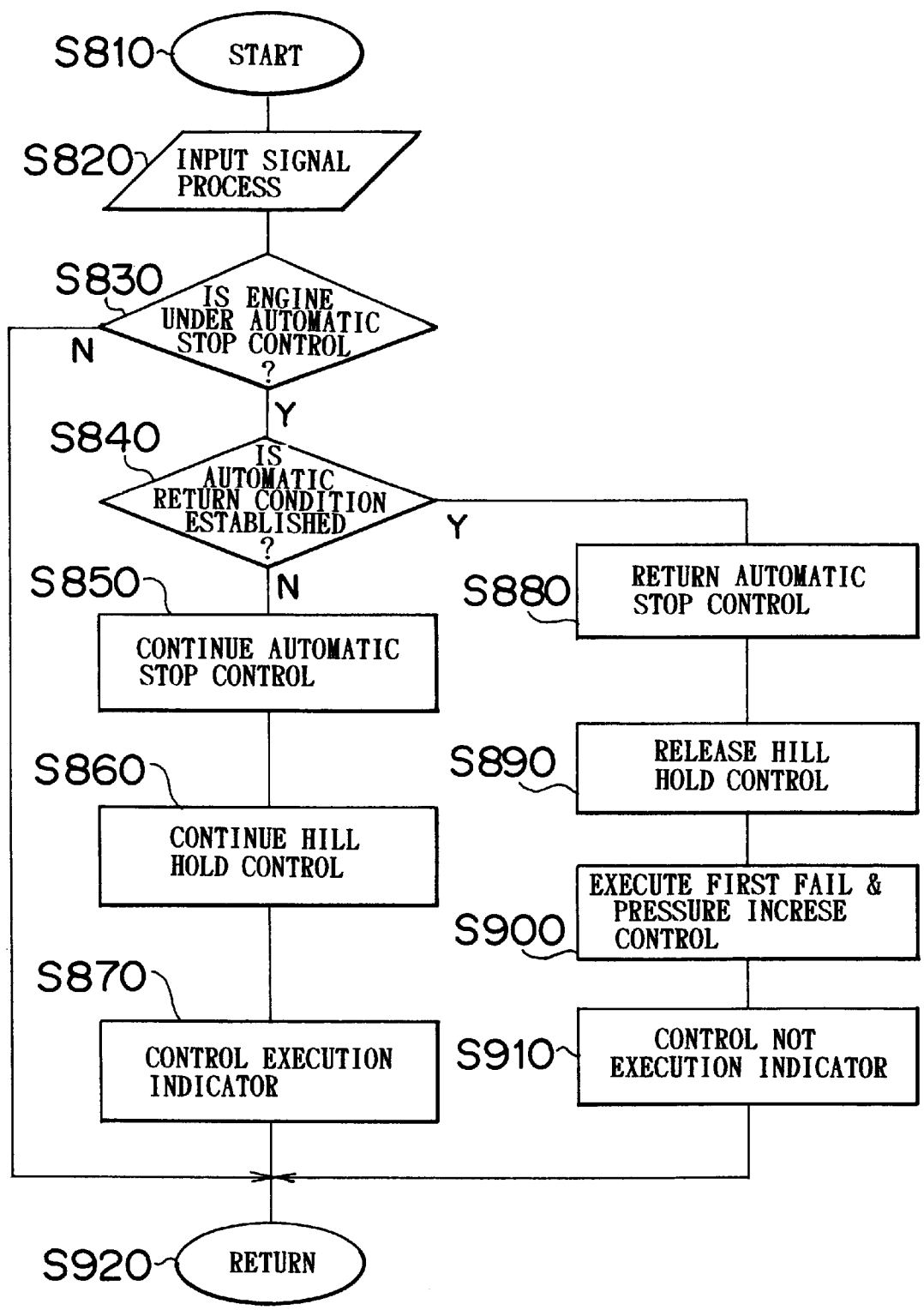
FIG. 22 is a flow chart of a control in accordance with a fourth embodiment.
Figure 23:
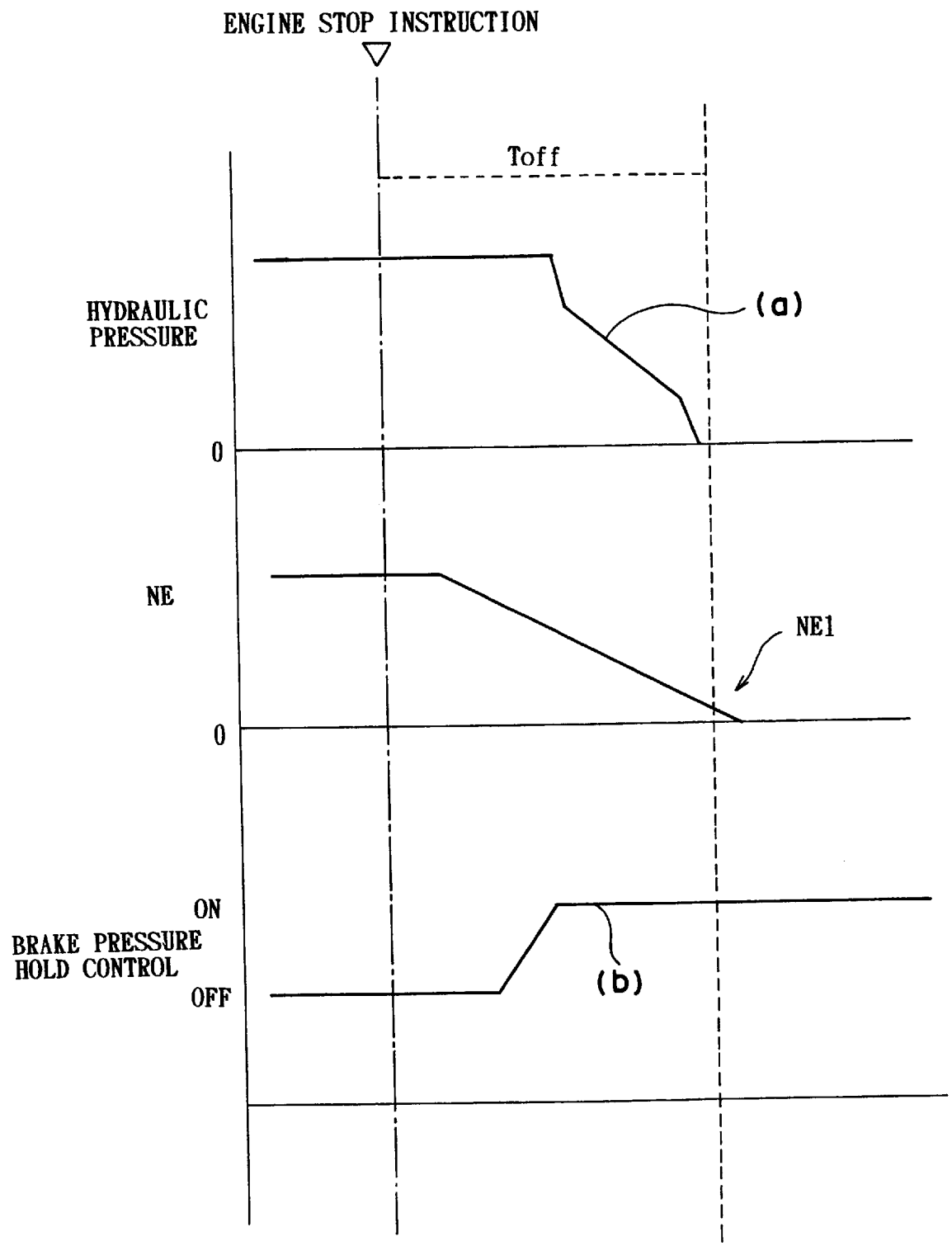
FIG. 23 is a timing chart showing a state of an engine stop control.

During this time, a process shown in FIG. 22 is executed. First, in step S820, various kinds of input signals showing an operation state are processed, and it is determined whether or not the engine is under stop on the basis of the input signal (step S830). Here, if the engine is not under stop, the process is restarted as it is, that is, returned to the step S820, and if the engine is under stop, the process proceeds to step S840 where it is determined whether or not the automatic return determining means 203 should restart the engine. Here, when the conditions for restarting are not prepared, an automatic stop control state is maintained (step S850). Since the creep force is lost by stopping the oil pump 19 at the automatic stop state, the hill hold control device is operated to hold the brake hydraulic pressure before the C1 oil pressure is drained so as to secure the brake force (step S860) (a line (b) in FIG. 23). Further, the control execution indicator is turned on (step S870), thereby indicating to the driver that the engine is under stop.

When releasing the brake pedal or depressing the acceleration pedal after the traffic signal turns green, the automatic return determining means 203 determines that the engine should be restarted (step S840), so that the return instructing means 204 drives the M/G 3 and the fuel is supplied again to restart the engine (step S880). Then, the engine revolution is controlled to an idling rotation (+α) (NETGT in FIG. 24). Further, the maintenance of the brake force by the hill hold control means 206 is released (step S890: a line (a) in FIG. 24).

Upon restart of the engine, the oil pump 19 is restarted, however, during this time, the switch valve 405 is driven by the returning hydraulic pressure supply instructing means 208 until the engine revolution becomes stable, so as to open the returning hydraulic pressure passage 414 and supply the returning initial oil pressure to the C1 clutch 406 (step S900).

At this time, it is possible to increase the controlled pressure value of the primary regulator valve 401 by the line pressure control solenoid 402 so as to increase and control the line pressure.

Figure 24:
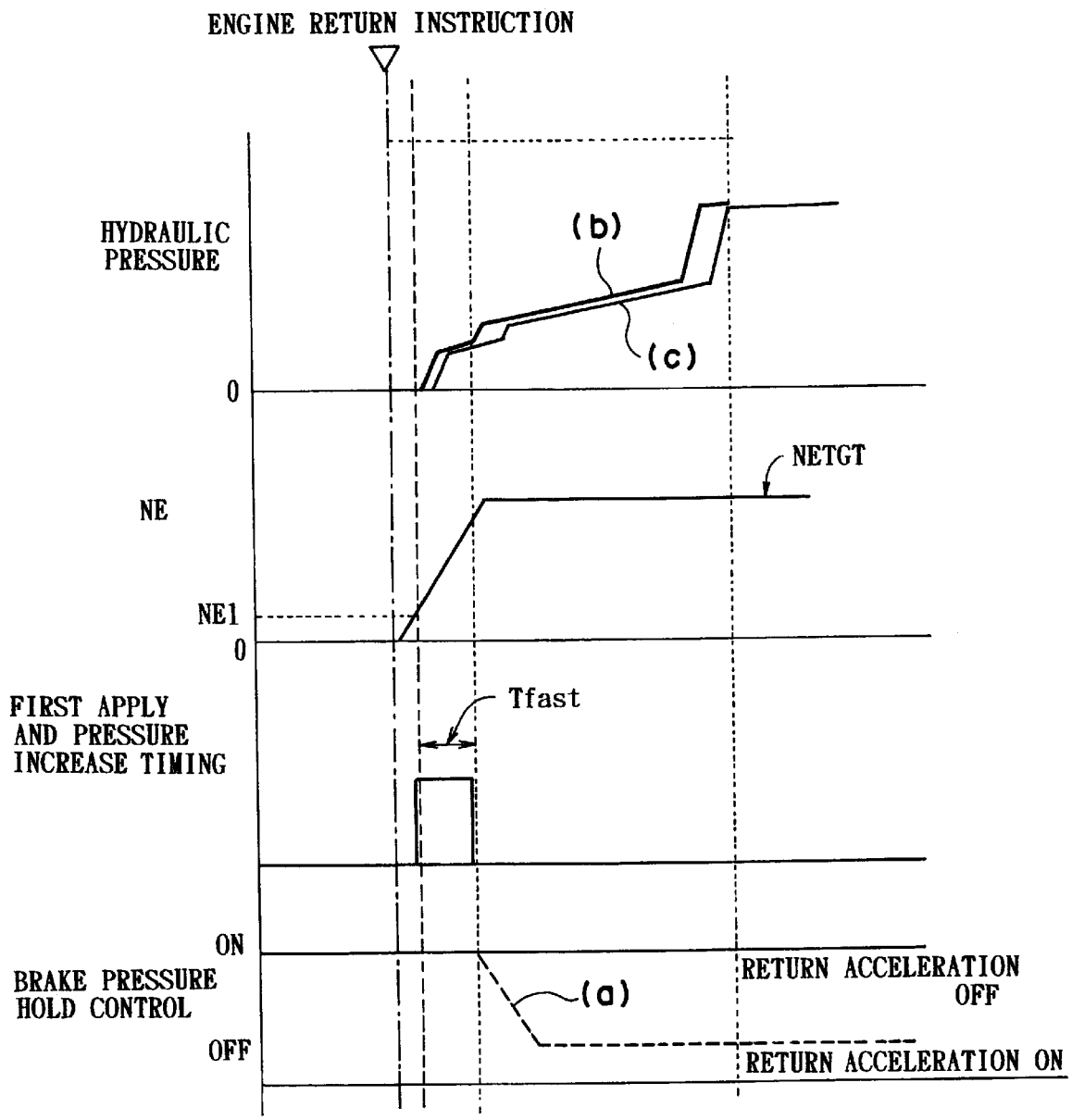
FIG. 24 is a timing chart showing a state of an engine restart control.

On the contrary, since the normal line pressure is also applied to the C1 clutch 406 from the manual valve 403 via the second hydraulic pressure passage 412, the oil pressure applied to the C1 clutch 406 quickly rises as shown by a line (b) in FIG. 24 in comparison with the case where only the second hydraulic pressure passage 412 is used (a line (c) in FIG. 24). Thereafter, the control non-executed indicator is turned on (step S910), and the process returns to step S820.

In this case, since the supply time for the returning oil pressure (Tfast) or the increasing time for the line pressure is affected by the working fluid temperature of the transmission (the AT fluid temperature), it is preferable to select the time in accordance with the map shown in TABLE 4. The aforementioned structure is hardly influenced by dispersion of the viscosity of the working fluid owing to the difference between the AT fluid temperatures, resulting in appropriate control.

TABLE 4

| AT fluid temperature [° C.] | 20 or less | 20 to 80 | 80 or greater |
|---|---|---|---|
| T fast | 0.2 sec. | 0.1 sec. | 0.05 sec. |

In the control as mentioned above, when the engine restarts and the initial oil pressure is applied before the C1 oil pressure is sufficiently drained from the hydraulic pressure supply circuit in response to the engine stop instruction, the C1 oil pressure may suddenly rise and generate engagement shock. Therefore, it is controlled by a timer such that the initial oil pressure is not supplied from the returning hydraulic pressure passage 414 only in the case where a predetermined time (Toff in FIG. 23) has not yet elapsed. In order to determine the predetermined time Toff, the engine revolution NE is detected, so that a drop of the engine revolution to a predetermined rotational speed (NE1 in FIG. 23) is set as a start condition for the returning hydraulic pressure supply. Further, it is possible to detect the rotational speed of the oil pump interlocking with the engine revolution in place of the engine revolution, and to set the drop of the rotational speed of the oil pump to a predetermined rotational speed as the start condition for the returning hydraulic pressure supply.

In this case, with respect to the C2 clutch (first and reverse clutch) corresponding to the backward movement frictional engagement device, the circuit in the drawing can be applied.

Further, the transmission to which the present invention is applied may be an automatic clutch type manual transmission.

In accordance with the present embodiment, when restarting the engine, there is provided the returning hydraulic pressure passage for supplying the initial oil pressure to the transmission independent from the oil pressure supplied from the hydraulic pressure passage, so that it is possible to avoid engagement shock of the transmission caused by delay in oil pressure supply.

Further, since the structure is achieved merely by adding the returning hydraulic pressure passage to the normal hydraulic pressure passage, the structure can be realized at low costs, and the device itself is not complicated nor enlarged.

Next, a fifth embodiment in accordance with the present invention will be described below.

Figure 25:
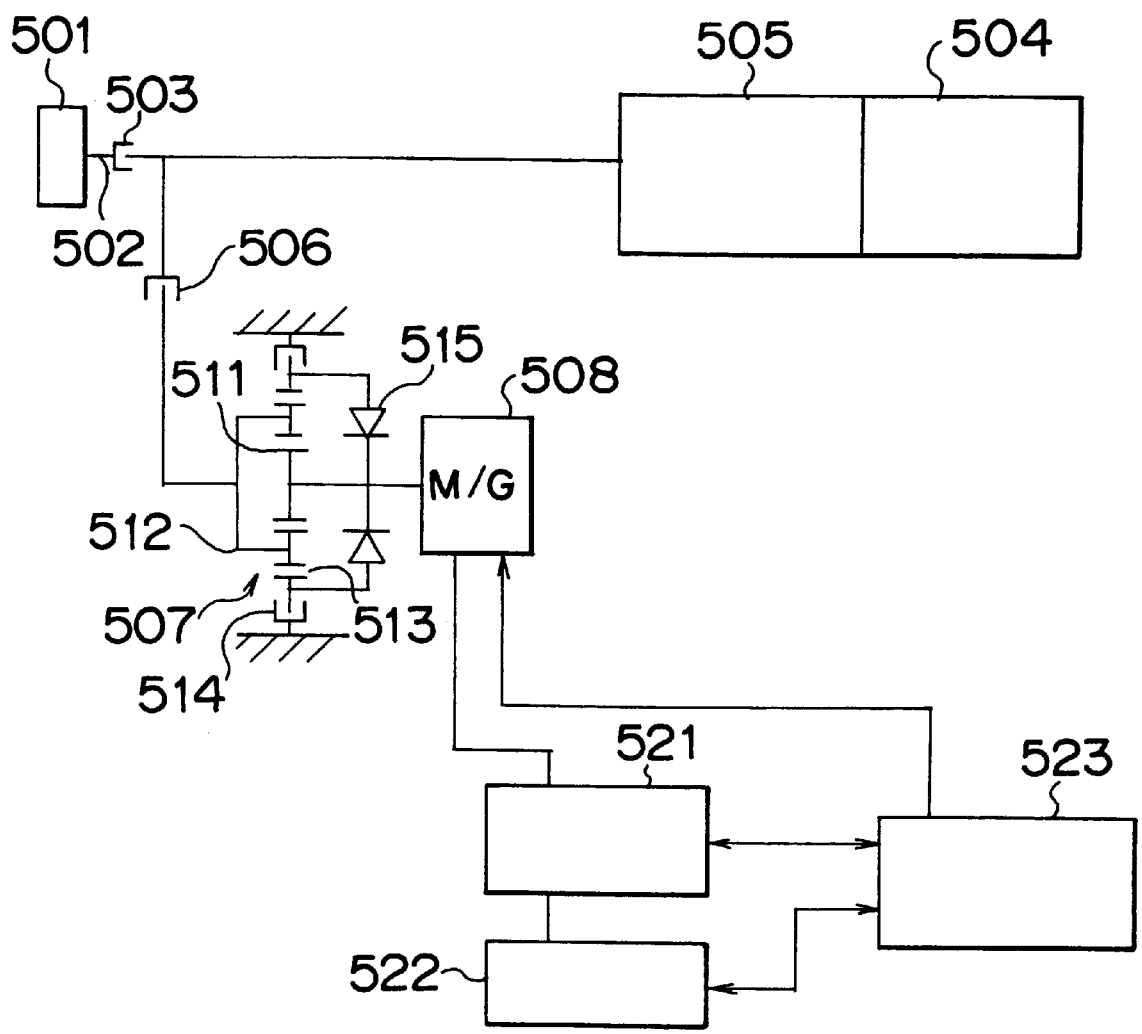
FIG. 25 is a view showing a system of an engine drive device for a vehicle to which the present invention is applied.

FIG. 25 is a schematic view showing a total image of an device in accordance with the present embodiment. As shown in FIG. 25, a torque converter input portion 505 of the A/T is connected to a crank shaft 502 of an engine 501 via a clutch 503.

Further, in succession with the clutch 503, a deceleration device 507 is connected via an electromagnetic clutch 506, and an M/G 508 serving as a motor and a power generator is connected to the deceleration device 507. The M/G 508 quickly starts the engine in place of the starter when the engine is restarted in the automatic stop and start control for the engine. At that time, the clutch 506 and a brake 514 are engaged with each other. Further, the M/G 508 executes a regenerative braking in a state where the clutch 506 is engaged.

The deceleration device 507 is of the type of a planetary gear and includes a sun gear 511, a carrier 512 and a ring gear 513, and further, the ring gear 513 is connected to the M/G 508 via the brake 514 and a one way clutch 515.

Further, an inverter 521 is electrically connected to the M/G 508. The inverter 521 varies an electric power supplied from a battery 522 serving as a power source to the M/G 508 by switching so as to vary the rotational speed of the M/G 508. Further, it is switched to direct an electric energy from the M/G 508 to the battery 522.

Further, in addition to the control of the engine, in order to control connection and disconnection of the electromagnetic clutches 503 and 506, and switching of the inverter 521, a controller (ECU) 523 formed of a computer is provided.

Figure 26:
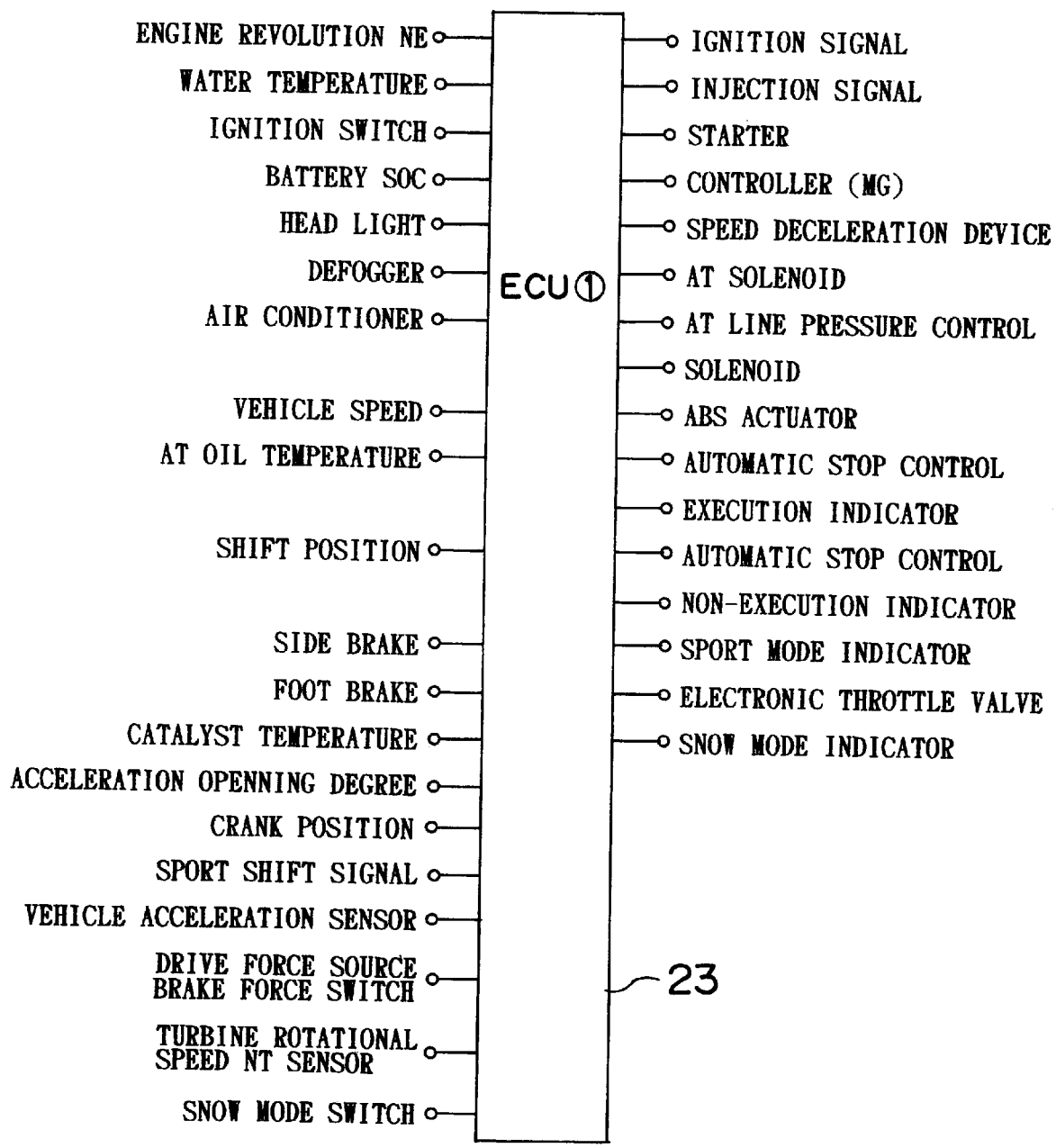
FIG. 26 is a view showing input and output signals to the controller.

The signals input to the controller 523 includes, as shown in FIG. 26, the detected signals of an engine revolution, a water temperature, an ignition switch, a battery SOC (the balance of a charge and discharge), a head light, a defogger, an air conditioner, a vehicle speed, AT fluid temperature, a shift position, a side brake, a foot brake, a temperature of a catalyst in an exhaust device, an opening degree of an accelerator, a crank position, a sport shift signal, a vehicle acceleration sensor, a brake force switch of a driving force source, a turbine rotational speed NT sensor, a snow mode switch, an engine ignition signal, a combustion injection signal, a starter, a controller, a deceleration device, an ΔT solenoid, an ΔT line pressure control solenoid, an ABS actuator, an automatic stop control execution indicator, an automatic stop control not execution indicator, a sport mode indicator, an electronic throttle valve, a snow mode indicator and the like. Further, a control signal is output from the ECU 523 to them.

The controller 523 is provided with a ROM (not shown) storing a control program, a RAM (not shown) writing the calculation result, a RAM (not shown) performing a back up of the data and the like in addition to a central processing unit (CPU) (not shown). They may be connected by a bus, for example.

In this case, an oil pump (not shown) is installed within the automatic transmission as a fluid pressure source driven by the engine for supplying a control oil pressure for controlling the clutch of the automatic transmission and the like.

Figure 27:
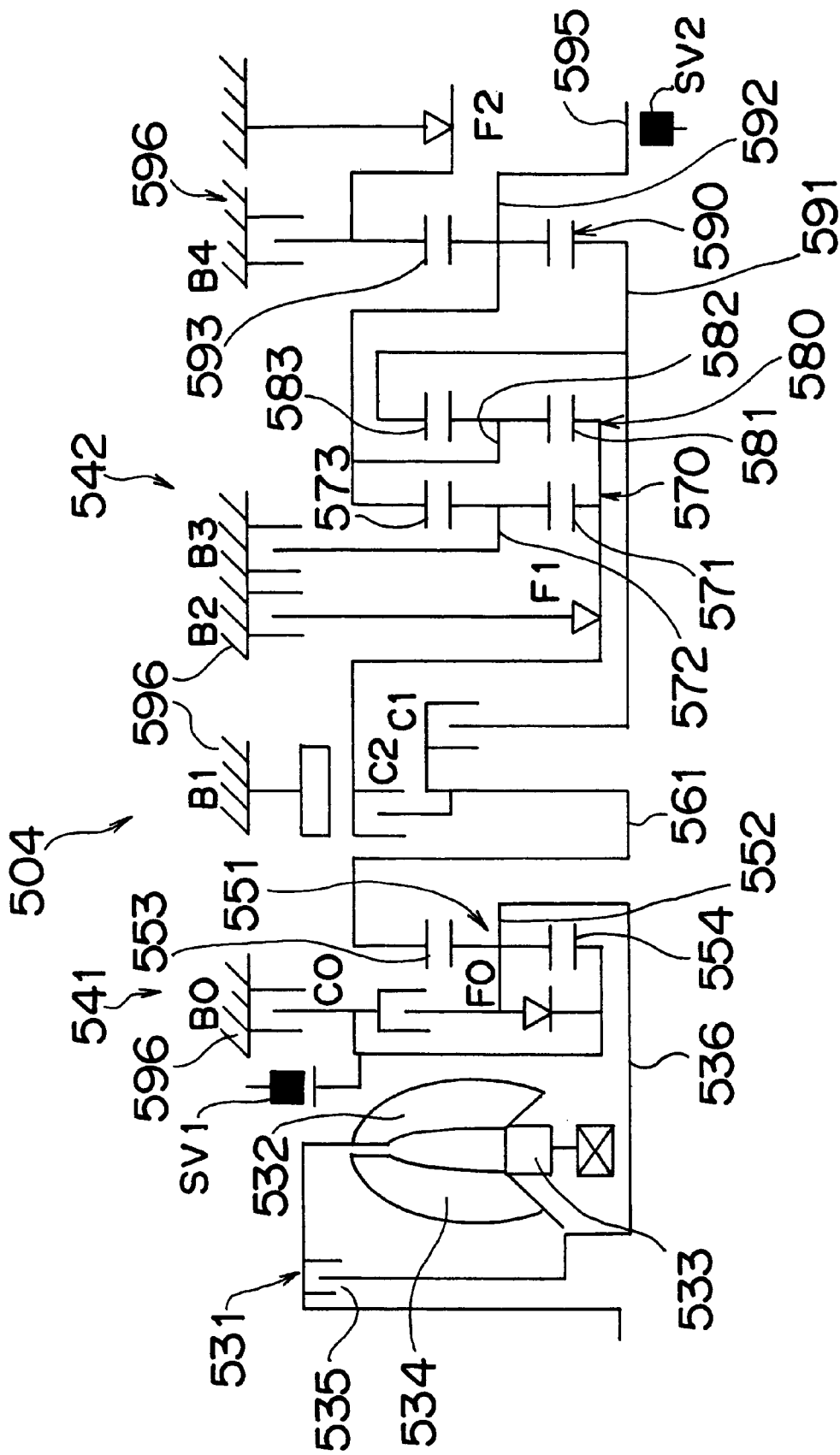
FIG. 27 is a schematic view of a gear train in the transmission.

As shown in FIG. 27, the automatic transmission is provided with a torque converter 531 and a gear transmission 504 which converts the power force transmitted from the torque converter 531 into a driving force necessary for the vehicle so as to be transmitted to the drive wheel.

The torque converter 531 converts the engine power into a kinetic energy of the fluid by a rotation of a pump impeller 532 connected to the crank shaft of the engine, transmits the kinetic energy due to the flow of the fluid to a turbine liner 534 via a stator 533 and further rotates the output shaft so as to transmit the power force. The torque converter 531 is provided with a lock up clutch 535, and directly connects the output shaft of the engine to the output shaft of the torque converter when the vehicle speed is equal to or greater than a fixed value. An input shaft 536 of the gear transmission 504 is connected to the output shaft connected to the turbine liner 534.

The gear transmission 504 mentioned above is provided with a so-called gear train, and normally combines the planetary gear mechanism, clutch, brake and the like so as to allow various speed change ratios as well as forward and backward movement.

Hereinafter, the details thereof will be described below.

FIG. 27 shows an embodiment of the gear train in the automatic transmission, and in the structure shown here, it is configured to provide five forward speeds and two backward speeds. That is, the automatic transmission shown here is provided with a sub transmission portion 541 connected to the torque converter 531 and a main transmission portion 542 subsequently connected to the sub transmission portion 541.

The sub transmission portion 541 is provided with a planetary gear mechanism 551 for an overdrive, and the input shaft 536 of the transmission connected to the torque converter 531 is connected to a carrier 552 of the overdrive planetary gear mechanism 551.

The planetary gear mechanism 551 has a ring gear 553 including internal teeth on an inner peripheral surface, a sun gear 554 arranged in the center of the ring gear 553 and a pinion gear arranged between the sun gear 554 and the ring gear 553 and held by the carrier 552, and is structured such that the pinion gear relatively rotates around the sun gear 554 while meshing with the sun gear 554 and the ring gear 553.

Further, a multi plate disc clutch C0 and a one way clutch F0 are provided between the carrier 552 and the sun gear 554. In this case, the one way clutch F0 is structured to engage, in the case where the sun gear 554 relatively rotates with respect to the carrier 552 in a normal direction (in a rotational direction of the input shaft 536).

Further, a multi plate disc brake B0 for selectively stopping the rotation of the sun gear 554 is provided. Then, a ring gear 553 corresponding to an output element of the sub transmission portion 541 is connected to an intermediate shaft 561 corresponding to an input element of the main transmission portion 542.

Accordingly, in the sub transmission portion 541, since the whole of the planetary gear mechanism 551 integrally rotates in the state that the multi plate disc clutch C0 or the one way clutch F0 is engaged, the intermediate shaft 561 rotates at the same speed as that of the input shaft 536, thus achieving a low speed stage. Further, in the state of engaging the brake B0 to stop the rotation of the sun gear 554, a speed of the ring gear 553 is increased with respect to the input shaft 536 so as to be normally rotated, thus achieving a high speed stage.

On the contrary, the main transmission portion 542 is provided with three sets of planetary gear mechanisms 570, 580 and 590 having the same structure as that of the planetary gear mechanism 551, and rotation elements of the respective ones are connected as mentioned below. That is, a sun gear 571 of the first planetary gear mechanism 570 and a sun gear 581 of the second planetary gear mechanism 580 are integrally connected to each other, a ring gear 573 of the first planetary gear mechanism 570, a carrier 582 of the second planetary gear mechanism 580 and a carrier 592 of the third planetary gear mechanism 590 are connected, and an output shaft 595 is connected to the carrier 592. Further, a ring gear 583 of the overdrive planetary gear mechanism 580 is connected to the sun gear 591 of the third planetary gear mechanism 590.

In the gear train of the main transmission portion 522, it is possible to set two backward speeds and five forward speeds, and clutches and brakes therefor are provided as follows.

First, the description will be given with respect to the clutches. A first clutch C1 (a forward clutch) is provided between the ring gear 553 of the overdrive planetary gear mechanism 551 and the sun gear 591 and the intermediate shaft 561 of the third planetary gear mechanism 590 connected to each other. A second clutch C2 is provided for selectively engaging the sun gears 571 of the first planetary gear mechanism 570 and the sun gear 581 with intermediate shaft 561.

Next, a description will be given with respect to the brakes. A first brake B1 is a hand brake, which is arranged to prevent the sun gears 571, 581 of the first and second planetary gear mechanisms 570, 580 from rotating. Further, a first one way clutch F1 and a second brake B2 corresponding to the multi plate disc brake are arranged between the sun gears 571, 581 (that is, a common sun gear shaft) and a casing 596 in series, and the first one way clutch F1 is structured to be engaged when the sun gears 571 and 581 are going to inversely rotate (in a direction opposite to the rotational direction of the input shaft 36).

A third brake B3 corresponding to the multi plate disc brake is provided between the carrier 572 of the first planetary gear mechanism 570 and the casing 596. Then, a fourth brake B4 corresponding to the multi plate disc brake and a second one way clutch F2 are arranged with respect to the casing 596 in parallel as a brake for stopping the rotation of the ring gear 593 of the third planetary gear mechanism 590. In this case, the second one way clutch F2 is structured to be engaged when the ring gear 593 is going to inversely rotate (in a direction opposite to the rotational direction of the input shaft 36). In this case, in FIG. 27, a reference symbol SV1 denotes a turbine rotational speed sensor, and a reference symbol SV2 denotes an output shaft rotation sensor.

In the automatic transmission mentioned above, it is possible to set the gear position including five forward speeds and two backward speeds by engaging and disengaging in the manner shown by the operation table in FIG. 9 mentioned above.

Figure 11:
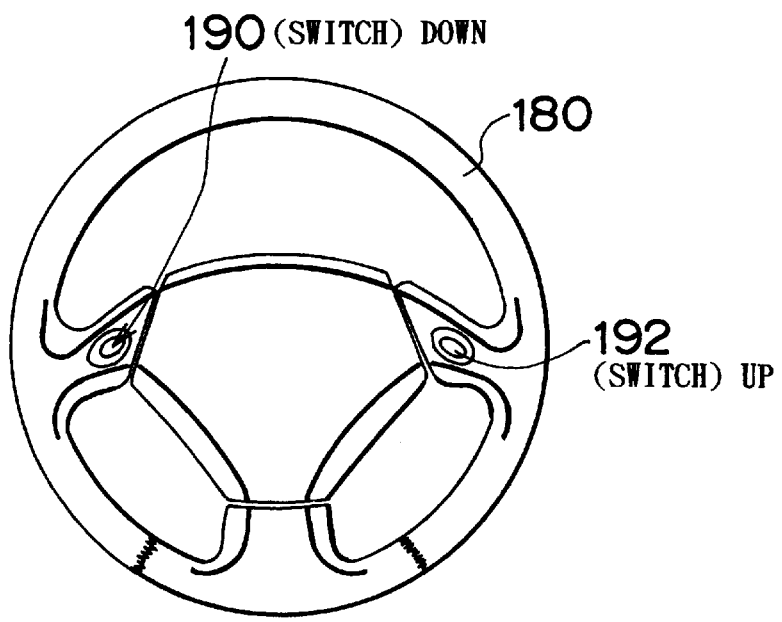
FIG. 11 is a view showing a steering wheel provided with a shift operation button.

Then, it is possible to change the mode of the transmission to a sport mode by the switch in the driver's seat. In the sport mode, as shown in FIG. 11, it is possible to manually change the shift by the shift switch provided in a steering wheel 180.

When selecting the sport mode, a friction device shown by a symbol • in FIG. 9 is engaged. Accordingly, a multi plate disc brake B4 is engaged at the first speed start, so that the engine brake functions. Further, when starting at the second speed, the forward clutch C0 is engaged, so that the engine brake functions.

The present embodiment can also be applied to an automatic clutch type manual transmission and is therefore, not limited to the automatic transmission.

There is provided an automatic stop and start device for automatically stopping the engine under a predetermined stop condition and restarting the engine under a predetermined return condition. Then, in the case of restarting the engine by the automatic stop and start device, in the transmission, an oil pressure (a fluid pressure) supplied to the forward clutch C1 is quickly increased by the quick pressure increase means. Further, in the present embodiment, the forward clutch C1 at both of the first speed start and the second speed start is subjected to the quick pressure increase control. In this case, as is apparent from FIG. 9, in the case of applying an engine brake at the start time, since the multi plate disc brake B4 is engaged in addition to the forward clutch C0 at the first speed and the forward clutch C0 is engaged in addition to the multi plate disc brake B3 at the second speed, in accordance with the present embodiment, the oil pressure is supplied to those other than the forward clutch C1, so that the engagement speed of the forward clutch C1 is delayed at that degree when the oil pressure is supplied. Accordingly, if the condition becomes such that the clutch for the engine brake is engaged during the oil pressure supply, the engagement speed of the forward clutch is made longer than the case in which the clutch for the engine brake is not engaged.

Figure 28:
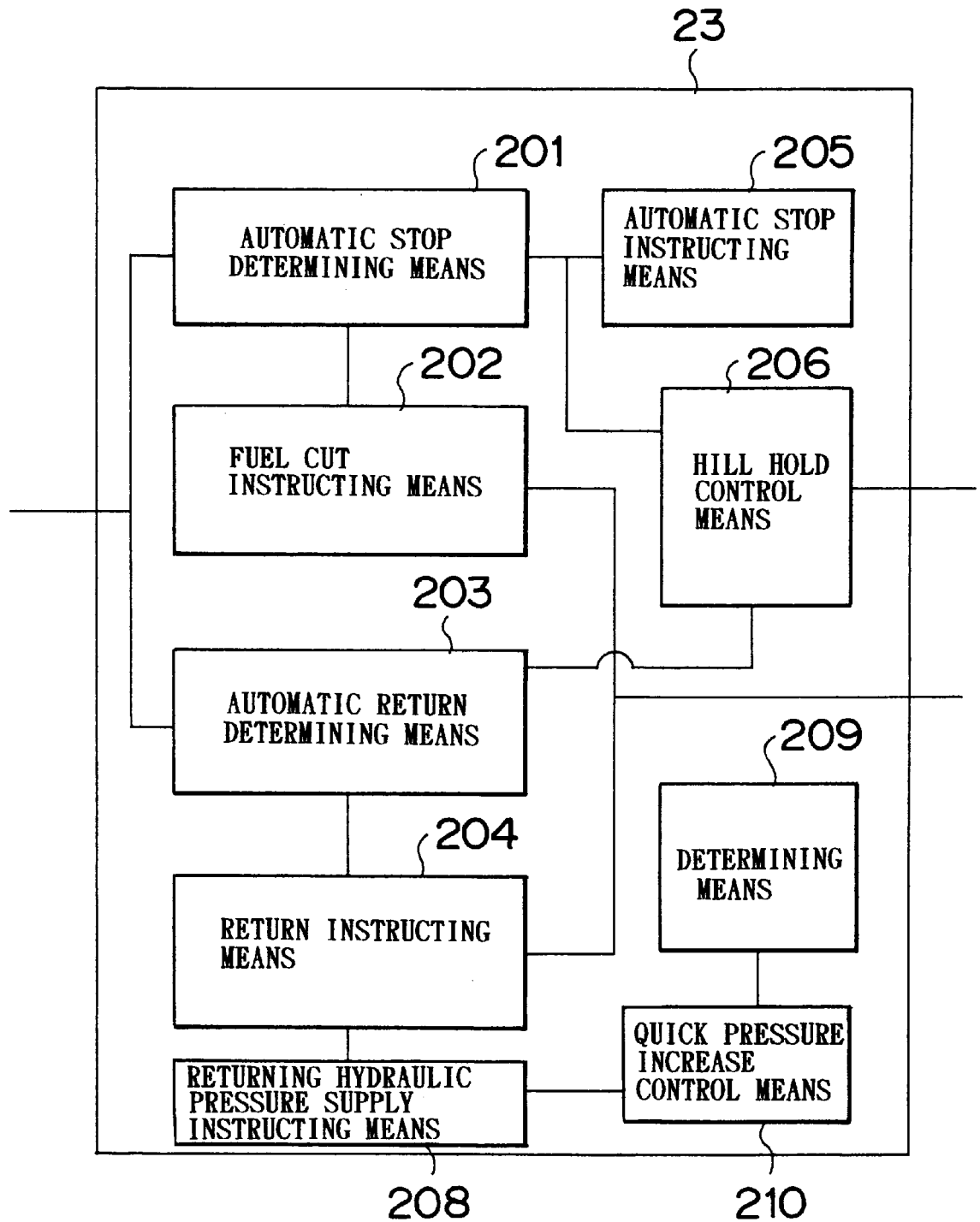
FIG. 28 is a block diagram of the automatic stop and return device in the controller.

The automatic stop and start device of the engine 501 is realized in accordance with the control program stored in the ROM. The structure of the device is shown in FIG. 28. In the present structure, in place of the automatic stop inhibiting means 207 shown by the structure in FIG. 18, determining means 209 and quick pressure increase control means 210 are provided. In this case, the hydraulic pressure circuit corresponding to the quick pressure increasing means in accordance with the present invention may be the same as that in FIG. 19, as mentioned above.

In the determining means 209 for determining the state of the automatic transmission, it is determined whether or not the forward state of the gear position, for example, the first speed state or the second speed state is achieved by the automatic transmission, and whether or not it is the case where the friction devices C0 and B4 for the engine brake are engaged after restart of the engine. When the engine automatically stops, it is recognized what mode and what gear position the engine stops, and the determining means 209 determines the state of the transmission on the basis of the recognized result.

Further, in the controller 523, the quick pressure increase controlling means is configured such that in accordance with the result of the judgment by the determining means 209, the returning oil pressure supply is controlled to change the gear position at the engine restart time, and in accordance whether or not the engine brake friction device is engaged after the engine starts, to change the quick pressure increase time. The case where the engine brake friction device is engaged after the engine starts, corresponds to the case where the friction device achieves an engagement state if the oil pressure is continuously supplied after restart of the engine, and the case where it is not engaged corresponds to the case that it is not in an engagement state even if the oil pressure is continuously supplied.

At the normal engine operation, the switch valve 405 shown in FIG. 19 selects the first hydraulic pressure passage 410, and the returning hydraulic pressure passage 414 is shut off. In the case where the engine temporarily stops by the automatic stop and start device of the engine and thereafter restarts, the switch valve 405 shuts off the first hydraulic pressure passage 410 in accordance with the instruction from the returning hydraulic pressure supply instructing means 208 so as to open the returning hydraulic pressure passage 414. Accordingly, the line pressure supplied from the manual valve 403 is supplied to the forward clutch C1 from the returning hydraulic pressure passage 414 and the second hydraulic pressure passage 412.

Comparing the returning hydraulic pressure passage 414 with the first and second hydraulic pressure passages 410 and 412, since there is no orifice in the returning hydraulic pressure passage 414 and there are the large orifice 409 and the small orifice 411 in the first and second hydraulic pressure passages 410 and 412, the oil pressure from the returning oil pressure passage 414 is supplied to the forward clutch C1 faster than the oil pressure supplied from the first and second hydraulic pressure passages 410 and 412.

Hereinafter, a control example in accordance with the present embodiment will be described referring to a flow chart.

Figure 29:
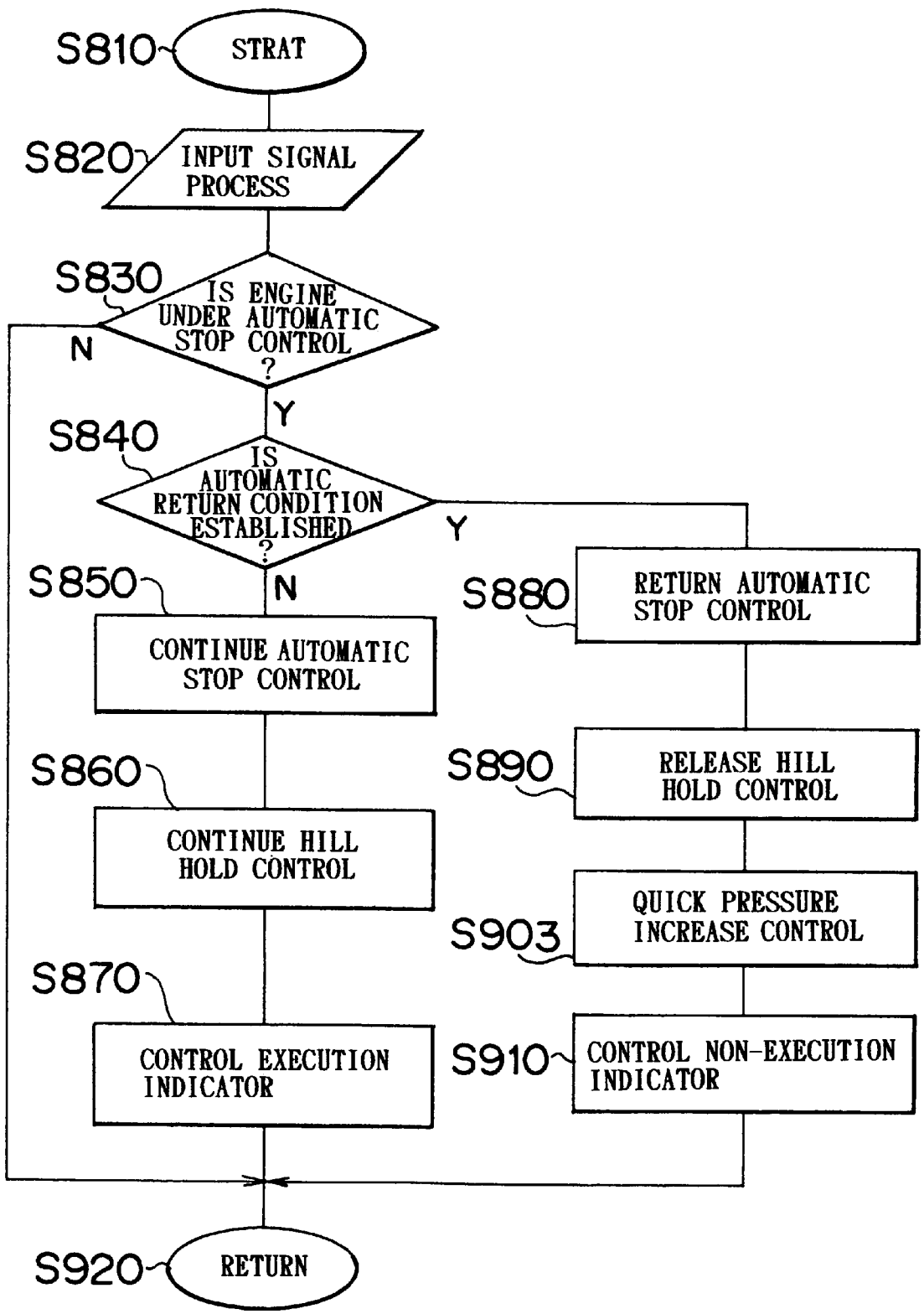
FIGS. 29 and 30 are flow charts of a control in accordance with a fifth embodiment.

As shown in FIG. 29, a control of the present embodiment is structured to replace the step S900 in FIG. 22 mentioned above, with step S930. Accordingly, with respect to steps other than step S930, the explanation will be omitted. A control in the step S930 will be described below.

Upon restart of the engine, the oil pump P is restarted, however, the switch valve 408 is driven by the returning hydraulic pressure supply instructing means 208 while the engine revolution speed increases to become stable, so that the returning hydraulic pressure passage 414 is opened to quickly increase the returning oil pressure quickly and supply to the forward clutch C1 by the quick pressure increasing means.

Figure 30:
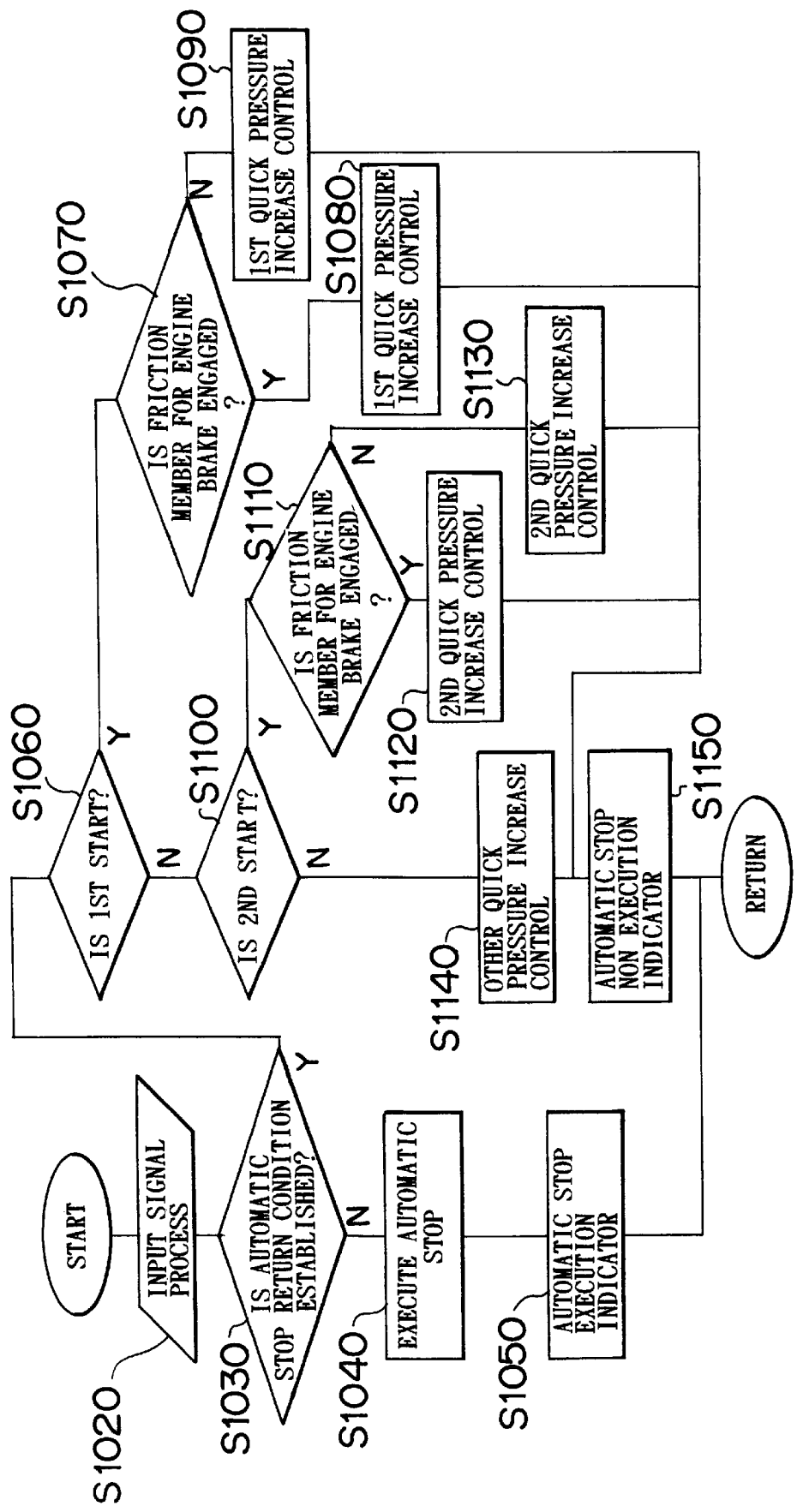

In FIG. 29, it is assumed that the first speed start is executed by the automatic stop and start device for the engine. However, a control example of the present embodiment will be described below referring to a flow chart in FIG. 30.

It is assumed that the driving is performed in the state where the driving position is set at the D position or the M position by the shift lever. The D position corresponds to the case where the controller 523 automatically changes the gear position, and the M position corresponds to a position of the sport mode for manually changing the gear position by the driver. In the case of the M position, as shown in FIG. 11, the gear position is shifted up and down by the shift switch provided in the steering wheel 180.

Under the operation state as mentioned above, various kinds of signals are input to the controller 523 in accordance with FIG. 16, so that the input signals are processed (step S1020). Then when the automatic stop and start control for the engine is performed, it is determined whether or not the restart condition for the engine is established after the engine automatically stops (step S1030). In the case where the restart condition is not established, the automatic stop of the engine is maintained as it is (step S1040), the automatic stop execution indicator is turned on (step S1050) and the process is repeated from the beginning. In step S1030, in the case where the restart condition for the engine is established, the process proceeds to step 1060 where the determining means 209 determines whether or not the transmission is at the first speed start. In the case of the first speed start, it is determined whether or not the multi plate disc brake B4 corresponding to the friction device for the engine brake is engaged at the start time after start of the engine (step S1070). Here, in the case where the multi plate disc brake B4 corresponding to the friction device for the engine brake is engaged at the start time, for example, at the first speed start in the sport mode, the quick pressure increase control is performed (step S1080). Further, in the case where the multi plate disc brake B4 corresponding to the friction device for the engine brake is not engaged at the start time, for example, at the first speed start in the normal mode, the quick pressure increase control is also performed (step 81090).

However, in the quick pressure increase control in step S1080, the quick pressure increase is performed for a time longer than the quick pressure increase control in step S1090. That is, the time of Tfast in FIG. 24 is lengthened. This is because the high flow rate of the working fluid frequently required for the quick pressure increase is required as the engagement of the multi plate disc brake B4 and the engagement of the forward clutch C1 are simultaneously performed. In this case, there is a method of extending the time of Tfast and a method of quickening the start time of Tfast. This control is performed by the instruction from the quick pressure increase control means 210 with respect to the returning hydraulic pressure supply instruction means 208.

In the case where it is not the first speed start in step S1060, the process proceeds to step S1100 where it is determined whether or not it is the second speed start. Here, in the case of the second speed start, it is determined whether or not the clutch C0 corresponding to the friction device for the engine brake is engaged at the start time after start of the engine (step S1110). When the shift lever is in the M position, the sport mode is achieved, at this time, however, it is possible to select the gear position by the switch in the steering wheel 80. Generally, the engine automatically stops at the first speed as the engine stops, however, there is a case of setting the second speed or greater by the switch at the restart time for the engine. The step S1100 is provided to cope with this case.

Either in the case where the clutch C0 corresponding to the friction device for the engine brake is engaged after start of the engine in step S1110 or in the case where it is not engaged, the quick pressure increase control is concurrently performed (steps S1120 and S1130). Like steps S1080 and S1090, the quick pressure increase control (step S1120), in the case where the clutch C0 corresponding to the friction device for the engine brake is engaged after start of the engine, performs a quick pressure increase for a time longer than that of the quick pressure increase control (step S1130), in the case where the clutch C0 is not engaged after start of the engine, thus lengthening the time of Tfast in FIG. 24. This is, as is apparent from FIG. 9, because a larger flow of the working fluid necessary for the quick pressure increase since the engagement between the clutch C0 and the multi plate disc brake B3 and the engagement of the forward clutch C1 are simultaneously performed in the same manner as mentioned above. The control is executed by the instruction from the quick pressure increase controlling means 210 to the returning hydraulic pressure supply instructing means 208.

In the case where it is determined that the second speed start is not performed in step S1100, the other quick pressure increase control is executed (step S1140). This corresponds to the case where it is determined that the start at the third speed is performed, the time control of the Tfast in correspondence thereto is executed. That is, the hydraulic pressure control in accordance with the gear position is performed.

After steps S1080, S1090, S1120, S1130 and S1140, the automatic stop non-execution indicator is turned on in step S1150 and the process is terminated.

In this case, since the supply time (Tfast) of the returning oil pressure or the increasing time of the line pressure is influenced by the working fluid temperature (the AT fluid temperature) in the transmission, it is possible to select the time in accordance with a map shown in TABLE 5. In accordance with this, it is possible to avoid the influence given to the control by the dispersion of the viscosity of the working fluid due to the difference of the AT fluid temperature, so that a proper control can be executed.

TABLE 5

|  | | AT fluid temperature [° C.] | | |
| --- | --- | --- | --- | --- |
| Gear position | | 20 or less | 20 to 80 | 80 or greater |
| T fast | 1ST (normal) | 0.20 sec. | 0.10 sec. | 0.05 sec. |
|  | 1ST (engine brake) | 0.23 sec. | 0.13 sec. | 0.08 sec. |
|  | 2ND (normal) | 0.25 sec. | 0.15 sec. | 0.10 sec. |
|  | 2ND (engine brake) | 0.28 sec. | 0.18 sec. | 0.13 sec. |
|  | 3RD (normal) | 0.30 sec. | 0.20 sec. | 0.15 sec. |
|  | 3RD (engine brake) | 0.35 sec. | 0.25 sec. | 0.18 sec. |

In the control mentioned above, when the engine restarts subsequent to the engine stop instruction and before the C1 hydraulic pressure is sufficiently drained from the hydraulic pressure supply circuit to perform application of the oil pressure, the C1 oil pressure suddenly rises, thereby generating engagement shock. Accordingly, it is controlled so as not to supply the oil pressure from the returning hydraulic pressure passage 414 until after the predetermined time (Toff in FIG. 23) has elapsed by the timer. In order to determine the predetermined time Toff, the rotational speed NE of the engine is detected and the drop in the engine revolution to the predetermined rotational speed (NE1 in FIG. 23) is set as a start condition for supplying the returning hydraulic pressure supply. Further, it is possible to detect the rotational speed of the oil pump P moving together with the engine rotation in place of the engine revolution and set the drop in the rotational speed of the oil pump P to the predetermined rotational speed as the start condition for supplying the returning hydraulic pressure.

In this case, with respect to the C2 clutch (the first and reverse clutch) corresponding to the backward friction device, the circuit shown in the drawing can be applied.

Further, the transmission to which the present invention is applied may be an automatic clutch type manual transmission.

In the control mentioned above, the speed of the clutch engagement is increased by lengthening the quick pressure increase time Tfast. However, when the pressure increasing means is configured to increase the controlled value of the primary regulator valve 402 by the line pressure control solenoid 401 thereby increasing and controlling the line pressure, it is possible to increase the pressure increase value higher than the normal value, to thereby increase an oil flow rate.

For example, in the case where the friction device for the engine is not engaged at the second speed start, the pressure increase value is increased by 20% in comparison with the first speed, and in the case where the friction device for the engine is engaged at the second speed start, the pressure increase value is increased by 30% in comparison with the first speed.

Further, in the case where the friction device for the engine is not engaged at the third speed start, the pressure increased value is increased by 40% in comparison with the first speed, and in the case where the friction device for the engine is engaged at the third speed start, the pressure increased value is increased by 50% in comparison with the first speed.

In this case, as the number of the clutches and the friction devices engaged at the start time changes as shown in FIG. 9 in accordance with the gear position, the greater the number becomes, the greater the required flow rate of the working fluid is increased.

As mentioned above, in accordance with the present embodiment, when restarting the engine after being automatically stopped, the control amount of the quick pressure increase is changed in accordance with the gear position of the transmission and in accordance with whether or not the friction device for the engine brake is engaged, so that it is possible to perform a proper engine start in accordance with the state of the transmission, and the smooth start can be performed.

Next, a sixth embodiment will be described below with reference to FIGS. 31 and 32.

Figure 31:
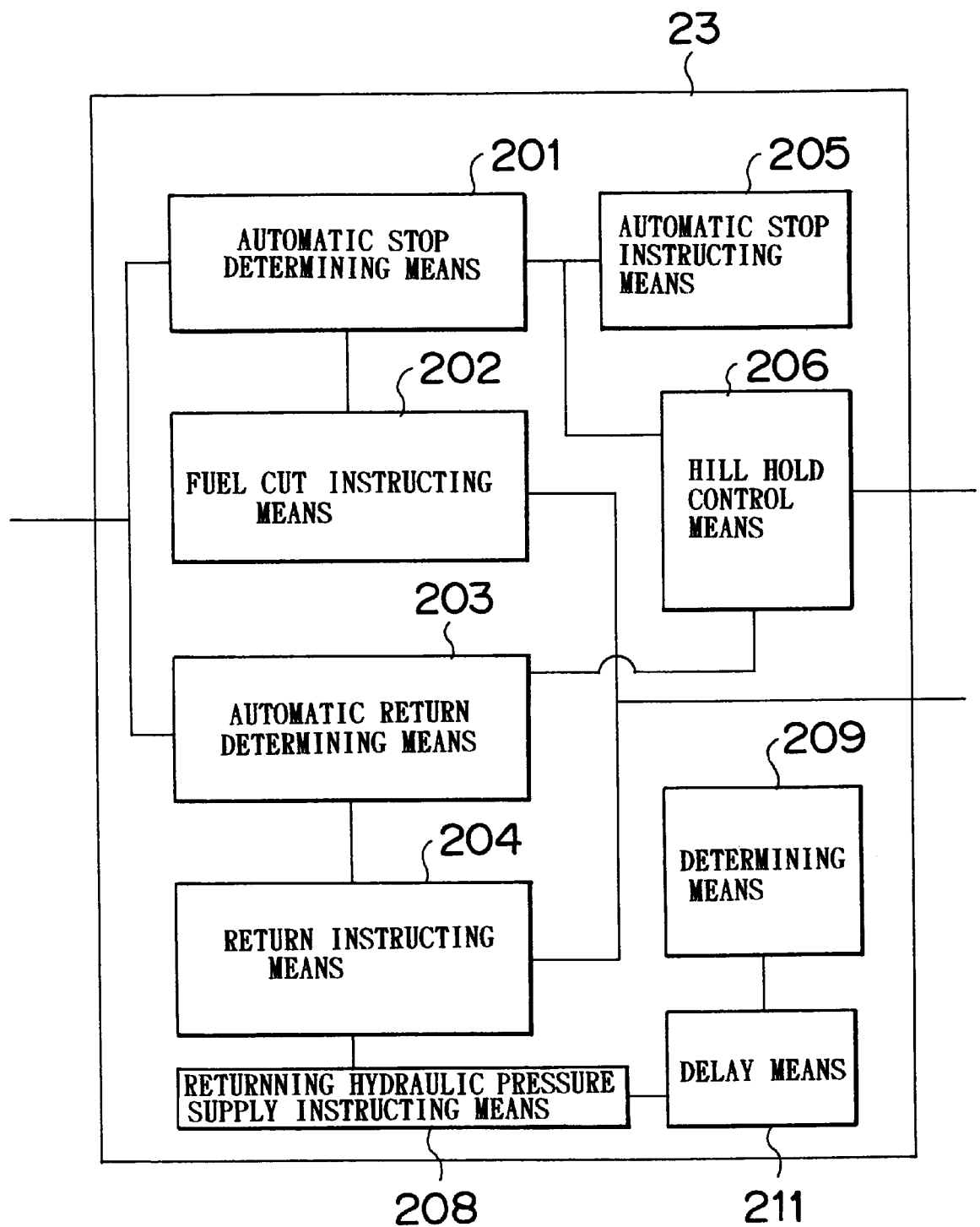
FIGS. 31 and 32 are flow charts of a control in accordance with a sixth embodiment.
Figure 32:
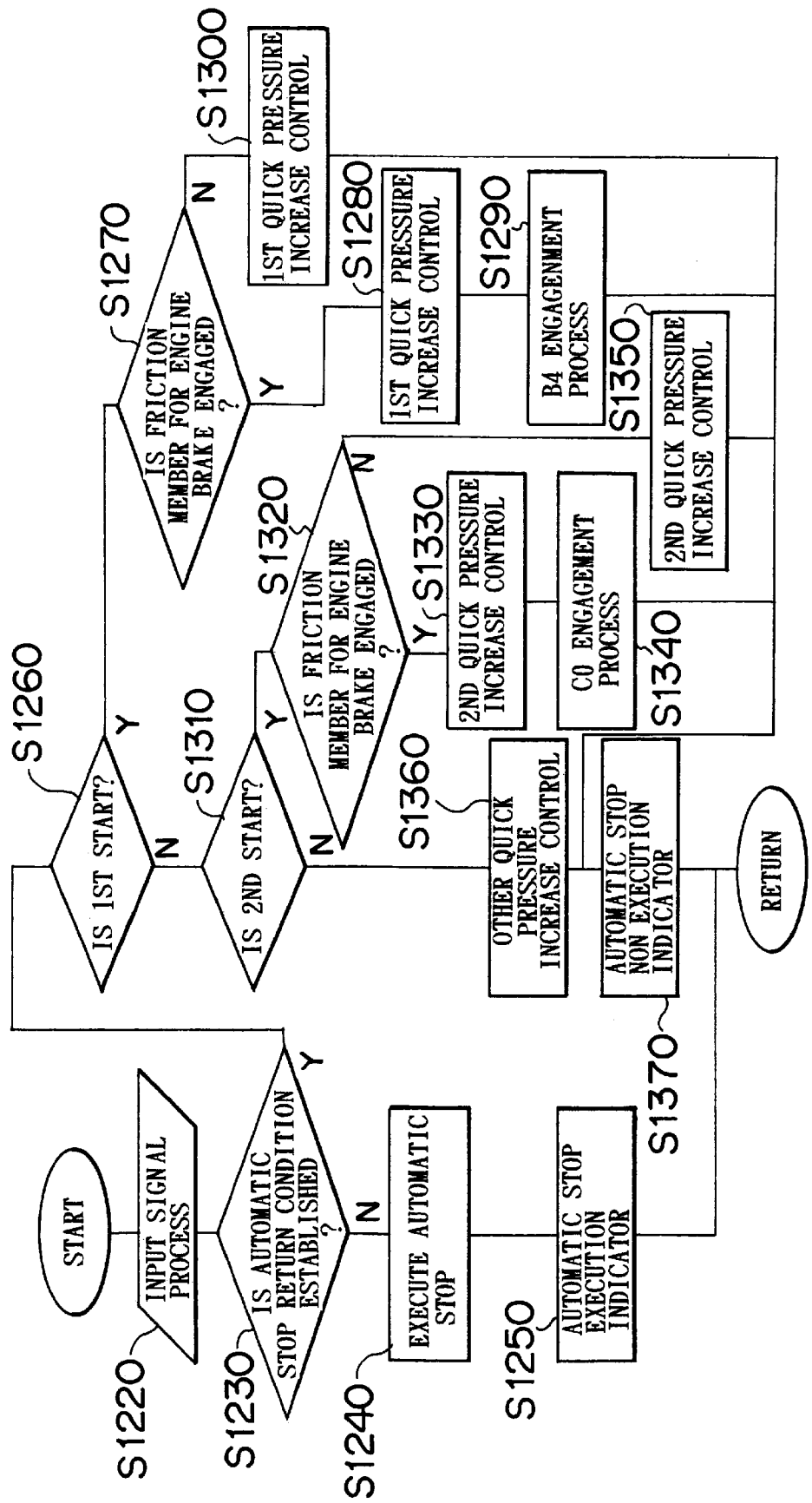

As shown in FIG. 31, the automatic stop and start device in accordance with the present embodiment is provided with delay means 211 in place of the quick pressure increase control means 210 shown in FIG. 28. The delay means 211 delays the engagement of the friction device for the engine brake when the determining means 209 determines that the transmission is under the forward state and the friction device for the engine brake in the transmission is engaged after start of the engine. Since the other structure is the same as that of the embodiments mentioned above, the explanation thereof will be omitted.

Next, a control example in accordance with the present invention will be described below with reference to a flow chart shown in FIG. 32.

It is assumed that driving is performed in the state where the driving position is set at the D position or the M position by the shift lever. In the D position, the controller 23 automatically changes the gear position, and the M position corresponds to a position of the sport mode for manually changing the gear position by the driver input. In the case of the M position, as shown in FIG. 11, the gear position is shifted up and down by the shift switch provided in the steering wheel 180.

Under the operation state mentioned above, various kinds of signals are input to the controller in accordance with FIG. 26, so that the input signals are processed (step S1220). Then, when the automatic stop and start control for the engine is performed, it is determined whether or not the restart condition for the engine is established after the engine automatically stops (step S1230). In the case where the restart condition is not prepared, the automatic stop of the engine is maintained as it is (step S1240), the automatic stop execution indicator is turned on (step S1250) and the process is repeated from the beginning. In step S1230, in the case where the restart condition for the engine is prepared, the process proceeds to step 1260 where the determining means 209 determines a state of the transmission and, on the basis of the determining signal, it is determined whether or not the transmission is at the first speed start. In the case of the first speed start, it is determined whether or not the multi plate disc brake B4 corresponding to the friction device for the engine brake is engaged after restart of the engine (step S1270). Here, either in the case where the multi plate disc brake B4 corresponding to the friction device for the engine brake is engaged after restart of the engine or in the case where it is not engaged, the quick pressure increase control is concurrently performed (step S1280 and S1300). In the case where the multi plate disc brake B4 corresponding to the friction device for the engine brake is engaged after restart of the engine, the engagement process of the multi plate disc brake B4 is performed after the quick pressure increase control (step S1280) against the forward clutch C1 is finished (step S1290), and in the case where the multi plate disc brake B4 is not under the engagement state, the quick pressure increase against the forward clutch C1 is only performed in step S1300.

That is, when the engagement of the multi plate disc brake B4 and the engagement of the forward clutch C1 are simultaneously performed, a larger flow of the working fluid is necessary for the quick pressure increase. In order to reduce the engagement shock, it is structured to preferentially supply the oil pressure only to the forward clutch C1 by the quick pressure increase means and engage the multi plate disc brake B4 corresponding to the friction device for the engine brake after completion of the clutch C1 engagement. The control is executed by the instruction from the returning hydraulic pressure supply instruction means 208 and the delay process by the delay means 211.

In the case where it is not the first speed start in step S1260, the process proceeds to step S1310 where it is determined whether or not it is the second speed start. Here, in the case of the second speed start, it is determined whether or not the clutch C0 corresponding to the friction device for the engine brake is engaged after start of the engine (step S1320).

When it is determined that the clutch C0 corresponding to the friction device for the engine brake is engaged after restart of the engine, the engagement process of the clutch C0 is performed (step S1340) after completion of the quick pressure increase control against the forward clutch C1 (step S1330), and when it is determined that the clutch C0 is not engaged, the process proceeds to step S1350 where only the forward clutch C1 is subjected to the quick pressure increase control.

Also in this case, like steps S1280 and S1300, when the engagement of the clutch C0 for the engine brake and the engagement of the forward clutch C1 are simultaneously performed, more flow rate of the working fluid necessary for the quick pressure increase is required. In order to reduce the engagement shock, it is structured to preferentially supply the oil pressure only to the forward clutch C1 by the quick pressure increase means and engage the clutch C0 corresponding to the friction device for the engine brake after completion of the clutch C1 engagement. The control is also performed by the instruction from the returning hydraulic pressure supply instructing means 208 and the delaying process by the delay means 211.

In this case, in the quick pressure increase control in the step S1330, the quick pressure increase is performed for a time longer than the quick pressure increase control (the step S1350) in the case that the clutch C0 is not engaged so as to lengthen the time of Tfast in FIG. 24. This is, as is apparent from FIG. 9, a large flow rate of the working fluid is necessary for the quick pressure increase since the clutch C0 and the multi plate disc brake B3 are engaged in the second speed start. That is, it is possible to use the control by the quick pressure increase controlling means 210 in the fifth embodiment in parallel.

In this case, in place of the method of lengthening the time Tfast for the quick pressure increase, however, as the quick pressure increasing means, in the case of the structure in which the pressure increasing means increases the controlled value of the primary regulator valve 402 by the line pressure control solenoid 401 thereby increasing and controlling the line pressure, it is possible to increase the increasing value higher than the normal value.

For example, in the case where the friction device for the engine is engaged at the second speed start, the pressure increase value is increased by 20% in comparison with the first speed, and in the case where the friction device for the engine is engaged at the third speed start, the pressure increase value is increased by 40% in comparison with the first speed.

Also in this case, as the number of the clutches and the friction devices engaged at the start time changes as shown in FIG. 9 in accordance with the gear position, the greater the number becomes, the greater the necessary flow amount of the working fluid is increased.

Finally, after steps S1290, S1300, S1350 and S1360, the automatic stop non-execution indicator is turned on in step S1370 and the process is finished.

In this case, as the hill hold control means mentioned above, in the case where the friction device for the engine brake in the transmission is engaged, in step S1270, it is additionally determined whether or not the friction device for the engine brake is engaged for the hill hold, so that it is possible to perform the process in steps S1280 and S1290 also in the case where the friction device for the engine brake is engaged by the hill hold.

As mentioned above, when restarting the engine after being automatically stopped, the control amount of the quick pressure increase is changed in accordance with the gear position of the transmission and in accordance with whether or not the friction device for the engine brake is engaged after restart of the engine, so that it is possible to perform a proper engine start in accordance with the state of the transmission, and a smooth start can therefore be performed.

In accordance with the present invention, even in the case where the engagement of the forward clutch and the engagement of the friction device for the engine brake are simultaneously performed when the engine restarts, these engagements are more smoothly performed and engagement shock can be reduced as much as possible.

Next, a seventh embodiment in accordance with the present invention will be described below.

Figure 33:
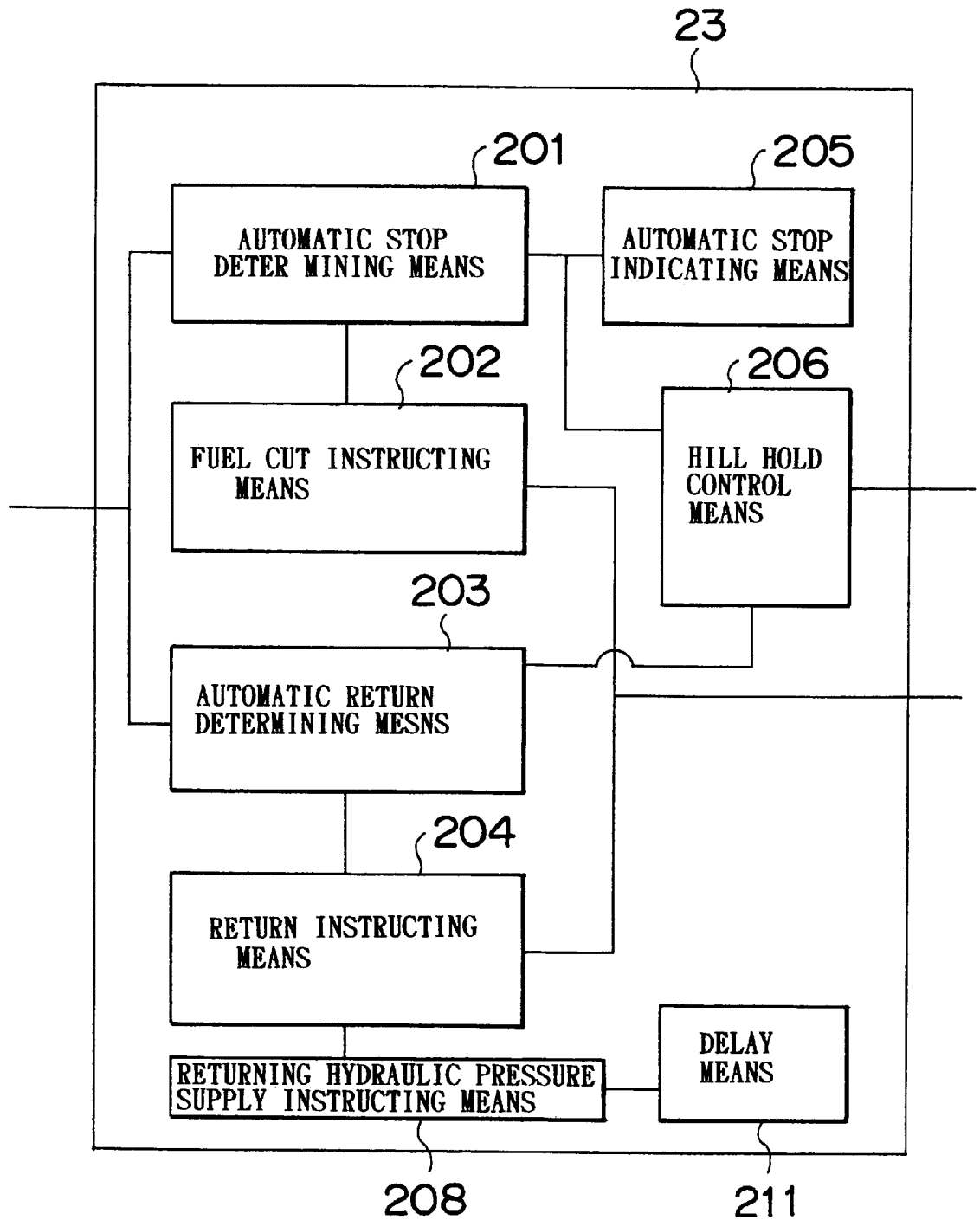
FIG. 33 is a block diagram of the automatic stop and return device in the controller.

An automatic stop and start device for the engine including the delay means 211 has a structure excluding the determining means 209 from FIG. 13, as shown in FIG. 33.

A hydraulic pressure circuit in accordance with the present embodiment is the same as that of the embodiments mentioned above.

Figure 34:
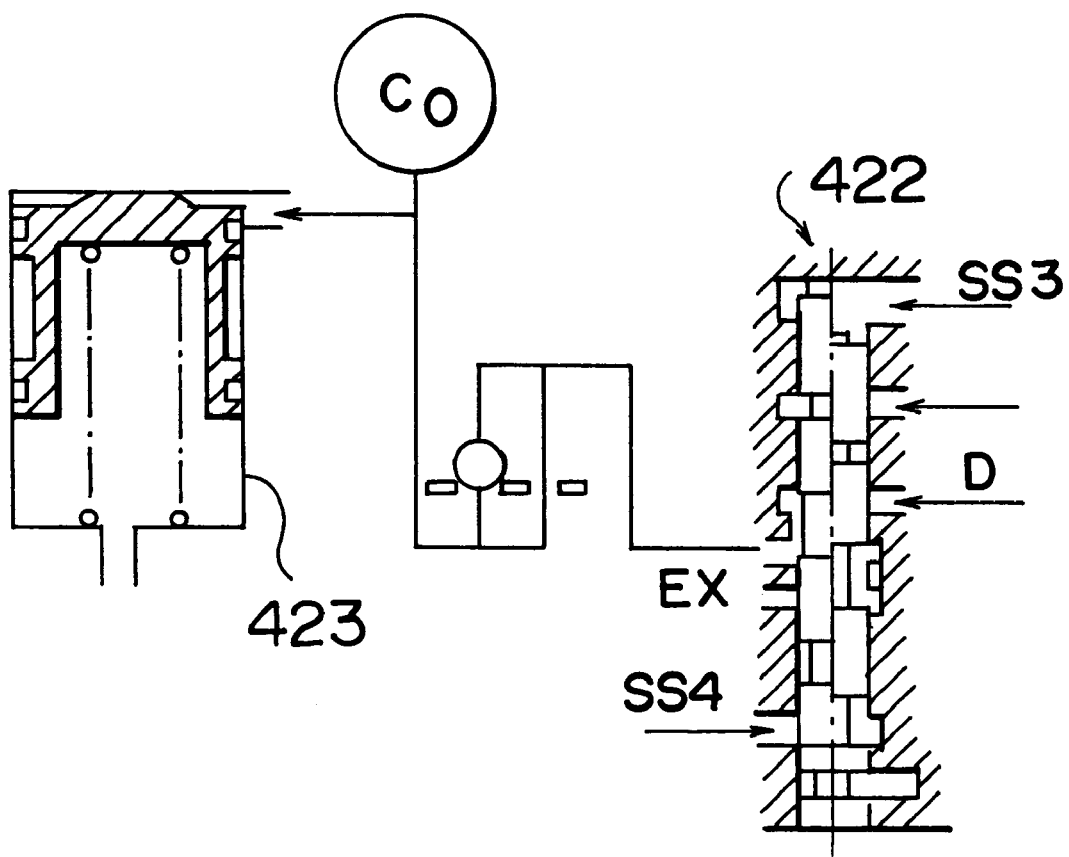
FIG. 34 showing a hydraulic circuit including a clutch.

In FIG. 34, a reference numeral 422 denotes a C-0 exhaust valve, and a line pressure is supplied to the C-0 exhaust valve 422 via the 1-2 shift valve 404 shown in FIG. 19 and a 2-3 shift valve (not shown). When a signal pressure SS4 from a solenoid valve SV4 (not shown) is applied to the C-0 exhaust valve 422, the line pressure is supplied to the clutch C0, and when a signal pressure SS3 from a solenoid valve SV3 (not shown) is applied, the line pressure is shut off.

In the case of delaying the engagement of the clutch C0 by the delay means 211, an application timing of the signal pressure SS4 from the solenoid valve SV4 is delayed from the hydraulic pressure supply timing to the forward clutch C1. In this case, in FIG. 34, an accumulator 423 for the clutch C0 is provided.

Figure 35:
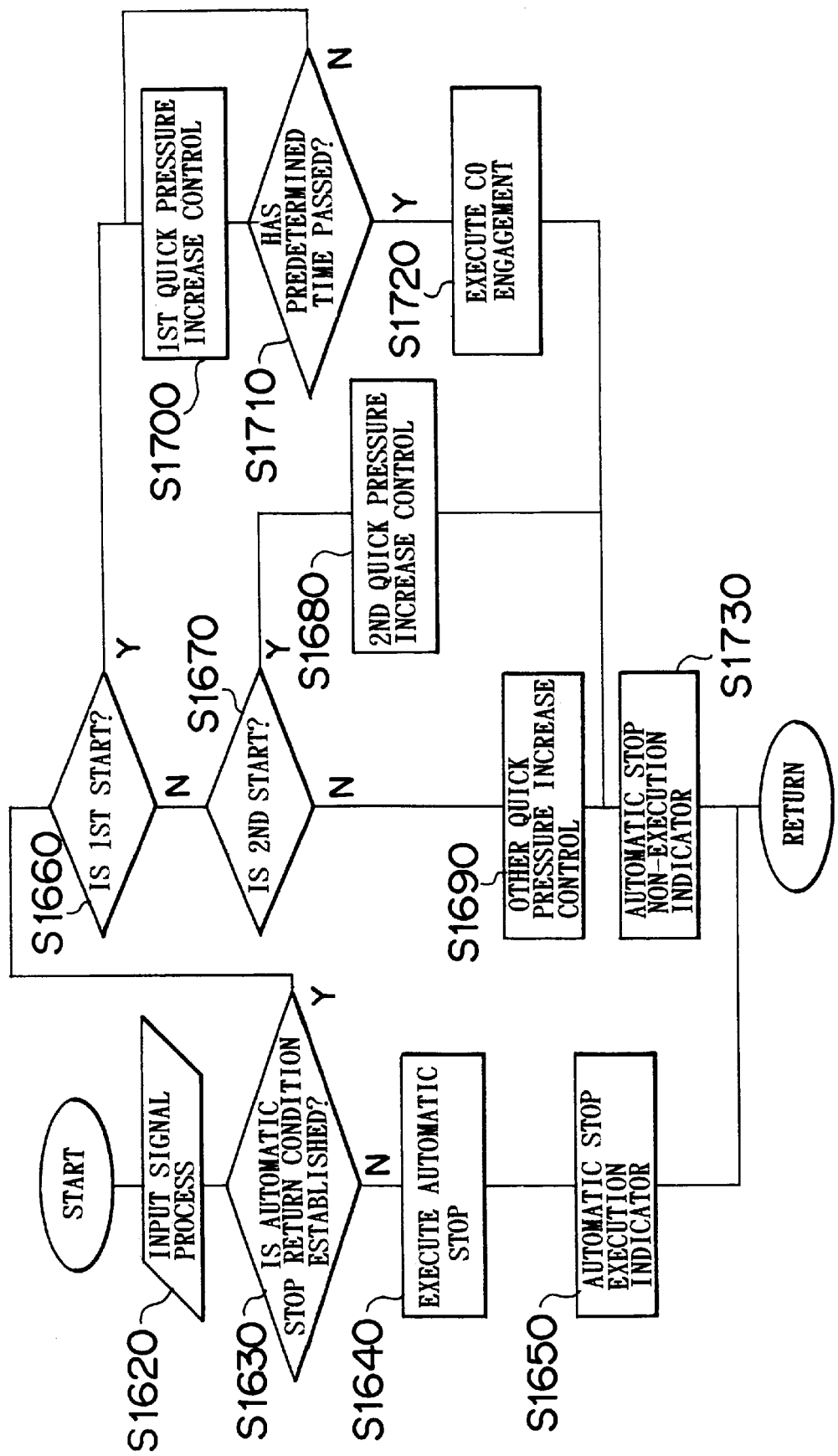
FIG. 35 is a flow chart of a control in accordance with a seventh embodiment.

Next, a control example in accordance with the present embodiment will be described below with reference to a flow chart shown in FIG. 35.

It is assumed that driving is performed in the state where the driving position is set at the D position or the M position by the shift lever.

Under the operation state mentioned above, various kinds of signals are input to the controller 23 in accordance with FIG. 26, so that the input signals are processed (step S1620). Then, when the automatic stop and start control for the engine is performed, it is determined whether or not the restart condition for the engine is prepared after the engine automatically stops (step S1630). In the case where the restart condition is not established, the automatic stop of the engine is maintained as it is (step S1640), the automatic stop execution indicator is turned on (step S1650) and the process is repeated from the beginning. In step S1630, in the case where the restart condition for the engine is established, the process proceeds to step 1660 where it is determined whether or not the transmission is the first speed start. In the case of the first speed start, the process proceeds to step S1700 where the quick pressure increase control is performed. Then, it is measured by the counter and the like whether or not a predetermined time has elapsed after the quick pressure increase (step S1710). When the predetermined time has not elapsed, the quick pressure increase control is maintained as it is, and when the predetermined time has elapsed, the clutch C0 is engaged (step S1720). That is, the engagement of the clutch C0 is delayed by the delay means 211.

In the case where it is determined that it is not the first speed start in step S1660 where it is determined whether or not it is the second speed start in step S1670. When it is the second speed start, the quick pressure increase control is performed in step S1680. In the case where it is not the second speed start, the other quick pressure increase control is executed in step S1690.

When the shift lever is set to the M position, the sport mode is established, however, at this time, it is possible to select the gear stage by the switch in the steering wheel 180. In general, when the engine stops, the engine automatically stops at the first speed. However step S1670 is provided to cope with a case of setting the second speed or greater by the switch at the restart time for the engine.

After steps S1690 and S1720, the automatic stop non-execution indicator is turned on in step S1730 and the process is terminated.

In this case, the quick pressure increase control in steps S1700, S1680 and S1690 performs a hydraulic pressure supply at the hydraulic pressure supply time (Tfast) which is different at each gear position, as shown in TABLE 6.

That is, since the supply time (Tfast) of the returning oil pressure or the increasing time of the line pressure is influenced by the working fluid temperature (the ΔT fluid temperature) in the transmission, the time is selected in accordance with a map shown in TABLE 6. In accordance with this, it is possible to avoid the influence of the dispersion of the viscosity of the working fluid due to the difference of the AT fluid temperature, so that a proper control can be executed.

TABLE 6

|  |  | AT fluid temperature [° C.] | | |
| --- | --- | --- | --- | --- |
|  | Gear position | 20 or less | 20 to 80 | 80 or greater |
| T fast | 1ST (normal) | 0.20 sec. | 0.10 sec. | 0.05 sec. |
|  | 2ND (normal) | 0.25 sec. | 0.15 sec. | 0.10 sec. |
|  | 3RD (normal) | 0.30 sec. | 0.20 sec. | 0.15 sec. |

In the control mentioned above, when the engine restart is generated after the engine stop instruction and before the C1 hydraulic pressure is sufficiently drained from the hydraulic pressure supply circuit, so that an application of the oil pressure is performed, the C1 oil pressure suddenly rises and thereby generates engagement shock. Accordingly, it is controlled so as not to supply the oil pressure from the returning hydraulic pressure passage 210 until after the predetermined time (Toff in FIG. 23) has elapsed by the timer. In order to determine the predetermined time Toff, the rotational speed NE of the engine is detected and the drop of the engine revolution to the predetermined rotational speed (NE1 in FIG. 23) is set as a start condition for supplying the returning hydraulic pressure supply. Further, it is possible to detect the rotational speed of the oil pump P moving together with the engine rotation in place of the engine revolution and set the drop of the rotational speed of the oil pump P to the predetermined rotational speed as the start condition for supplying the returning hydraulic pressure.

In this case, with respect to the C2 clutch corresponding to the backward friction device, the circuit shown in the drawing can be applied.

Further, the present embodiment is not limited to the automatic transmission, but can be applied to an automatic clutch type manual transmission.

As mentioned above, since the engagement of the clutch C0 provided in parallel with the one way clutch F0 in the transmission is delayed when the quick pressure increase control is executed when the engine is restarted after being automatically stopped, a shortage of the working fluid at the quick pressure increase time can be avoided, so that a smooth engagement of the forward clutch C1 can be performed.

In accordance with the present invention, since the predetermined clutch is preferentially engaged when the engine restarts, and the clutch simultaneously engaged together therewith in the normal time, for example, the clutch in parallel with the one way clutch is delayed in engagement, the working fluid necessary for the engagements can be preferentially used for the engagement of the predetermined clutch, so that engagement of the forward clutch can be more smoothly performed, and the engagement shock can be reduced as much as possible.

What is claimed as new and desired to be secured by Letters Patent of the United States is:

1. A control device for restarting an engine mounted on a vehicle comprising:

stop means for automatically stopping the engine in accordance with a stop command under a predetermined stop condition;

restart means for restarting the engine in accordance with a restart command;

engagement means for supplying a fluid to a fluid passage of a predetermined clutch of a transmission mounted on the vehicle from a fluid pump when the engine is restarted, thereby engaging the clutch;

fluid leaving amount detecting means for detecting a fluid leaving amount from a fluid passage of the predetermined clutch; and fluid supply control means for changing a fluid supply method for engaging the clutch in accordance with the fluid leaving amount.

2. A control device according to claim 1, further comprising fluid pressure quick increasing means for executing a quick pressure increase control for quickly increasing a pressure of the fluid during a predetermined time, including 0, when supplying the fluid, wherein the predetermined time is determined in accordance with a fluid leaving amount from the fluid passage of the clutch.

3. A control device according to claim 2, wherein the predetermined time is lengthened as the fluid leaving amount is increased.

4. A control device according to claim 2, wherein the fluid passage comprises a first fluid passage for supplying a fluid to the clutch at a normal operation time and a second fluid passage for supplying a fluid from the quick pressure increase means.

5. A control device according to claim 2, wherein the fluid passage of the predetermined clutch includes pressure control means for controlling the fluid from the fluid pump to a predetermined pressure in a middle of the passage, and wherein the quick pressure increasing means increases the predetermined pressure when the engine restarts.

6. A control device according to claim 2, wherein the quick pressure increase control is executed after a predetermined time has passed after an engine stop instruction.

7. A control device according to claim 1, further comprising quick pressure increasing means for executing a quick pressure increase control for quickly increasing the pressure of the fluid to a control target pressure when supplying the fluid, wherein the control target pressure is determined in accordance with a fluid leaving amount from the fluid passage of the predetermined clutch.

8. A control device according to claim 1, further comprising detecting means for detecting a time from a stop instruction of the engine to the restart instruction, wherein the fluid leaving amount detecting means is further configured to estimate and detect the fluid leaving amount on the basis of the time from the engine stop instruction to the restart instruction.

9. A control device according to claim 1, further comprising rotational speed detecting means for detecting a rotational speed of the fluid pump in the transmission, wherein said fluid leaving amount detecting means is configured to estimate and detect the fluid leaving amount on the basis of the detected rotational speed.

10. A control device according to claim 1, wherein the engine stop condition includes a condition that a shift position is at a non driving position, and wherein the engine restart condition includes a condition that the shift position is moved to the position other than the non driving position.

11. A control device according to claim 1, further comprising:

quick pressure increasing means for executing a quick pressure increase control for quickly increasing a pressure of the fluid to a control target pressure during a predetermined time when supplying the fluid;

determining means for comparing a parameter relating to the quick pressure increase control with a predetermined value and for determining whether or not the quick pressure increase control is properly executed; and leaning means for setting a parameter of the next quick pressure increase control on a basis of the determination of said determining means.

12. A control device according to claim 11, further comprising detecting means for detecting a start of engagement of the predetermined clutch, wherein the determining means is configured to determine whether or not the quick pressure increase control is properly executed according to a time between when the quick pressure increase control is finished, and before the clutch actually starts engagement.

13. A control device according to claim 11, wherein said leaning means is executed at every shift position of the transmission when the engine is restarted.

14. A control device according to claim 11, further comprising determining means for determining whether or not a friction device is engaged so as to secure an engine brake when the engine restarts at the same time as the predetermined clutch, in a gear position of the transmission when the engine restarts, wherein a parameter set by the leaning means is changed in accordance whether or not the friction device is engaged when the engine restarts.

15. A control device according to claim 1, further comprising quick pressure increasing means for executing a quick pressure increase control for quickly increasing a pressure of the fluid to a control target pressure during a predetermined time when supplying the fluid, wherein the quick pressure increase control is different in accordance with a shift position of the transmission when the engine restarts.

16. A control device according to claim 15, wherein the predetermined time for executing the quick pressure increase control is changed in accordance with the shift position of the transmission when the engine restarts.

17. A control device according to claim 15, wherein the control target pressure of the quick pressure increase control is changed in accordance with the shift position of the transmission when the engine restarts.

18. A control device according to claim 1, further comprising:

quick pressure increasing means for executing a quick pressure increase control for quickly increasing a pressure of the fluid to a control target pressure during a predetermined time when supplying the fluid; and determining means for determining whether or not a friction device is engaged so as to secure an engine brake when the engine restarts at the same time as the predetermined clutch, in a gear position of the transmission when the engine restarts;

wherein the quick pressure increase control is different in accordance whether or not the friction device is engaged when the engine restarts.

19. A control device according to claim 18, wherein the predetermined time for executing the quick pressure increase control is changed in accordance with whether or not the friction device is engaged when the engine restarts.

20. A control device according to claim 19, wherein the predetermined time, in the case that the friction device is engaged when the engine restarts, is longer than the case that the friction device is not engaged.

21. A control device according to claim 18, wherein the quick pressure increase control changes the control target pressure in accordance whether or not the friction device is engaged when the engine restarts.

22. A control device according to claim 21, wherein the target pressure in the case that the friction device is engaged when the engine restarts is higher than the case that the friction device is not engaged.

23. A control device according to claim 18 further comprising delay means for delaying an engagement of the friction device at the quick pressure control time in the case that the friction device is engaged when the engine restarts.

24. A control device according to claim 1, further comprising:

quick pressure increasing means for executing a quick pressure increase control for quickly increasing a pressure of the fluid to a control target pressure during a predetermined time when supplying the fluid; and delay means for delaying an engagement of the friction device at the quick pressure increase control time in the case that the friction device engaged so as to secure an engine brake is engaged when the engine restarts, in the transmission when the engine restarts.

25. A control device according to claim 1, further comprising:

quick pressure increasing means for executing a quick pressure increase control for quickly increasing a pressure of the fluid to a control target pressure during a predetermined time when supplying the fluid; and clutch engagement delay means for delaying an engagement of clutches other than a predetermined clutch at the quick pressure increase control time.

26. A control device according to claim 25, wherein the clutch engagement delay means is further configured to delay an engagement of a clutch provided in parallel with a one way clutch of the transmission.

27. A control device according to claim 26, wherein the clutch provided in parallel with the one way clutch of the transmission is a clutch of a sub transmission.

28. A control device for restarting an engine mounted on a vehicle comprising:

stop means for automatically stopping the engine in accordance with a stop command under a predetermined stop condition;

restart means for restarting the engine in accordance with a restart command;

engagement means for supplying an oil to an oil passage of a predetermined clutch of a transmission mounted on the vehicle from a fluid pump when the engine is restarted thereby engaging the clutch;

fluid temperature detecting means for detecting a temperature of a fluid in the transmission; and fluid supply control means for changing a fluid supply method for engaging the clutch in accordance with the temperature of the oil in the transmission.

29. A control device according to claim 28, further comprising fluid pressure quick increasing means for executing a quick pressure increase control for quickly increasing a pressure of the fluid during a predetermined time, including 0, when supplying the fluid, wherein the predetermined time is determined in accordance with a fluid temperature in the automatic transmission.

30. A control device according to claim 29, wherein a time for executing the quick pressure increase control is lengthened as a fluid temperature in the transmission is reduced.

31. A control device according to claim 28, further comprising quick pressure increasing means for executing a quick pressure increase control for quickly increasing the pressure of the fluid to a control target pressure when supplying the fluid, wherein the control target pressure is determined in accordance with an oil temperature of the automatic transmission.

32. A control device according to claim 28, further comprising cooling water detecting means for detecting a cooling water temperature of the engine, wherein the fluid temperature is estimated and detected according to the cooling water temperature.

33. A control device according to claim 28, wherein the engine stop condition includes a condition that a shift position of the transmission is at a non-driving position, and wherein the engine restart condition includes a condition that the shift position is moved to a position other than the non-driving position.

34. A control device for restarting an engine mounted on a vehicle comprising:

stop means for automatically stopping the engine in accordance with a stop command under a predetermined stop condition;

restart means for restarting the engine in accordance with a restart command;

engagement means for supplying a fluid to a fluid passage of a predetermined clutch of a transmission mounted on the vehicle when the engine is restarted and engaging the clutch;

quick pressure increase means for executing a quick pressure increase control for quickly increasing a pressure of the fluid to a control target pressure when supplying the fluid; and rotational speed detecting means for detecting a rotational speed of the fluid pump in the transmission;

wherein a timing for starting the quick pressure increase control is determined in accordance with the rotational speed.

* * * * *